Jan. 1, 1963 H. D. CAHILL ETAL 3,071,650

AUTOMATIC CALLING NUMBER IDENTIFICATION

Filed May 10, 1957 28 Sheets-Sheet 1

INVENTORS: H. D. CAHILL
C. H. DAGNALL, JR.

BY C. Mattice

ATTORNEY

INVENTORS: H. D. CAHILL
C. H. DAGNALL, JR.
BY C. Mattice
ATTORNEY

INVENTORS: H. D. CAHILL
C. H. DAGNALL, JR.
BY C. Mathie
ATTORNEY

AUTOMATIC CALLING NUMBER IDENTIFICATION

Filed May 10, 1957

28 Sheets-Sheet 4

INVENTORS H. D. CAHILL
C. H. DAGNALL, JR.
BY C. Mathie
ATTORNEY

AUTOMATIC CALLING NUMBER IDENTIFICATION

Filed May 10, 1957 28 Sheets-Sheet 5

INVENTORS H. D. CAHILL
C. H. DAGNALL, JR.
BY C. Mattice
ATTORNEY

INVENTORS H. D. CAHILL
C. H. DAGNALL, JR.
BY C. Mattice
ATTORNEY

INVENTORS H. D. CAHILL
C. H. DAGNALL, JR.
BY C. Mathie
ATTORNEY

INVENTORS H. D. CAHILL
C.H. DAGNALL, JR.
BY C. Mattice
ATTORNEY

AUTOMATIC CALLING NUMBER IDENTIFICATION

Filed May 10, 1957

INVENTORS H. D. CAHILL
C. H. DAGNALL, JR.
BY C. Mattice
ATTORNEY

INVENTORS H. D. CAHILL
C. H. DAGNALL, JR.
BY C. Mattice
ATTORNEY

INVENTORS H. D. CAHILL
C. H. DAGNALL, JR
BY C. Mattice
ATTORNEY

INVENTORS H. D. CAHILL
C. H. DAGNALL, JR.
BY C. Mattice
ATTORNEY

AUTOMATIC CALLING NUMBER IDENTIFICATION

Filed May 10, 1957 28 Sheets-Sheet 13

INVENTORS: H. D. CAHILL
C. H. DAGNALL, JR.
BY C. Mattice
ATTORNEY

INVENTORS H. D. CAHILL
C. H. DAGNALL, JR.
BY C. Mattice
ATTORNEY

INVENTORS H. D. CAHILL
C. H. DAGNALL, JR.
BY C. Mattice
ATTORNEY

INVENTORS H. D. CAHILL
C.H.DAGNALL, JR.
BY C. Mattei
ATTORNEY

Jan. 1, 1963 H. D. CAHILL ET AL 3,071,650

AUTOMATIC CALLING NUMBER IDENTIFICATION

Filed May 10, 1957 28 Sheets-Sheet 17

INVENTORS H. D. CAHILL
C. H. DAGNALL, JR.
BY C. Mattice
ATTORNEY

INVENTORS H. D. CAHILL
C.H. DAGNALL, JR.
BY C. Mattice
ATTORNEY

INVENTORS H. D. CAHILL
C. H. DAGNALL, JR.
BY C. Mattice
ATTORNEY

Jan. 1, 1963 H. D. CAHILL ETAL 3,071,650

AUTOMATIC CALLING NUMBER IDENTIFICATION

Filed May 10, 1957 28 Sheets-Sheet 20

INVENTORS: H. D. CAHILL
C. H. DAGNALL, JR.

BY C. Mathie

ATTORNEY

INVENTORS: H. D. CAHILL
C. H. DAGNALL, JR.
BY
C. Mattice
ATTORNEY

INVENTORS: H. D. CAHILL
C. H. DAGNALL, JR.
BY
C. Mathie
ATTORNEY

AUTOMATIC CALLING NUMBER IDENTIFICATION

Filed May 10, 1957 28 Sheets-Sheet 23

INVENTORS: H. D. CAHILL
C. H. DAGNALL, JR.

BY C. Mattice

ATTORNEY

INVENTORS: H. D. CAHILL
C. H. DAGNALL, JR.
BY C. Mattice
ATTORNEY

AUTOMATIC CALLING NUMBER IDENTIFICATION

INVENTORS: H. D. CAHILL
C. H. DAGNALL, JR.
BY C. Mattice
ATTORNEY

INVENTORS: H. D. CAHILL
C. H. DAGNALL, JR.
BY C. Mattice
ATTORNEY

INVENTORS: H. D. CAHILL
C. H. DAGNALL, JR.
BY C. Mattice
ATTORNEY

AUTOMATIC CALLING NUMBER IDENTIFICATION

Filed May 10, 1957

INVENTORS: H. D. CAHILL
C. H. DAGNALL, JR.
BY C. Mattie
ATTORNEY

United States Patent Office 3,071,650

Patented Jan. 1, 1963

3,071,650
AUTOMATIC CALLING NUMBER IDENTIFICATION

Harold D. Cahill, Scarsdale, N.Y., and Clarence H. Dagnall, Jr., Orange, N.J., assignors to Bell Telephone Laboratories, Incorporated, New York, N.Y., a corporation of New York Filed May 10, 1957, Ser. No. 658,384
15 Claims. (Cl. 179—8.5)

This invention relates to telephone systems and has for its object to facilitate the making of charge records in such a system.

In certain telephone offices, charge records are made by automatic message accounting equipment individual to that office. For other offices such equipment may not be economically provided, and charges for local service are made by other well-known means.

Equipment has already been designed for making charge records relating to calls outgoing from a plurality of offices by directing such calls through a tandem office at which automatic charging equipment may be located economically. Such equipment is described and claimed in R. N. Breed et al., Patent 2,848,543, issued August 19, 1958. However, in this equipment the identity of the calling line is determined by having an operator obtain the number from the calling subscriber.

In accordance with the present invention, means is provided for automatically identifying the designation of the calling subscriber and transmitting the designation so obtained to the tandem office where the charge recording equipment is located. Similar equipment may be provided at a local toll tenter, as that in the case of toll calls, the automatically identified designation will be transmitted to the toll center directly, without passing through a tandem office.

In accordance with the present invention the means for automatically identifying the calling line number includes a number network and bus system similar to that disclosed and claimed in Patent No. 2,672,515 to D. S. Barlow, March 16, 1950, as well as an identifier circuit and an outpulser circuit. When a call requiring the use of the charging equipment at the tandem office reaches a trunk outgoing to the tandem office and the called line number has been transmitted to the tandem office, a link circuit is operated which connects the outpulser circuit with the trunk circuit. The outpulser then connects with the identifier circuit, which causes an oscillator to mark the sleeve of the calling line through the trunk by means of a characteristic tone. This characteristic tone is connected by the number network and bus circuit to one conductor in each of a plurality of sets of conductors, each set individual to one of the digits making up the calling line designation. The identifier includes a plurality of detector circuits which it connects successively to the sets of conductors representing the various digits of the calling line number, the detector connected to the conductor to which the tone is directed operating to identify the value of the particular digit.

As each digit is identified, it is registered in the outpulser and the outpulser indicates to the identifier that the digit has been successfully identified. The identifier does not wait for this indication but proceeds to test for the tone in each of the sets of conductors. After the last set has been tested, if an indication has not been received for each of the digits, the identifier will again test those sets of conductors for which no corresponding indication has been received.

In some buildings there may be more than one telephone office, in which case the identifier will successively connect the detectors to the conductors representing a particular digit in each office to simultaneously identify the office as well as the particular digit. In this case the identifier does wait for an indication that the office has been identified and if no such indication is received while testing the conductors corresponding to the particular digit, the identifier will again attempt to identify the office by testing the conductors representing a different digit in each of the offices.

When a complete calling line designation has been registered in the outpulser, the identifier is released and the outpulser transmits the designation to the tandem office. With each designation the outpulser transmits an informaiton digit. If the identifier cannot complete the identificaiton after a second trial, the outpulser transmits a different information digit which will cause the tandem office to obtain the calling line number by means of an operator.

The number network and bus circuit is designed to distinguish between the tip party and the ring party on two party lines. For lines having four or more parties, the sleeve of the line is connected to a special conductor passing through the number network and bus circuit. When the identification tone is applied to the sleeve conductor of such a line, a special detector operates in the identifier to set up a special registration in the outpulser, and the outpulser transmits a still different information digit to the tandem office where the calling line number is obtained by an operator.

If the calling line on which a call is originated is being service observed, a branch of the sleeve conductor passing through the service observing equipment marks a service observing conducotr in the number network and bus circuit causing a service observing detector to operate and indicate to the outpulser that the line is being observed. As a result of this indication, the value of the information digit transmitted by the outpulser is increased by a fixed amount resulting in a special mark on the charge record.

These and other features of the invention will be more clearly understood from a consideration of the following description read in connection with the drawings in which.

Figure 1:
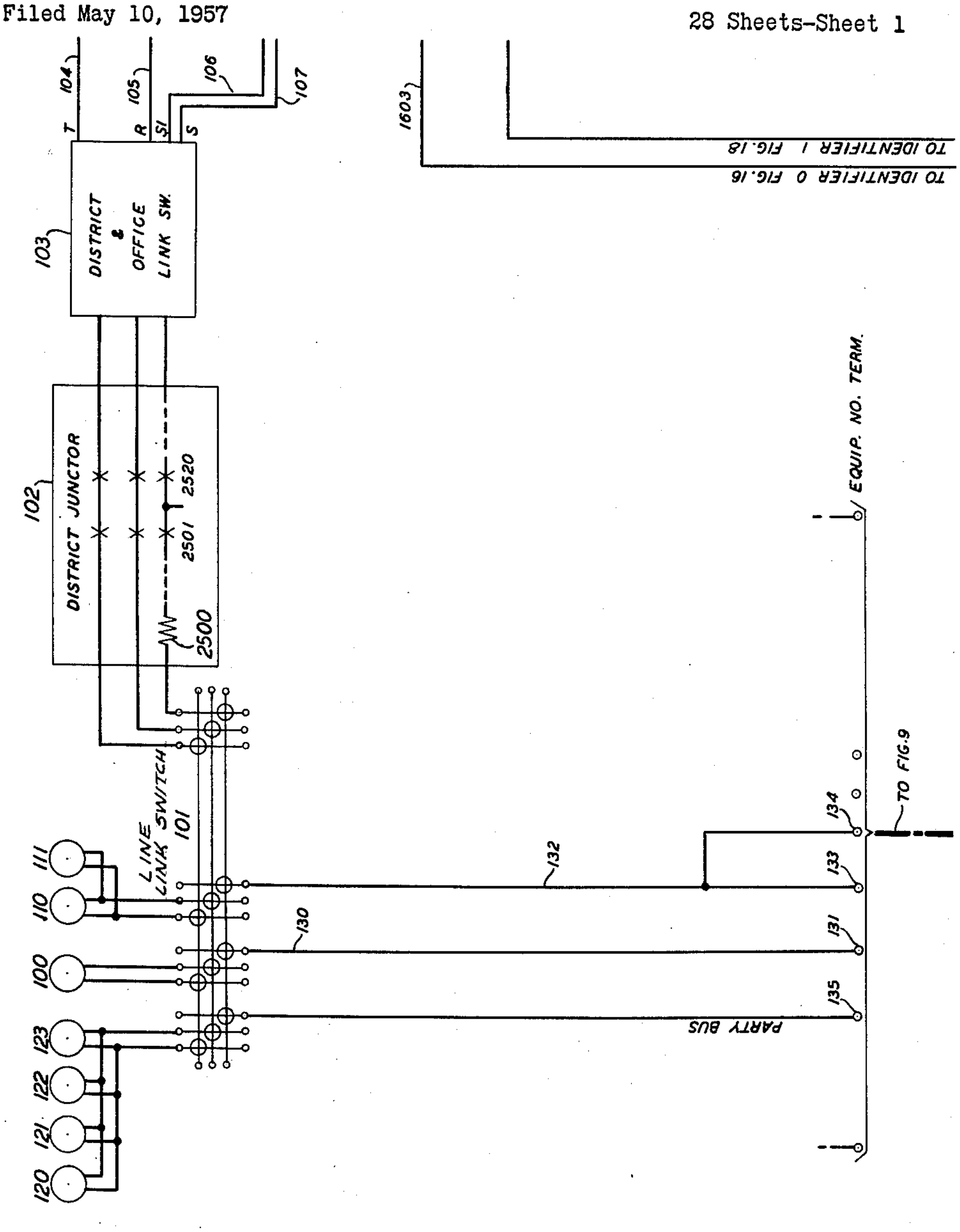
FIG. 1 shows a plurality of calling subscribers' lines together with a district junctor and switches for connecting a calling line with the trunk of FIGS. 2 and 4.

In the drawings, functional designations are used and the location of each piece of equipment is indicated by the number of the drawing preceding the functional designation and separated therefrom by a dash. Detached contacts are employed, the contacts being identified by the same designation as the relay itself. In general, each contact is identified individually. However, where a number of contacts of the same relay appear in alignment, the aligned contacts are identified either by the relay itself or only the contact at one end of the alignment is identified. If the contacts appear in more than one figure, the alignment is identified in each figure. Contacts which are closed when the relay is deenergized are represented by a single short line perpendicular to the lines representing the connecting conductors while contacts which are closed when the relay is operated are represented by a cross or an X at the junction of the connecting conductors.

*General Description*

The automatic number identification system disclosed in the present application is used to identify and transmit to a toll or tandem office the directory number of a subscriber who has dialed a toll or tandem call in a crossbar office of the type disclosed in Patent 2,235,803, granted to W. W. Carpenter on March 18, 1941. It may be also used for the same purpose in connection with subscribers located in a step-by-step office or in a panel type office. This identification system functions with the centralized automatic message accounting system at the tandem or toll office to make fully automatic accouning for nearly all long distance calls. Such an accounting system is disclosed in the above-identified Breed et al. application.

The automatic identification system includes a trunk (FIGS. 2 and 4) to which the central office switching system has access, an outpulser link (FIGS. 5 to 8), an outpulser circuit (FIGS. 20 to 26), an identifier circuit (FIGS. 14 to 19), an oscillator circuit and a number network and bus circuit (FIGS. 9 to 13). The identifier causes the oscillator to apply an identification tone to the sleeve conductor of the calling line and scans for this tone the output conductors of the number network and bus circuits of all the local central offices in the building which it serves. It then reads the calling subscriber's directory number as translated by the number network and bus circuit and forwards this number to the outpulser circuit. The outpulser then transmits this number through the link and trunk to the toll or tandem office where it is used in making a record of the call for accounting purposes.

Figure 2:
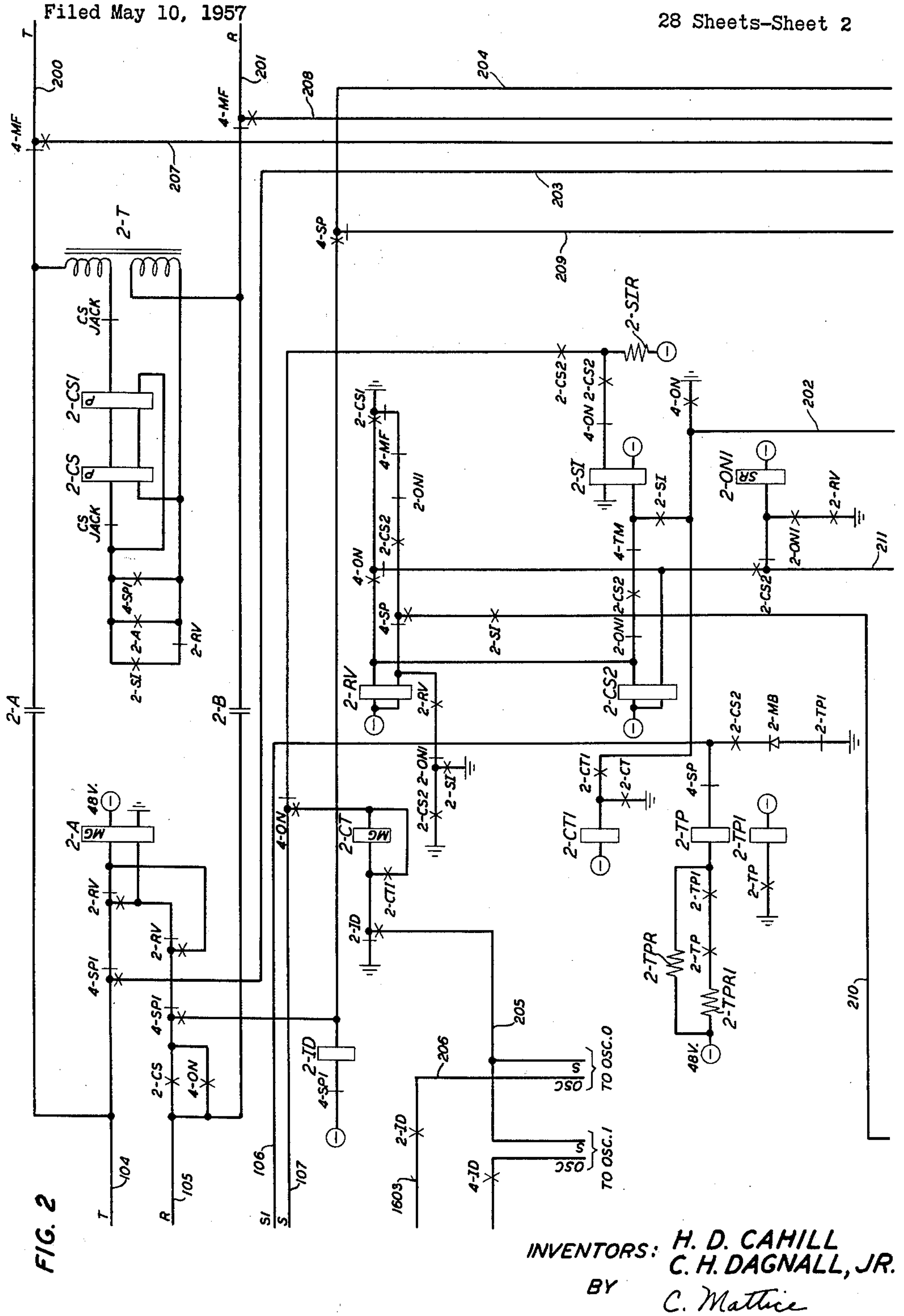
FIG. 2 shows part of a trunk circuit outgoing to a tandem office.
Figure 3:
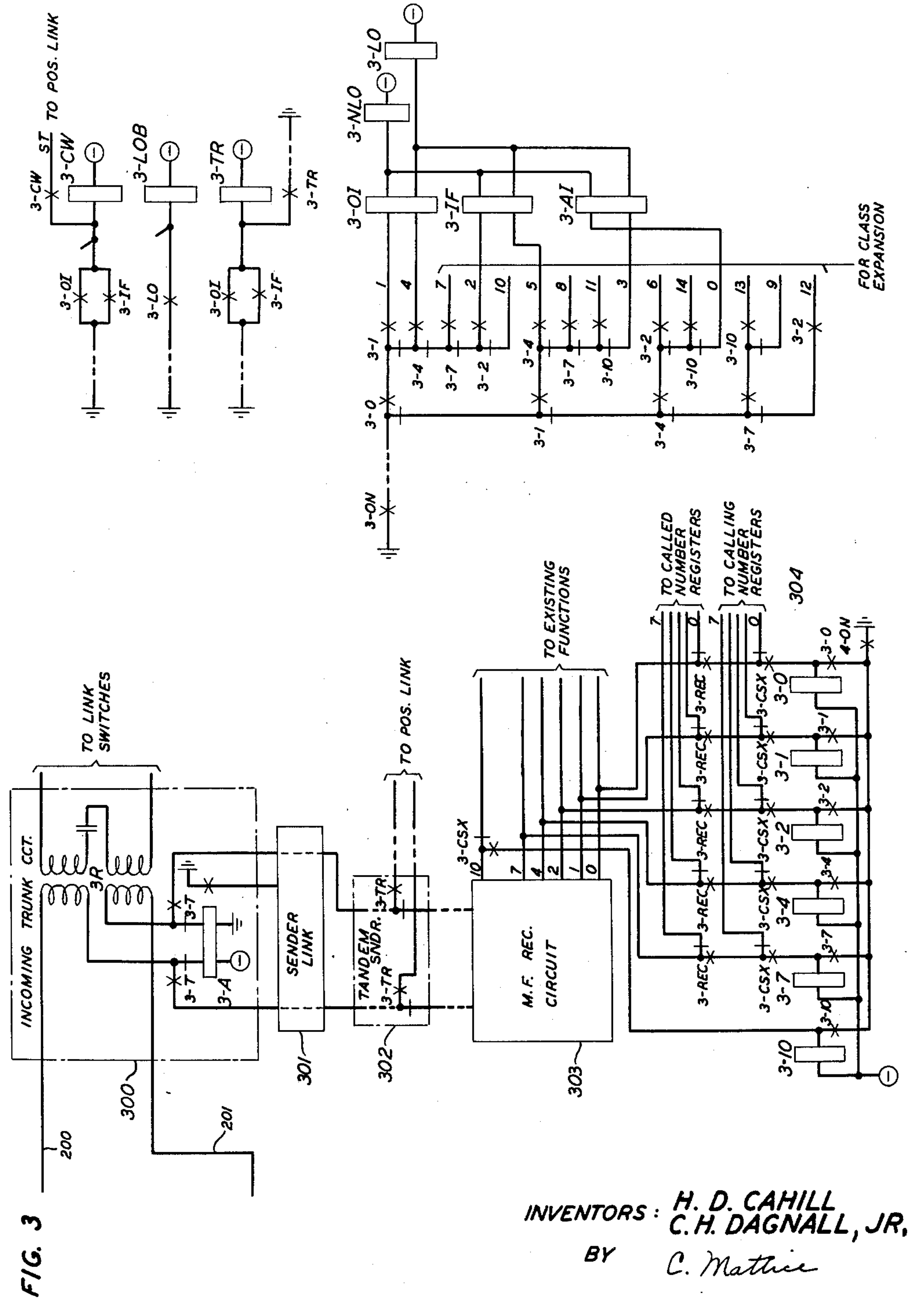
FIG. 3 shows some of the equipment at the tandem office.
Figure 4:
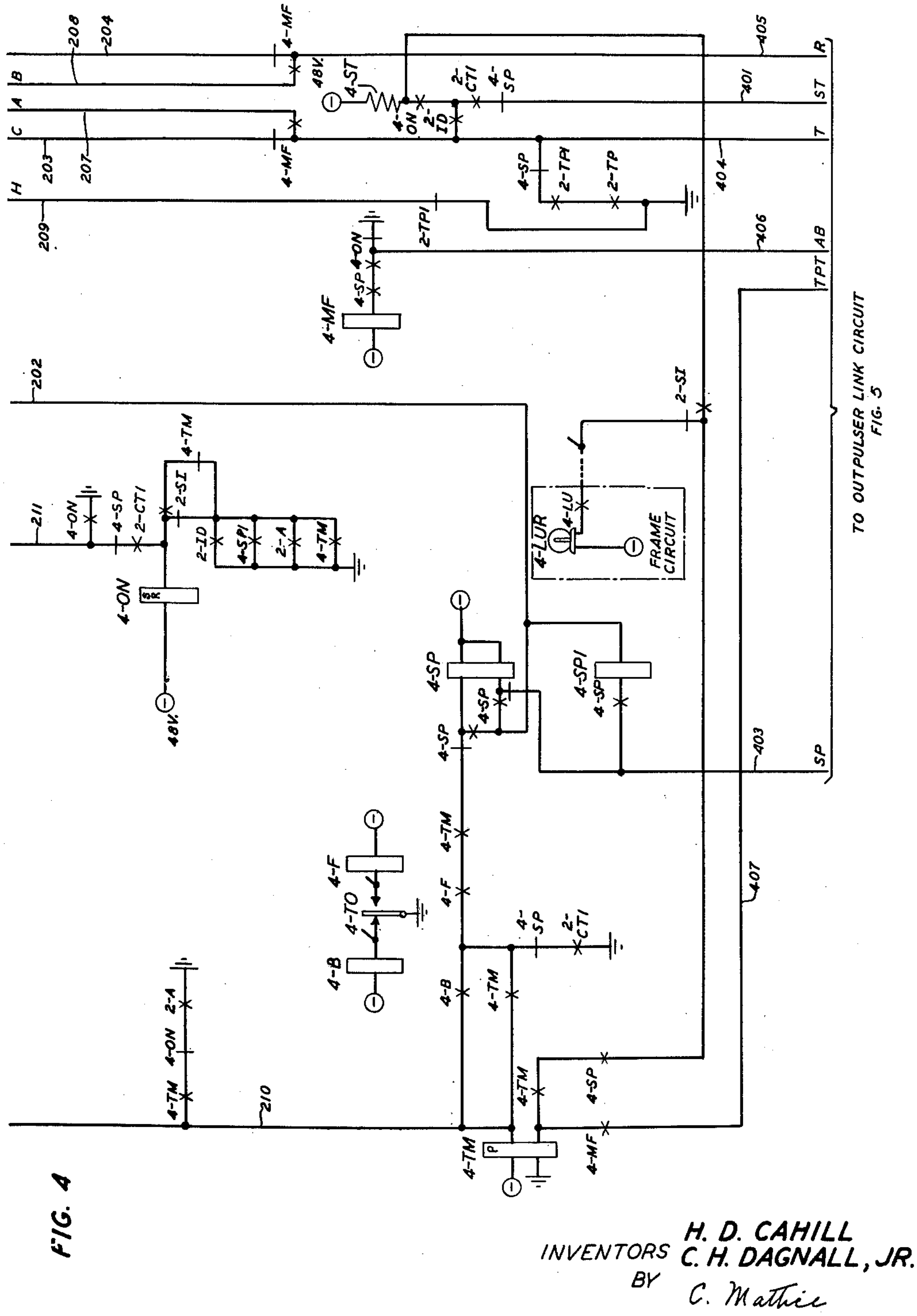
FIG. 4 shows the remainder of the trunk circuit.
Figure 5:
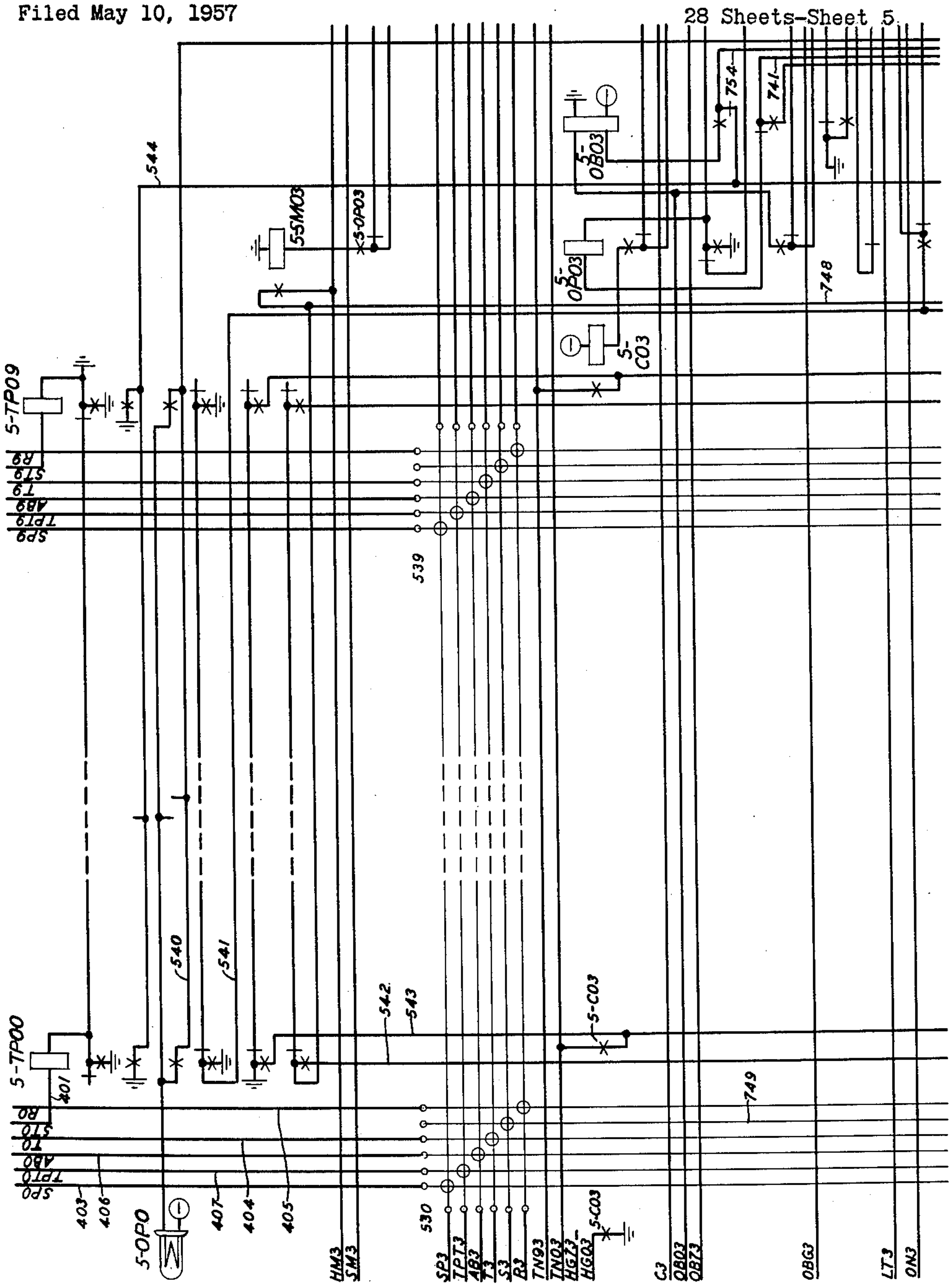
FIGS. 5 to 8 show the outpulser link circuit.
Figure 6:
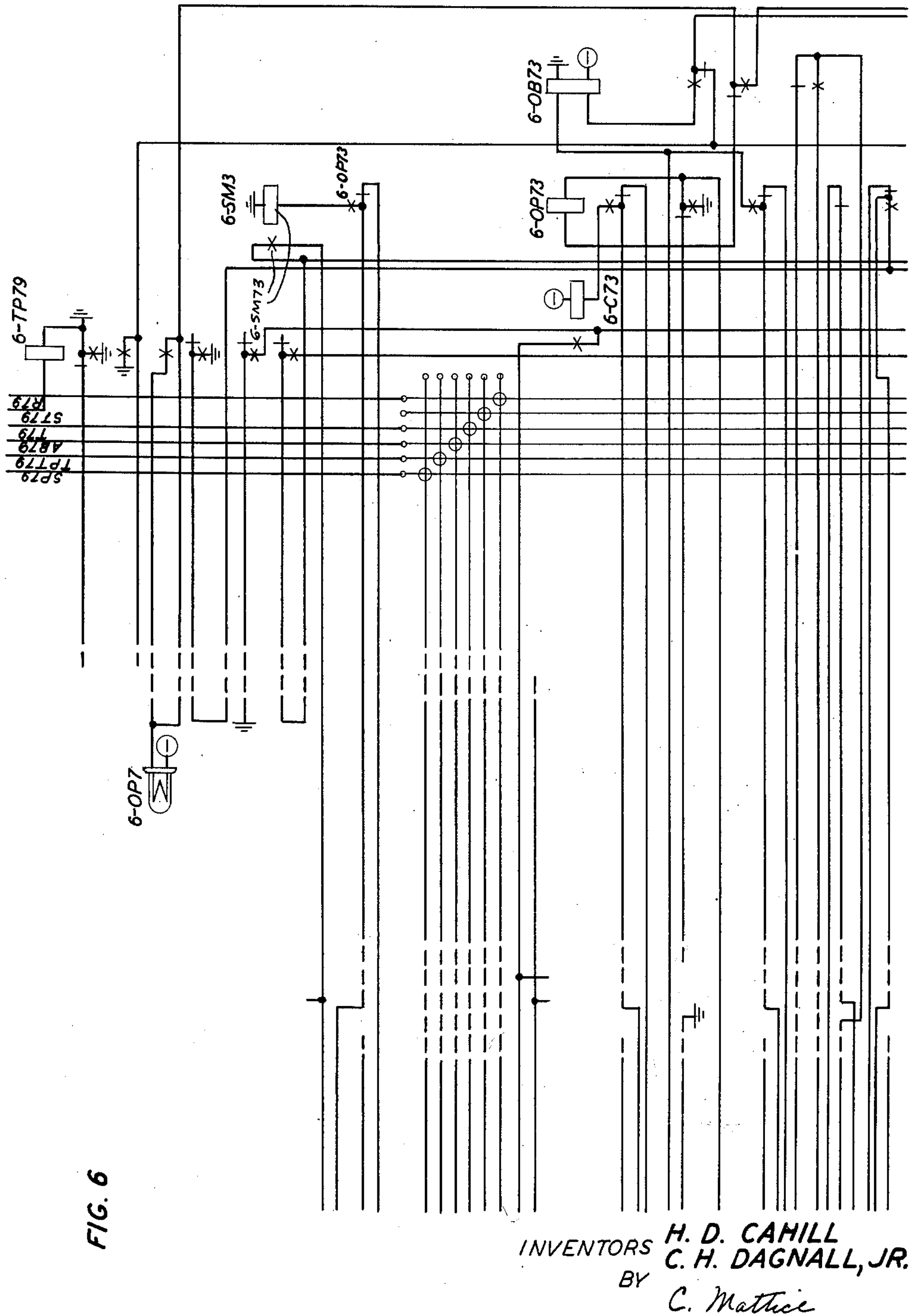
Figure 7:
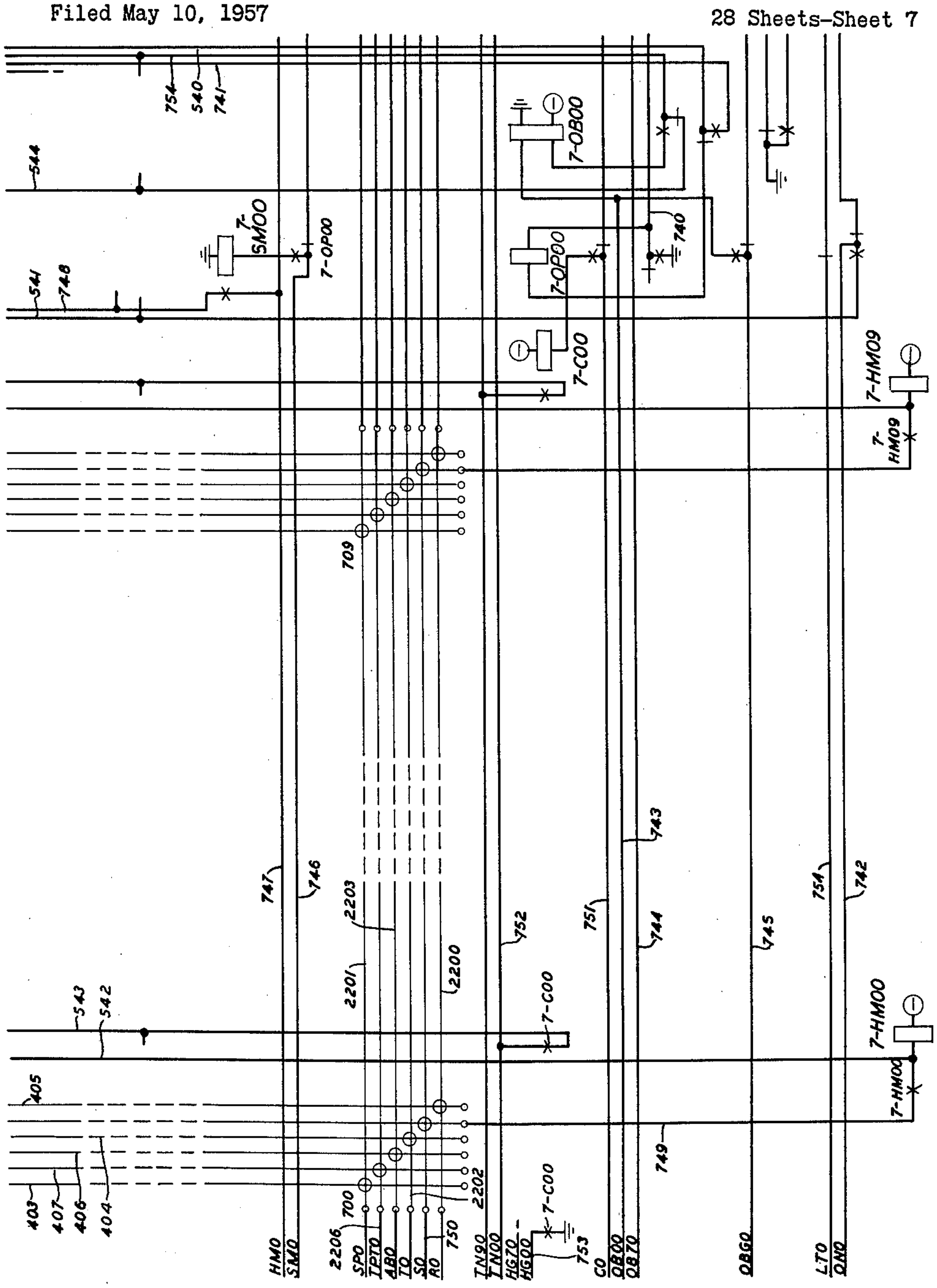
Figure 8:
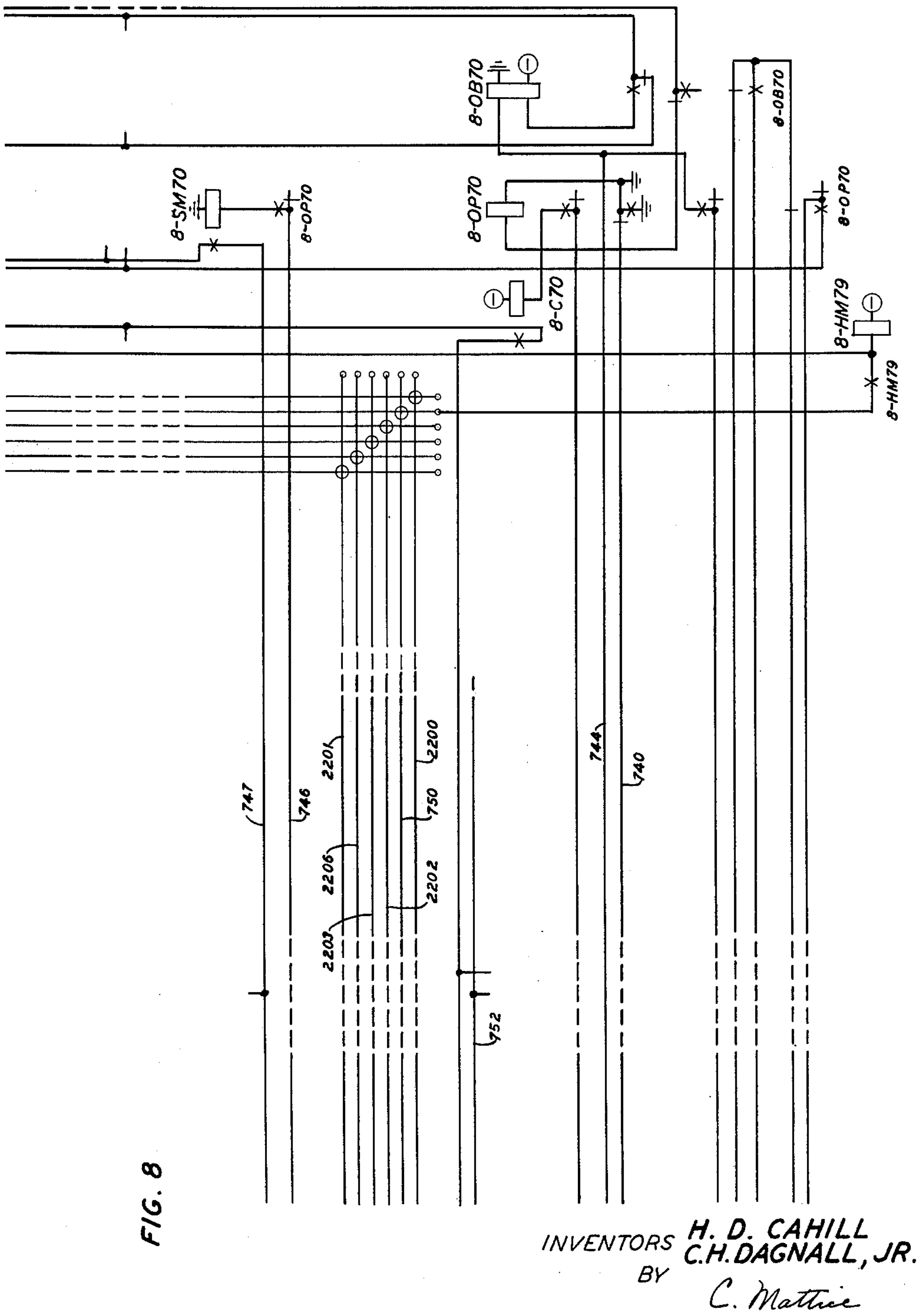
Figure 9:
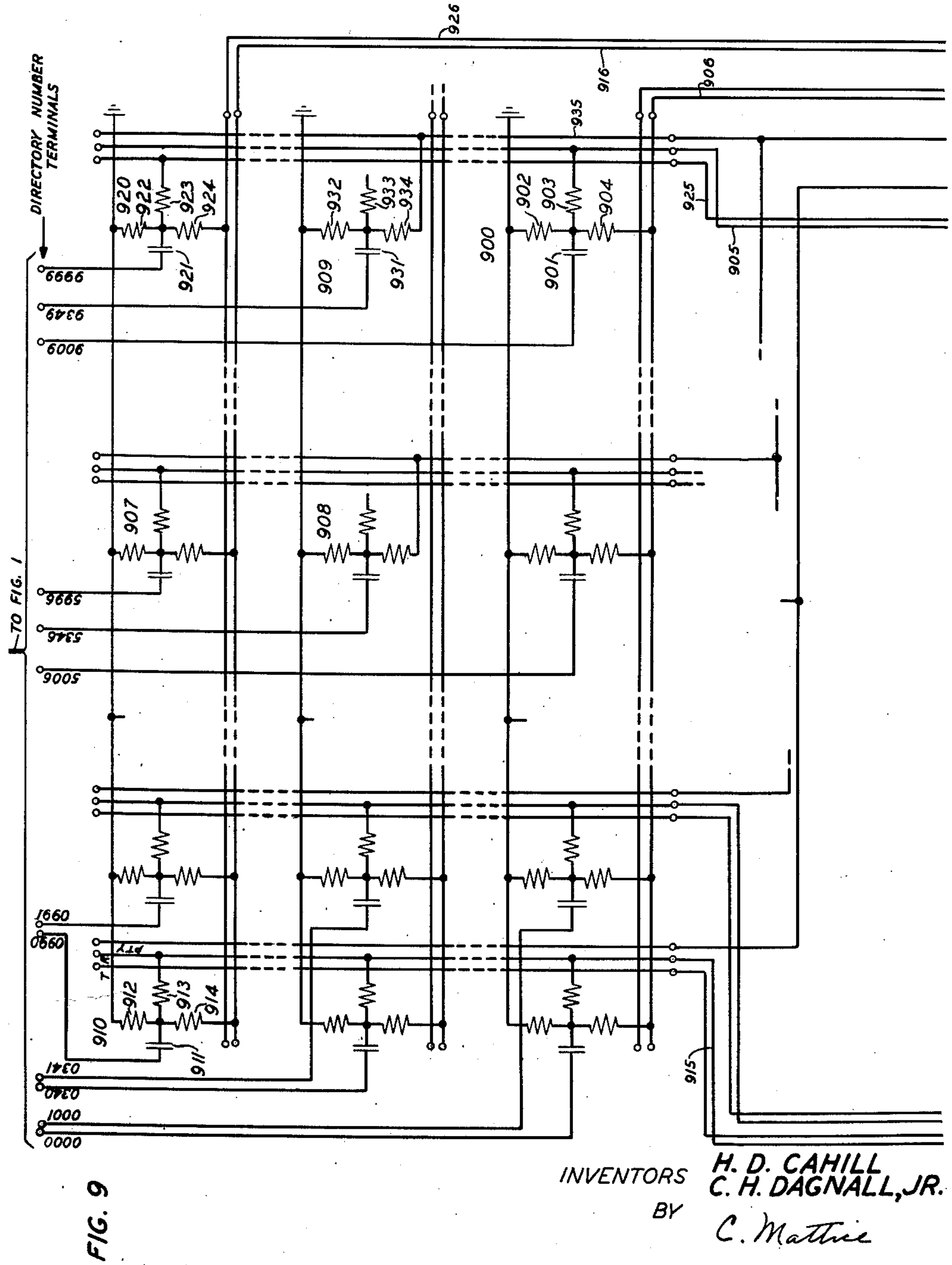
FIGS. 9 to 13 show the number network and bus circuit, FIG. 9 showing the primary bus circuit FIGS. 10 and 11 showing a plurality of transfer relays for distinguishing between tip and ring party subscribers, and FIGS. 12 and 13 showing the secondary number network.

When the subscriber at a substation, for example substation 100, dials designation representing a tandem call a trunk circuit such as the trunk circuit of FIGS. 2 and 4 is seized by the central office switching equipment and a connection is set up to it. At the same time, the marker which controls the switching equipment passes party information to the trunk. When the called number has been transmitted by the central office control equipment to the tandem office, the trunk initiates the operation of the outpulser link, which then sets up a connection between the trunk and an idle outpulser, such as shown in FIGS. 20 to 26, after which the trunk passes the party information to the outpulser. When the party information has been registered in the outpulser, it seizes the identifier of FIGS. 14 to 19 through a preference circuit and passes the party information to the identifier. The identifier registers the party information, causes the oscillator to apply a 5800-cycle signal to the sleeve of the calling line and prepares to scan the output conductors of the number network and bus circuit.

The sleeve conductor of the calling line is connected to a terminal individual to the line directory number in the number network and bus circuit of FIGS. 9 to 13. In this circuit the identification tone signal passes through a blocking capacitor and translating resistors of a primary network to a secondary network in the bus circuit. For each office there is a set of output conductors for the thousands digit, for the hundreds digit, for the tens digit, and for the units digit of the suscriber's directory number. To scan the output conductors of an office for the directory number, the identifier connects ten amplifier detectors to one set of output conductors to look for the identification tone signal. If a signal is fund, the amplifier detector gives an output signal to the outpulser. The sets of conductors are scanned in the order indicated above; namely, thousands, hundreds, tens, and units.

For offices using two party lines, the sleeve conductor of a two party line is connected to two points in the primary number network. The primary network is connected to the secondary network over two sets of conductors, one for ring party and individual subscribers and the other for tip party subscribers. The ring party conductors are normally connected to the secondary network and a series of transfer relays are provided which are operated when the identifier receives an indication that the calling party is a tip party subscriber. With these transfer relays operated, the tip party conductors outgoing from the primary network are connected to the secondary network.

In buildings with more than one office, a separate number network and bus circuit is provided for each office. To find the office from which the call is originating, the identifier scans the thousands output leads of the different offices until the identification signal is found, after which the hundreds, tens, and units output conductors of that office are scanned. The thousands digit is identified at the same time that the office is identified.

Occasionally the identification signal may be mutilated by interference from the office switches. This may cause the identification of the office or of a digit to be missed. Under this condition, the identifier will recycle. If the office is not identified on the first attempt, the identifier will scan the hundreds output conductors during recycle. If the office is identified but some other digit is missed, the identifier on recycle will scan only the output conductors corresponding to the missing digit. The progress of scanning is timed by a relay interrupter in the identifier. During office scanning it is necessary to provide time for the checking feature to function so that scanning can be switched to digit scanning in the identified office as soon as that office is found. Only one identifier can be used at a time in offices having a common trunk group and therefore the interrupter is speeded up as soon as the office is found.

As previously mentioned, scanning of the output conductors of the number network and bus circuits is performed by connecting a set of amplifier detectors to each lead of the set. The amplifier detector that receives a signal amplifies it and checks its frequency with the aid of tuned amplifier stages, then individual cycles are counted up to a point where the amplifier detector can be sure that the signal is not just a surge. It then operates two out of five register relays in the outpulser corresponding to the digit being scanned. The outpulser checks that the registration has been received in accordance with the two-out-of-five code and operates a check relay in the identifier if the check is satisfied. A check relay is operated in the identifier for each digit. During office identification any signal causes an office check indication to be transmitted to the identifier, which immediately transfers from office scanning to digit scanning within the office identified. After the office check signal has been transmitted, the thousands digit (or hundreds digit) is registered and checked the same as the other digits.

Upon completion of scanning, if all digits are identified and all digit checks in the outpulser are satisfied the outpulser releases the identifier. If the identifier fails to identify at least one digit after two attempts it signals the outpulser that it has completed its work. This signal causes the outpulser to make a trouble record, release the identifier, and then seize the other identifier if two are provided.

After the identifier has been released, the outpulser prepares to transmit the calling line number, as registered in it, to the tandem office. For this purpose it uses multifrequency code pulses and is provided with a set of transistor oscillators for generating the necessary frequencies. As is customary, a key pulse signal is sent to prepare the multifrequency receiving circuit in the tandem office for receiving the code pulses. Following the key pulse signal an information digit is transmitted which indicates that the automatic identification has been successful, that trouble has prevented successful identification, or that the subscriber is located on a multiparty line. For a successful identification, the office code is next transmitted, this code being derived by cross connections associated with the office register relay of the identified office, and thereafter the numerical digits of the calling line number. If a trouble condition prevents the identification of the calling line number and the corresponding information digit is transmitted, no additional digits are sent out and the outpulser releases following the information digit. Similarly, only an information digit is sent out if a calling line is identified as a multiparty subscriber. When the outpulsing has been completed, the outpulser releases itself and the outpulser link.

*Detailed Description*

The calling office schematically shown in FIG. 1 is assumed to be a crossbar office of the type disclosed in the above-identified patent to W. W. Carpenter. Assume further that the subscriber at substation 100, which is on a single party or individual line, originates a call for a subscriber in a distant office accessible to the office of FIG. 1 only through a tandem office equipped for automatic message accounting. When the call is originated, the equipment at the office of FIG. 1 functions as described in the above-identified Carpenter patent to connect the calling substation 100 through the line link switches 101 to the district junctor 102. The calling substation is also connected with a register sender (not shown) in which the designation of the wanted line is registered in response to the operation of the substation dial, after which the office code of the designation is transferred to a marker which determines the route to be used in reaching the wanted office. Recognizing that the route extends through the tandem office, the marker selects an idle outgoing trunk circuit such as the trunk circuit shown in FIGS. 2 and 4 and operates the district and office link switches 103 to connect the district junctor 102 with that trunk. After this connection has been set up, the marker releases and the register sender transmits the called line designation to the tandem office. The sender, in completing its functions, operates relays 2501 and 2520 in the district junctor so that, when the register sender releases, substation 100 is connected through the line link switches 101, contacts of relays 2501 and 2520, and the district and office switches 103 to conductors 104 and 105 of the trunk circuit leading to the tandem office. Conductor 107 is used by the marker in testing for an idle trunk and after it selects the trunk of FIGS. 2 and 4 it connects ground to conductor 107 to mark the trunk busy. After the marker releases and while the register sender is still connected with the district junctor 102, ground is supplied to conductor 107 over a relay in the district junctor. When the calling line is connected through to the trunk circuit, this ground is removed and the trunk is held busy as will be described hereinafter. Conductor 106 is used only if the calling substation is a tip party.

A circuit is normally closed over the interoffice trunk conductors between the outgoing trunk circuit of FIGS. 2 and 4 at the originating office and the incoming trunk circuit 300 at the tandem office, which may be traced from battery through the left winding of relay 3–A in the tandem office, back contact of relay 3–T (not shown), upper left winding of repeating coil 3–R, conductor 200, back contact of relay 4–MF, upper winding of retard coil 2–T, upper windings of relays 2–CS1 and 2–CS, lower windings of relays 2–CS1 and 2–CS, lower winding of retard coil 2–T, back contact of relay 4–MF, conductor 201, lower left winding of repeating coil 3–R, back contact of relay 3–T to ground through the right winding of relay 3–A. The current flow in this circuit is such that relay 2–CS is normally operated and the presence of the lower windings of relays 2–CS and 2–CS1 in the circuit prevents the operation of relay 3–A.

When the district and office link switches 103 have been operated and while the register sender is still attached to the district junctor 102, a trunk test circuit is cloesd by the sender which includes a loop circuit in the sender, completing a circuit through the windings of relay 2–A which may be traced from battery through the upper winding of relay 2–A, back contacts of relays 2–RV and 4–SP1, conductor 104, through the switches 103 to the loop circuit in the sender and back through the switches 103, conductor 105, front contact of relay 2–CS, back contacts of relays 4–SP1 and 2–RV to ground through the lower winding of relay 2–A. Relay 2–A is marginal and does not operate in the trunk test circuit. When trunk test has been completed and the sender is ready to transmit the called line designation to the tandem office, the resistance in the loop circuit is reduced so that relay 2–A operates. With relay 2–A operated, a shunt is closed around the lower windings of relays 2–CS and 2–CS1, increasing the current flow in the outgoing supervisory circuit so that relay 3–A operates.

Relay 3–A, in operating, closes a start circuit for the sender link 301 which functions to connect the incoming trunk circuit 300 with an idle tandem sender 302 and its associated multifrequency receiving circuit 303. Relay 3–T (not shown) is operated and relay 3–TR is normal at this time to connect the interoffice trunk conductors to the multifrequency receiving circuit. For a complete description of a tandem office of the type with which the present circuit is designed to function, reference may be made to the above-identified application of Breed et al.

When relay 2–A operates, it closes a circuit for operating relay 4–ON which may be traced from ground, over front contact of relay 2–A, back contact of relay 2–SI, to battery through the winding of relay 4–ON. With relay 4–ON operated, a circuit is closed from ground over a front contact of relay 4–ON, conductor 211, back contact of relay 2–CS2 to battery through the winding of relay 2–ON1. Relay 2–ON1 operates in this circuit.

When the tandem sender is ready to receive the designation, it operates a relay (not shown) for a short measured interval as a start-send signal so that the connection of battery and ground to the trunk conductors 200 and 201 is briefly reversed, thereby causing relay 2–CS to release and relay 2-CS1 to operate. With relay 4–ON operated, the circuit of relay 2–A remains closed after relay 2–CS releases. With relay 2–CS1 operated, a circuit is closed from battery through the upper windings of relays 2–RV and 2–CS2 in parallel, over front contacts of relays 4–ON and 2–CS1 to ground, causing relays 2–RV and 2–CS2 to operate. Relay 2–CS2 locks in a circuit from battery through its lower winding, front contact of relay 2–CS2, conductor 211 to ground over a front contact of relay 4–ON.

Relay 2–RV, in operating, reverses the connection of battery and ground through the windings of relay 2–A to conductors 104 and 105 to transmit the start-send signal to the sender in the originating office. At the end of the signal, relay 2–CS reoperates and relay 2–CS1 releases, in turn releasing relay 2–RV to terminate the start-send signal. With relay 2–CS2 operated, the operating circuit for relay 2–ON1 is opened but relay 2–ON1 is held operated over its own front contact and a front contact of relay 2–RV. When relay 2–RV releases, the locking circuit of relay 2–ON1 is also opened, and that relay releases after an interval determined by its slow-to-release characteristic. When relay 2–ON1 releases, a new operating circuit is closed for relay 2–RV from ground over back contacts of relays 2–CS1, 4–MF, 2–ON1, front contact of relay 2–CS2, back contact of relay 4–SP to battery through the lower winding of relay 2–RV. When relay 2–RV operates at this time, it locks in a circuit from battery through its lower winding, its own front contact, back contact of relay 2–ON1 to ground over a front contact 2–CS2. Relay 2–RV again reverses the connection of battery and ground to the trunk conductors 104 and 105. This second reversal is delayed so that it does not interfere with the start-send signal and is for the purpose of supplying the proper potentials toward the calling station when the district junctor connects the calling station to the trunk.

When the originating sender has completed its functions and the calling line is connected through to the trunk circuit, so that relay 2–A is held operated under the control of the calling line, ground is removed from conductor 107 as previously mentioned, and the hold magnets of the line link switches 101 and the district and office link switches 103, which were previously held operated from the ground in the district junctor, are now held operated over conductor 107, front contact of relay 4–ON, winding of relay 2–CT, back contact of relay 2–ID to ground. Relay 2–CT operates in this circuit and closes an obvious circuit for operating relay 2–CT1. Relay 2–CT1, in operating, locks over its own front contact, front contact of relay 4–ON to ground. In addition, it closes a shunt around the winding of relay 2–CT, causing relay 2–CT to release, while maintaining the switch hold magnets operated.

A circuit is now closed from battery through resistor 4–ST, front contact of relay 4–ON, front contact of relay 2–CT1, back contact of relay 4–SP, conductor 401 to the winding of trunk preference relay 5–TP00 individual to this trunk circuit in the outpulser link circuit.

Assuming that no other trunk is seeking an outpulser at this time, a circuit is completed for trunk preference relay 5–TP00 over back contacts of the other preference relays of the trunk group, including relay 5–TP09, to ground. Relay 5–TP00 operates, closing the contacts shown in vertical alignment therewith. With relay 5–TP00 operated, battery through resistance lamp 5–OP0 is connected over a front contact of relay 5–TP00 and conductor 540 to contacts controlled by the busy relay 7–OB00 of the preferred outpulser circuit. Assuming that the preferred outpulser is idle, the circuit extends over a back contact of relay 7–OB00 to the winding of outpulser preference relay 7–OP00 and thence over conductor 740, back contacts of outpulses preference relays belonging to other trunk groups including relay 8–OP70 to ground. Relay 7–OP00 operates in this circuit.

If the preferred outpulses is busy, so that relay 7–OB00 is operated, the preference circuit extends over a front contact of relay 7–OB00, conductor 741, to contacts controlled by the outpulser busy relay of the outpulser having the next preference, in this case relay 5–OB03. It will also be seen that if a trunk in a higher numbered group, for example in group No. 7 has operated its outpulser preference relay 8–OP70, relay 7–OP00 cannot operate; but as soon as the outpulser is made busy due to its seizure by relay 8–OP70, the preference circuit for group No. 0 will be extended to the preference relay of the outpulser having the next preference.

With relays 5–TP00 and 7–OP00 operated as above described, ground is connected over a front contact of relay 5–TP00, conductor 541, front contact of relay 7–OP00 to conductor 742 leading to the selected outpulser.

Ground on conductor 742 completes a circuit through the winding of the outpulser off-normal relay 22–ON to battery. Relay 22–ON operates and locks over its own front contact and over the back contacts of relays 23–TA1 and 20–RL to ground. Relay 22–ON closes on obvious circuit for relay 22–OB. Relay 22–OB closes circuits for operating the outplser busy relays individual to each of the trunk groups in the outpulser link. One of these circuits may be traced from battery over a front contact of relay 22–OB, resistor 22–OBA, conductor 743, to ground through the upper winding of relay 7–OB00. Another circuit may be traced from battery over a front contact of relay 22–OB, resistor 22–OBH, conductor 744 to ground through the upper winding of relay 8–OB70. Relay 8–OB70 and the other outpulser busy relays operate in these circuits but relay 7–OB00 cannot operate since a circuit is closed from ground over a front contact of relay 22–OB, back contacts of relay 24–TRS and 24–TTB, conductor 745, front contact of relay 7–OP00 to conductor 743 in shunt of the winding of relay 7–OB00, thereby preventing the operation, at this time, of the outpulser busy relay for the trunk group which has selected the outpulser.

Relay 22–ON also connects ground to conductor 751 completing a circuit over front contact of relay 7–OP00 to battery through the winding of relay 7–C00. With relay 7–C00 operated, a circuit is closed from ground over a front contact of the trunk preference relay 5–TP00, conductor 543, front contact of relay 7–C00, conductor 752 to battery through the winding of relay 22–TKU0 to indicate that the units digit of the trunk number is 0. Relay 22–TKU0 operates and locks over its own front contact to ground over front contact of relay 22–ON. Relay 7–C00 also closes a circuit from ground over conductor 753 to battery through the winding of relay 22–TKT0 operating the latter relay to indicate that the tens digit of the trunk number is 0. Relay 22–TKT0 locks over its own front contact to ground over contact of relay 22–ON. This registration of the trunk number is used only if trouble arises and a trouble ticket is to be made.

Battery through resistor lamp 22–B is normally connected over the back contacts of relays 22–HMK and 23–ETMA to conductor 746. With relay 7–OP00 operated, a circuit is completed from battery on conductor 746 over front contact of relay 7–OP00 to ground through the winding of select magnet 7–SM00 individual to the selected outpulser in the No. 0 trunk group. Select magnet 7–SM00 operates in this circuit and closes a circuit from ground over front contact of relay 22–OB, back contact of relay 22–HMK, conductor 747, contact of select magnet 7–SM00, conductor 748, front contact of relay 5–TP00, conductor 542 to battery through the winding of hold manget 7–HM00 individual to the trunk circuit of FIGS. 2 and 4. Hold magnet 7–HM00 operates in this circuit.

With hold magnet 7–HM00 operated, crosspoint 700 is closed, connecting the trunk circuit of FIGS. 2 and 4 to the outpulser circuit of FIGS. 20 to 26. Magnet 7–HM00 connects its operating ground over its own front contact, conductor 749, contact of crosspoint 700, conductor 750, front contact of relay 22–ON to battery through the winding of relay 22–HMK.

The outpulser now makes a double connection test by means of relay 22–DCK to insure that one and only one trunk hold manget is operated and therefore that only one crosspoint is closed. With relay 22–HMK operated, a circuit is closed from battery through the winding of relay 22–HMK, left winding of relay 22–DCK, front contact of relay 22HMK to ground over front contact of relay 22–OB. Relay 22–HMK is held operated in this circuit. The operation of relay 22–HMK opens the original operating circuit for hold magnet 7–HM00, but the hold magnet is held operated over the above traced holding circuit for relay 22–HMK. If any other trunk hold magnet is being held operated, the holding ground for that hold magnet will appear on conductor 750, relay 22–DCK cannot operate and the call cannot proceed. Timing means, which will be described hereinafter, will cause a trouble ticket to be made and will bring about the release of the outpulser.

Assuming that no such trouble exists on the present call, relay 22–DCK will operate in the holding circuit for relay 22–HMK and hold magnet 7–HM00. Relay 22–DCK, in operating, closes a locking circuit for itself from battery through its right winding and over its own front contact, front contacts of relays 22–HMK and 22–OB to ground. Relay 22–DCK also short circuits its left winding to remove the resistance of that winding from the holding circuit for relay 22–HMK and hold magnet 7–HM00. With crosspoint 700 closed, the outpulser circuit is connected to the trunk circuit over five circuits which will be described hereinafter.

Relay 22–DCK, in operating, closes an obvious circuit for operating relay 22–TKCI. With relay 22–TKCI operated and the crosspoint 700 of the outpulser link closed, the outpulser prepares circuits for relays 22–I1, 22–I2, 22–I3, and 22–I4 leading to the trunk circuit. Relays 22–I1 and 22–I2 are used in crossbar type offices or in step-by-step offices, where the party indication is set up in the trunk, to indicate whether the identification tone will be found in the ring party or in the tip party field of the number network. In the case of a panel type office, the trunk circuit does not have this information and relays 22–I3 and 22–I4 are used to tell the outpulser that it must make party test or test for the removal of ground. For the latter test the outpulser is called in after conversation ends. Since the present call is concerned with a crossbar type office, the functions of relays 22–I3 and 22–I4 will be ignored at this time.

Since it was assumed that the calling subscriber has individual line service, the operation of relay 22–TKCI at this time results in the completion of a circuit from battery through the winding of relay 22–I1, back contacts of relays 24–TRS and 24–MF, front contact of relay 22–TKCI, conductor 2200, contact of crosspoint 700, conductor 405, back contact of relay 4–MF, conductor 204, back contact of relay 4–SP, conductor 209, back contact of relay 2–TP1 to ground. Relay 22–I1 operates in this circuit and closes a circuit from battery through the left winding of relay 24–RP, front contact of relay 22–I1 to ground. Relay 24–RP operates in this circuit and closes a locking circuit for itself from battery through its right winding and over its front contact, winding of relay 24–PK, back contact of relay 23–IRL to ground over a front contact of relay 22–ON. With relay 24–PK operated, a circuit is closed which checks that only one of the relays 22–I1 to 22–I4 has been operated and that relay 22–SPL has not been operated. This circuit may be traced from battery through the winding of relay 24–IK, front contact of relay 24–PK, back contacts of relays 22–I4, 22–I3, and 22–I2, front contact of relay 22–I1, back contact of relay 22–SPL to ground. Relay 24–IK operates in this circuit and locks over its own front contact to ground over a front contact of relay 22–ON.

With relay 24–IK operated, a circuit is closed from ground through the right winding of relay 22–SPL, back contacts of relays 24–TRS and 24–GRT, front contact of relay 24–IK, back contact of relay 22–TNC, front contact of relay 22–TKCI, conductor 2201, contact of crosspoint 700, conductor 403, back contact and lower winding of relay 4–SP to battery. Relay 22–SPL operates in this circuit but the resistance of the right winding of relay 22–SPL is so high that relay 4–SP cannot operate at this time. Relay 22–SPL closes a circuit for relay 24–SPL1 and the latter relay operates, connecting ground through the low resistance left winding of relay 22–SPL in parallel with the high resistance winding of the latter relay. Relay 24–SPL1, when operated, locks over its own front contact to ground over a contact of relay 22–ON.

The reduction of the resistance in the circuit of relay 4–SP operates relay 4–SP, which then locks through its two windings in parallel, over two of its front contacts, conductor 202 to ground over a front contact of relay 4–ON. Relay 4–SP, in operating, disconnects its lower winding from conductor 403 and connects ground on conductor 202 through the winding of relay 4–SP1 to conductor 403.

With relay 4–SP operated, the circuit of relay 22–I1 is opened and that relay releases. The connection of ground to conductor 403 releases relay 22–SPL. The release of relay 22–SPL is a check that the splitting relay 4–SP of the trunk circuit has been operated and with relay 24–SPL1 locked operated, a circuit is closed from battery through the winding of relay 24–TRS, front contact of relay 24–SPL1, back contacts of relays 22–I4 to 22–I1 and 22–SPL to ground.

Relay 24–TRS, in operating, disconnects ground from conductor 745, removing the shunt from the winding of outpulser busy relay 7–OB00 and permitting that relay to operate. When relay 22–HMK operated, as above described, it disconnected battery from conductor 746 releasing select magnet 7–SM00. The operation of relay 4–SP opens the circuit of relay 5–TP00 so that, if no other trunk is waiting for an outpulser, the control circuit of the outpulser link is restored to normal. The connection between the trunk of FIGS. 2 and 4 and the outpulser of FIGS. 20 to 26 by way of crosspoint 700 is maintained under the control of hold magnet 7–HM00 which is held operated under the control of the outpulser as above traced.

With relay 24–TRS operated, relay 22–SPL is disconnected from conductor 2201 and that conductor is extended over a front contact of relay 22–TKCI, back contact of relay 22–TNC, front contact of relay 24–IK, back contact of relay 24–GRT, front contact of relay 24–TRS, back contact of relay 23–ETM1 to battery through resistor 22–SP1. Conductor 2201 is connected, as previously traced, to conductor 403, front contact of relay 4–SP, winding of relay 4–SP1 to ground on conductor 202, operating relay 4–SP1.

The outpulser now makes a test to insure that the call has not been abandoned. For this purpose, a circuit is closed from battery through the left winding of relay 22–L, back contacts of relays 24–PT1 and 22–TNC, lower winding of retard coil 22–LR, front contact of relay 24–TRS, back contact of relay 24–MF, front contact of relay 22–TKCI, conductor 2200, contact of crosspoint 700, conductor 405, back contact of relay 4–MF, conductor 204, front contacts of relays 4–SP, 4–SP1, and 4–ON to conductor 105 and thence through the substation 100 as previously described back to conductor 104, front contact of relay 4–SP1, conductor 203, back contact of relay 4–MF, conductor 404, contact of crosspoint 700, conductor 2202, front contact of relay 22–TKCI, back contact of relay 24–MF, front contact of relay 24–TRS, upper winding of retard coil 22–LR, back contacts of relays 22–TNC and 24–PT1 to ground through the right winding of relay 22–L. Assuming that the call has not been abandoned, relay 22–L operates in this circuit, in turn operating relay 22–L1. Relay 22–L1, in operating, closes a substitute circuit for relay 4–SP1.

Relay 4–SP1, in operating, also disconnects the windings of relay 2–A from the trunk conductors 104 and 105 and relay 2–A releases. The release of relay 2–A opens one circuit for relay 4–ON, but relay 4–SP1 closes a substitute holding circuit for relay 4–ON. In addition, the shunt closed by relay 2–A around the lower windings of relays 2–CS and 2–CS1 is replaced at this time by a similar shunt over a front contact of relay 4–SP1.

With relay 22–L1 operated, the outpulser is ready to connect with the identifier. Relay 22–L1 closes a circuit from battery through resistance lamp 22–B, front contacts of relays 22–HMK, 22–L1, and 24–PK, back contacts of relays 24–GRT and 23–IRL through the winding of outpulser preference relay 22–OP to ground over back contacts of the preference relays of other outpulsers. If no other outpulser is seeking an identifier, preference relay 22–OP operates, in turn operating outpulser connector relay 22–OCA.

Two identifiers are provided and each outpulser normally uses the two identifiers alternately as determined by relays 20–W and 20–Z as will be described hereinafter. As soon as relay 22–ON operates, a "downcheck" is made to determine that the digit check relays and other special signal indicating relays, which may have been operated during a prior use of the outpulser, have all released. This circuit may be traced from battery through the winding of relay 22–DW, back contacts of relays 24–IF, 24–2TR, 24–2TR, 24–1TR, 23–UK, 23–TK, 23–HK, 23–THK, 23–OFK, 25–PTY, 25–SO, ad 24–TTB, front contacts of relay 22–ON to ground. Relay 22–DW operates in this circuit. When relay 22–DW operates, a is closed from battery through the winding of relay 20–W, back contact of relay 20–Z, front contact of relay 22–DW to ground. Relay 20–W operates and closes a locking circuit for itself which extends as above traced except that it extends over a contact of relay 20–W in place of over a contact of relay 22–DW. With connector relay 22–OCA and relay 20–W operated, a circuit is closed from battery through the winding of relay 25–ICA0, front contact of relay 22–DW, back contact of relay 20–Z, front contact of relay 20–W, front contact of relay 22–OCA to ground. Relay 25–ICA0 operates in this circuit to prepare a plurality of circuits connecting the outpulser with the identifier of FIGS. 14 to 19. Relay 25–ICA0 may be either a multicontact relay or a plurality of relays connected in parallel.

With relay 25–ICA0 operated, a circuit is closed from ground over a back contact of relay 23–IRL, front contact of relay 25–ICA0, conductor 1600, normally closed contacts of relays 18–EP and 17–PC2 to battery through the winding of identifier off-normal relay 16–ON. Relay 16–ON operates and locks over its own front contact to conductor 1600 so that it remains operated under the control of the outpulser. Relay 16–ON supplies off-normal ground to control all of the functions of the identifier. Since the outpulser has received an indication that the calling subscriber is a ring party and relay 24–RP is operated, a circuit is closed from ground over front contacts of relays 24–RP, 22–OCA, and 25–ICA0, conductor 1602 to battery through the winding of relay 16–RP, operating relay 16–RP.

When relay 25–ICA0 operates to connect the identifier with the outpulser, a circuit is closed from battery through the winding of relay 22–TNC, front contact of relay 25–ICA0 to ground, operating relay 22–TNC. Relay 22–TNC, in operating, closes a holding circuit for relay 22–L1 and disconnects battery from conductor 2201 thereby opening the operating circuit for relay 4–SP1. Relay 4–SP1 releases and again connects relay 2–A to the calling line, after which relay 2–A resumes control of relay 4–ON. Relay 4–ON is slow to release and remains operated during the interval between the release of relay 4–SP1 and the reoperation of relay 2–A.

The circuits are now ready to start identifying the calling line and with relay 22–TNC operated and relay 4–SP1 released, a circuit is closed from battery over back contact of relay 4–SP1, winding of relay 2–ID, front contact of relay 4–SP, conductor 204, back contact of relay 4–MF, conductor 405, contact of crosspoint 700, conductor 2200, front contact of relay 22–TKCI, back contact of relay 24–MF, front contact of relay 24–TRS, lower winding of retard coil 22–LR, front contact of relay 22–TNC, back contact of relay 23–IRL to ground. Relay 2–ID operates in this circuit and closes a circuit from battery through resistor 4–ST, front contacts of relays 4–ON and 2–ID, conductor 404, contact of crosspoints 700, conductor 2202, front contact of relay 22–TKCI, back contact of relay 24–MF, front contact of relay 24–TRS, upper winding of retard coil 22–LR, front contact of relay 22–TNC winding of relay 22–TNK to ground. Relay 22–TNK operates in this circuit, closing a holding circuit for relay 22–TNC. In addition, relay 22–TNK closes an obvious circuit for operating relay 24–TNKA which locks over its own front contact to ground over front contact of relay 22–ON.

Each trunk frame is equipped with two tone oscillators, one for each identifier. With relay 16–ON operated in the identifier, which may be assumed to be identifier No. 0 and relay 2–ID operated in the trunk circuit, a circuit is closed from ground over front contact of relay 16–ON, conductor 1603, front contact of relay 2–ID, conductor 206 leading to the No. 0 oscillator to render the oscillator effective. Relay 2–ID also connects tone supplied by the oscillator to conductor 205 over front contacts of relays 2–ID, 2–CT1 and 4–ON, conductor 107 through the district and office link switches 103, contacts of relays 2520 and 2501 in the district junctor 102, resistor 2500, sleeve contacts of the line switches 101 to conductor 130. Conductor 130 terminates in a cross-connecting terminal 131 which will be wired to a terminal in the number network of FIGS. 9 to 13 in accordance with the telephone designation of the substation 100.

The number network and bus circuit is similar to that described and claimed in the previously-identified patent to D. S. Barlow. The sleeve conductor of each line will be connected to a terminal in a set of terminals representing the equipment number or location of the line. In the number network there is a cross-connecting terminal for each of the ten thousand directory numbers which constitute a complete office. When a directory number is assigned to a subscriber substation, the equipment terminal connected with the sleeve conductor of the line will be cross connected to a directory terminal number in the primary network corresponding to the assigned directory number. Although terminals will be provided for each line location and each of the possible directory numbers, in order that there may be complete freedom in assigning line locations and directory numbers in a working office, some of the terminals in each set will usually remain vacant.

Each directory number terminal is connected to a termination network in the primary network and bus circuit comprising a blocking capacitor which is connected in multiple to a grounded resistor and to a pair of identifying resistors. For example, network 900 comprises capacitor 901, grounded resistor 902, and two identifying resistors 903 and 904.

Figure 10:
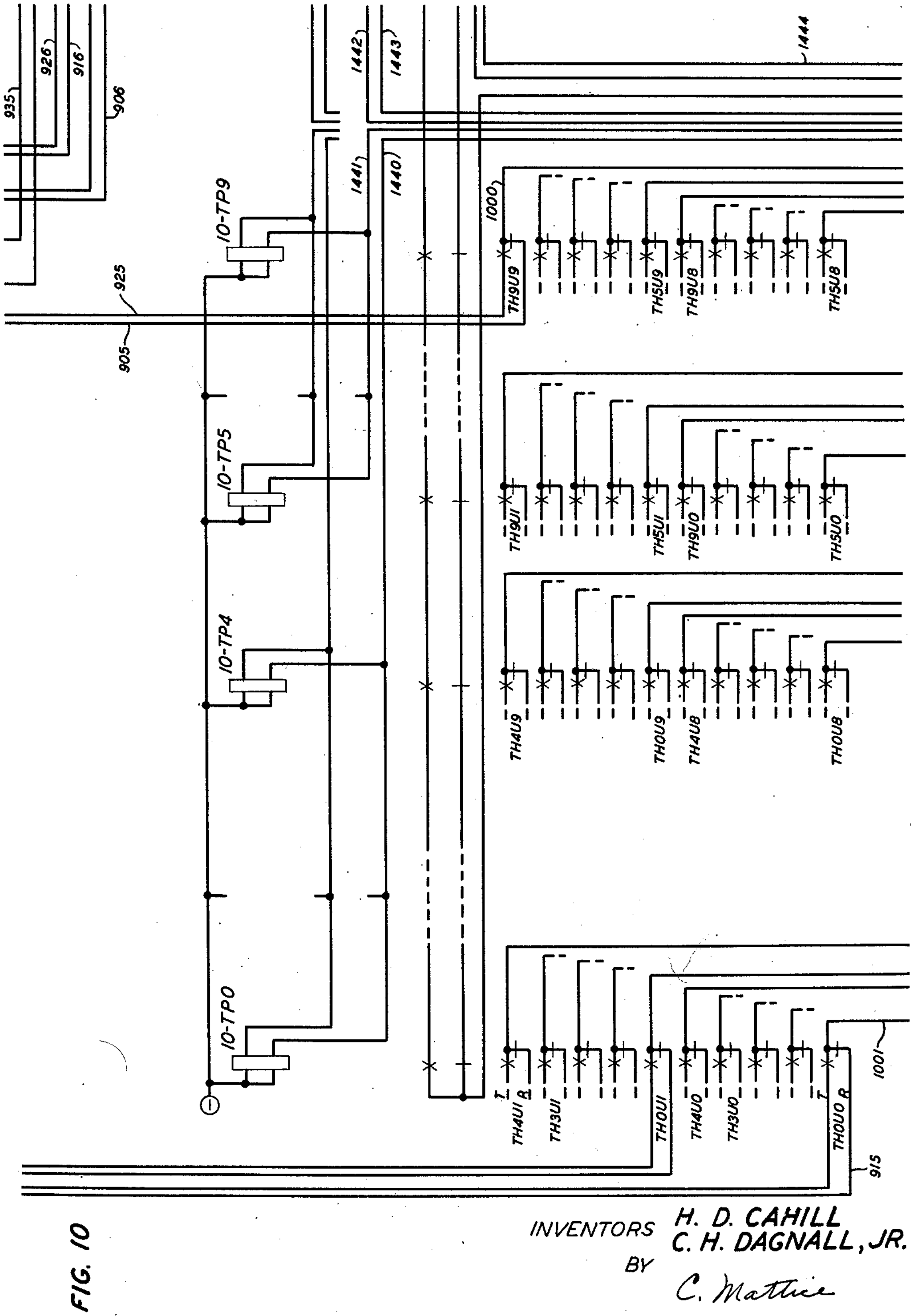
Figure 11:
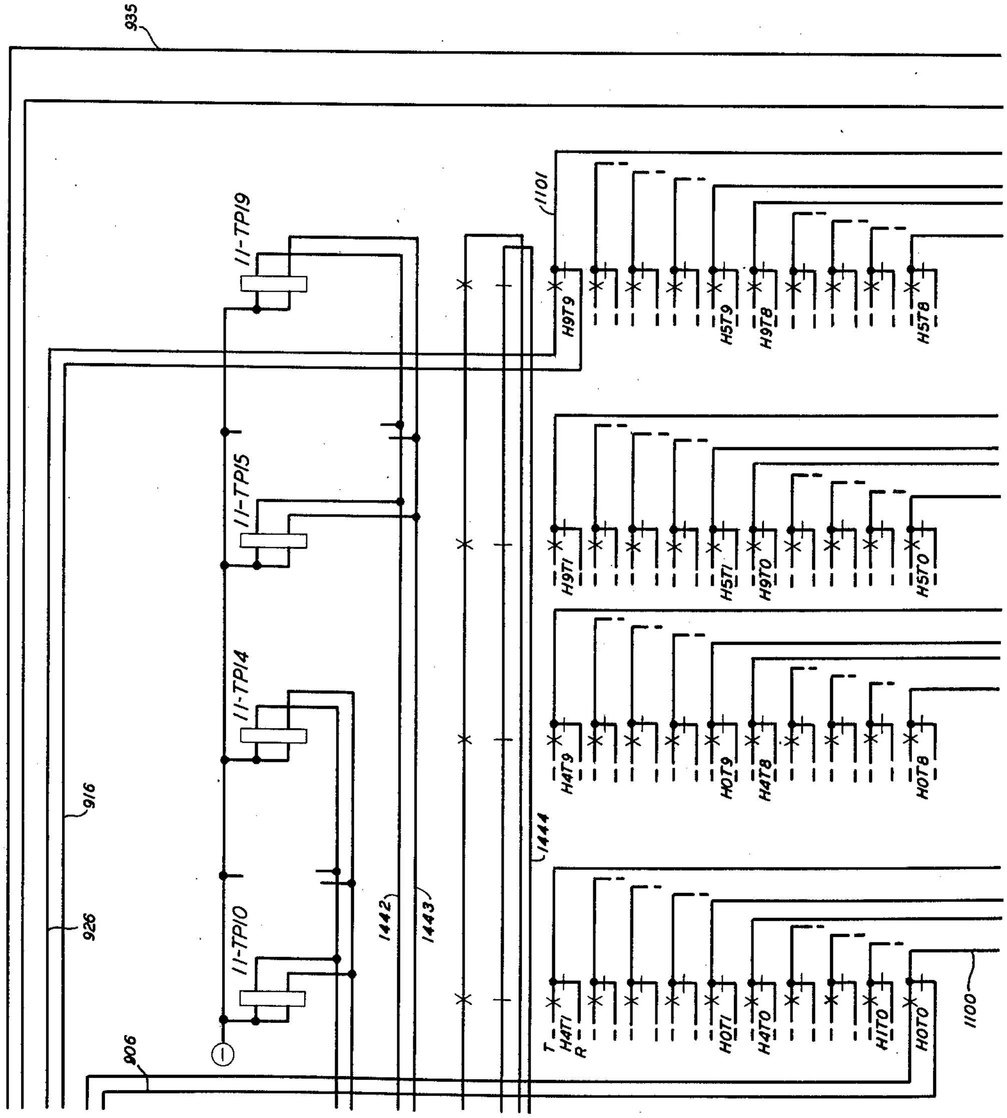

Since there is a termination network for each possible directory number, there will be ten thousand such networks. These networks are conveniently mounted in a coordinate arrangement and are associated with two groups of four hundred conductors or buses each. These groups of conductors may be arranged coordinately with respect to each other. As indicated in FIG. 10, the vertical conductors are identified by a 2-digit number, the first digit representing the thousands digit of a directory number and the second digit representing the units digit of a directory number. In other terms the designation of conductor 905, for example, may be represented as 9XX9. Similarly, the horizontal conductors are identified as indicated in FIG. 11 by a 2-digit number, the first digit representing the hundreds digit of the directory number, and the second digit representing the tens digit of the directory number. In other terms the designation of conductor 906, for example, may be represented as X00X.

It is evident from the arrangement that if, as shown, identifying resistor 903 is connected to conductor 905 and identifying resistor 904 is connected to conductor 906, the termination network 900 will designate a 4-digit number 9009 composed of the thousands and units digit applied to conductor 905 and the hundreds and tens digit applied to conductor 906. Ignoring for the moment the wiring of tip party and multiparty subscribers as indicated by networks 908, 909, and 920, it will be apparent from an inspection of FIG. 9 that one identifying resistor of each network in the horizontal row including network 900 is connected to conductor 906 while one identifying resistor of each network in the vertical row including network 900 is connected to conductor 905.

Figure 12:
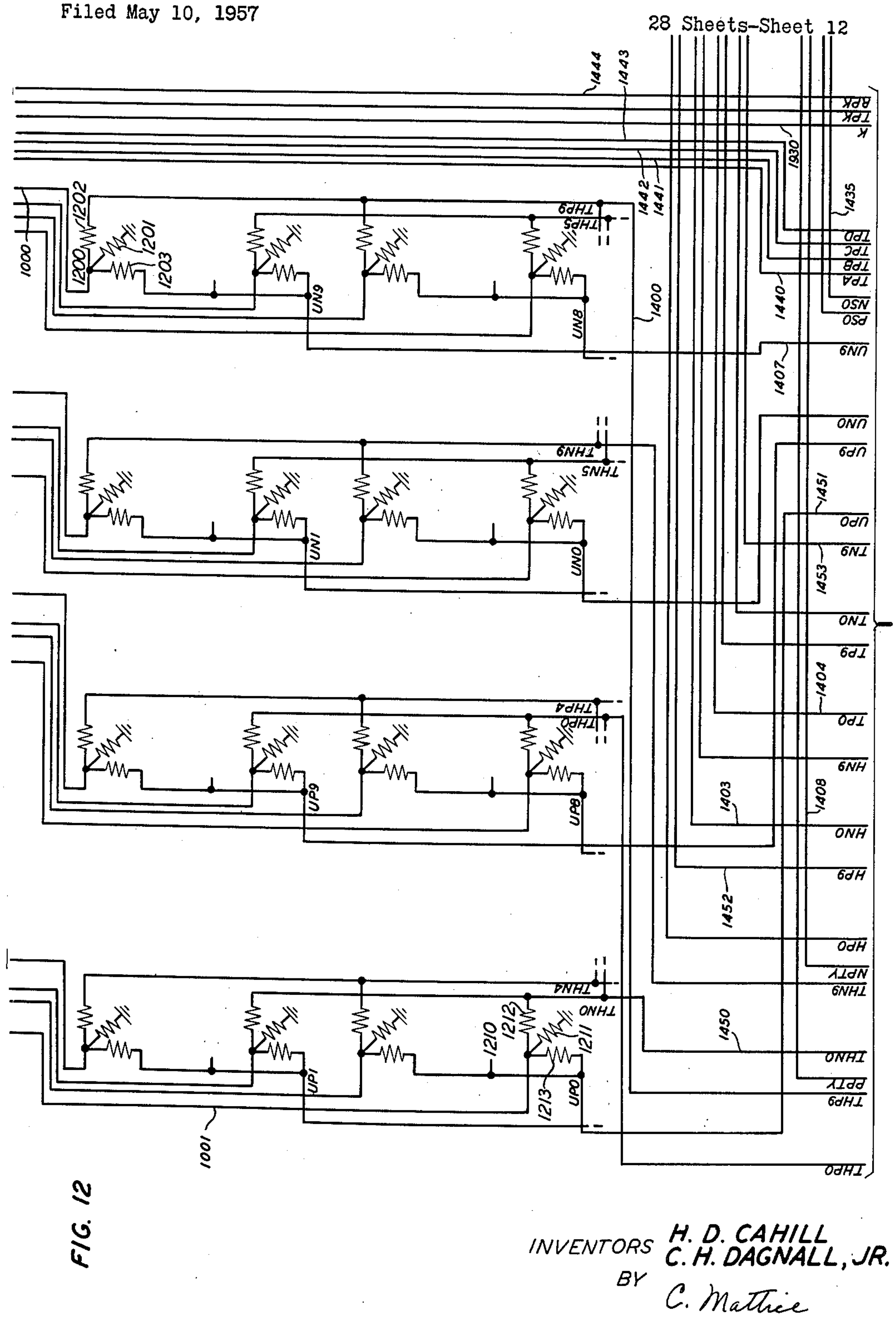
Figure 13:
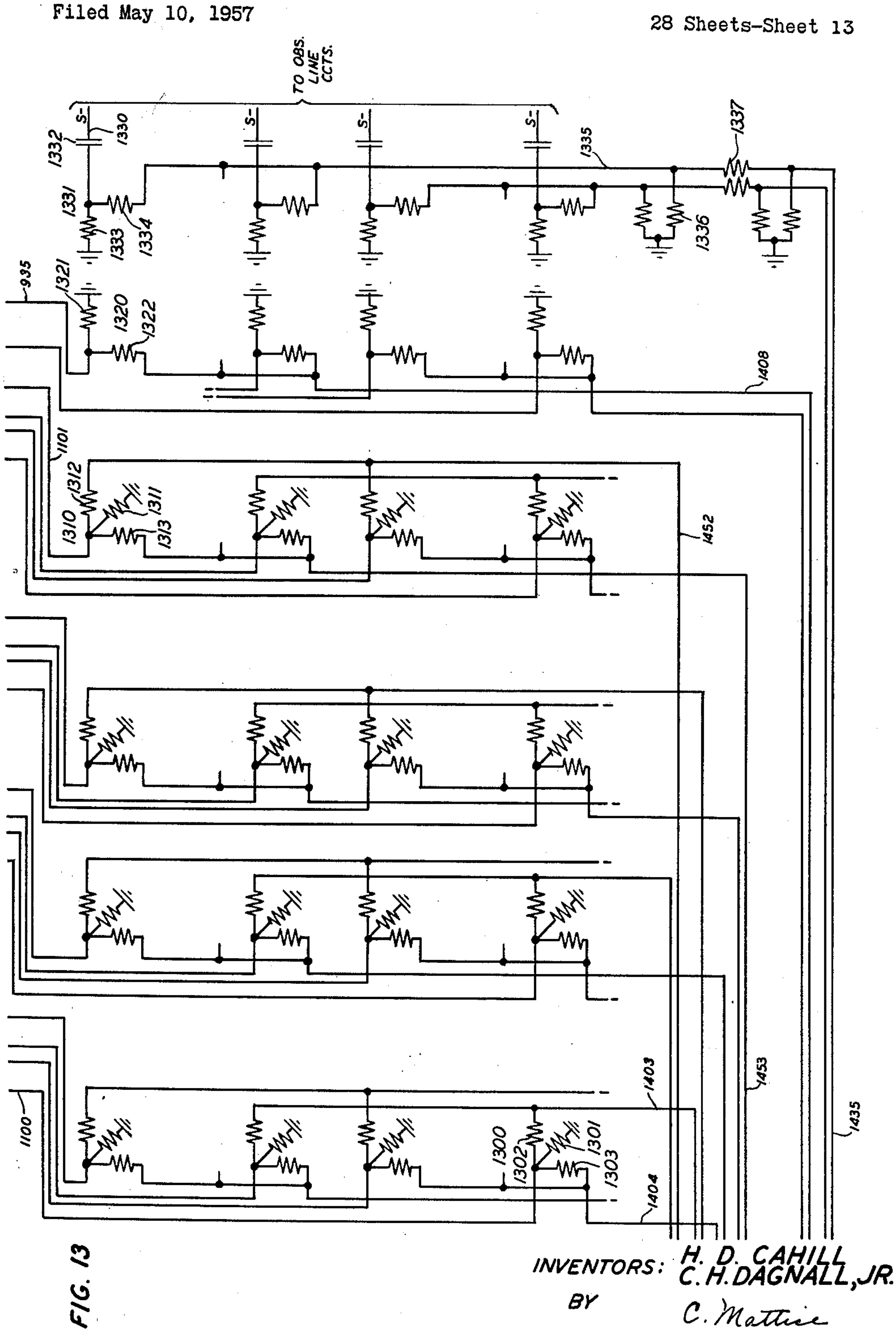

Conductor 905, as well as the other vertical conductors outgoing from the primary number network, are extended over back contacts of tip party switching relays 10–TP0 to 10–TP9 to the secondary number network of FIG. 12 which functions to separate the thousands and units digits. Similarly, conductor 906, as well as the other horizontal conductors outgoing from the primary number network, are extended over the back contacts of relays 11–TP10 to 11–TP19 to the secondary network of FIG. 13 which functions to separate the hundreds and tens digits.

Conductor 905 extends over a back contact of relay 10–TP9 to conductor 1000 which extends to network 1200 of the secondary network of FIG. 12 which comprises grounded resistor 1201 and the identifying resistors 1202 and 1203. Resistor 1202 is connected to conductor 1400 of a group of thousands conductors leading to the identifier of FIGS. 14 to 19 and identifies the thousands digit 9. Resistor 1203 is connected to conductor 1407 in a group of units conductors leading to the identifier and identifies the units digit 9. Similarly, conductor 906 is connected over a back contact of relay 11–TP10 to conductor 1100, which extends to network 1300 of the secondary network of FIG. 13. Network 1300 comprises grounded resistor 1301 and the identifying resistors 1302 and 1303. Resistor 1302 is connected to conductor 1403 in a group of hundreds conductors leading to the identifier and identifies the hundreds digit 0. Resistor 1303 is connected to conductor 1404 in a group of tens conductors leading to the identifier and identifies tens digit 0.

Figure 14:
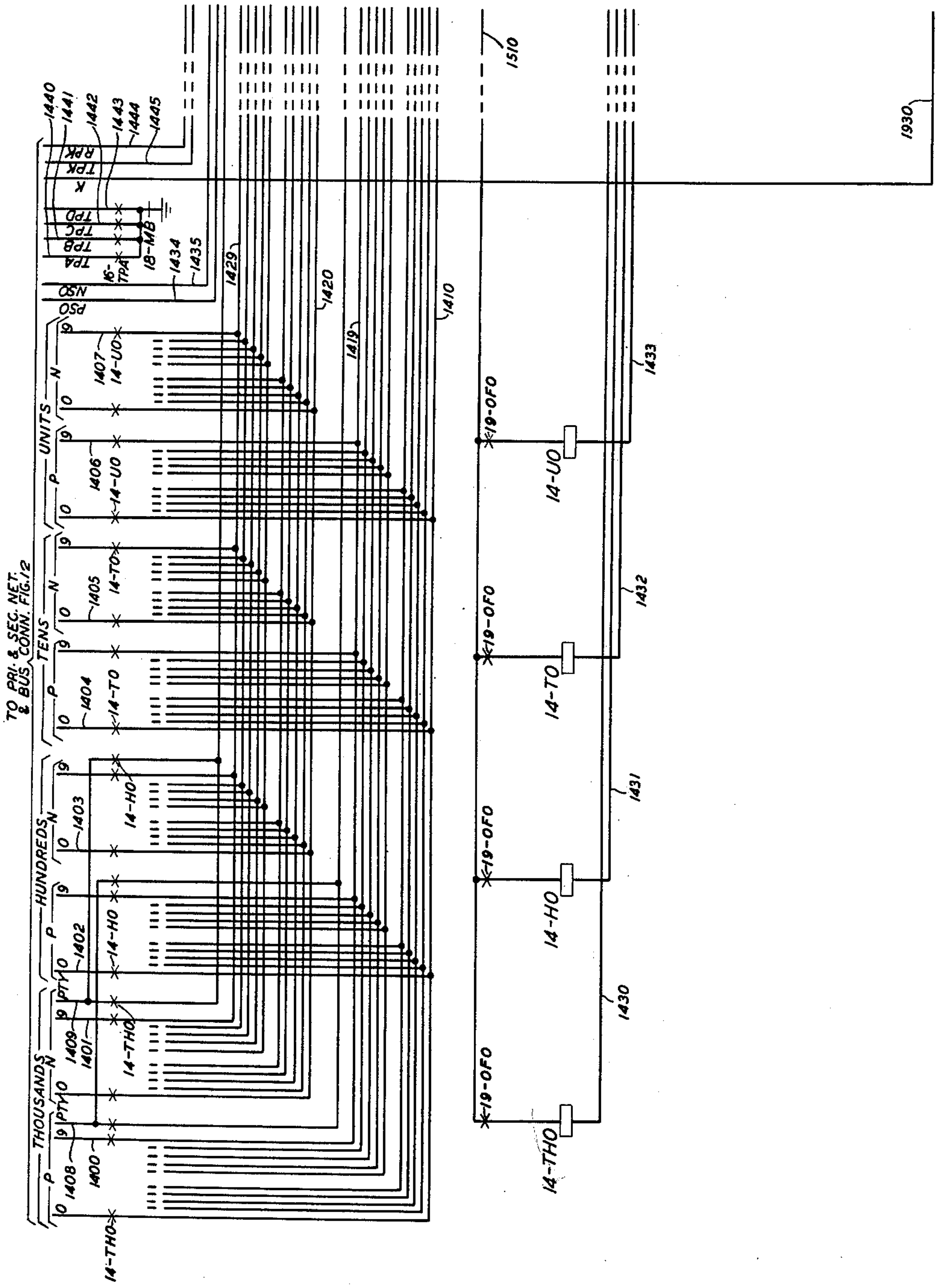
FIGS. 14 to 19 show the identifier, FIGS. 14 and 15 showing the means for connecting with the output of the secondary network, FIG. 16 showing the detectors schematically, FIG. 17 showing the digit steering relays, FIG. 18 showing auxiliary digit steering relays, and FIG. 19 showing the office steering relays.
Figure 15:
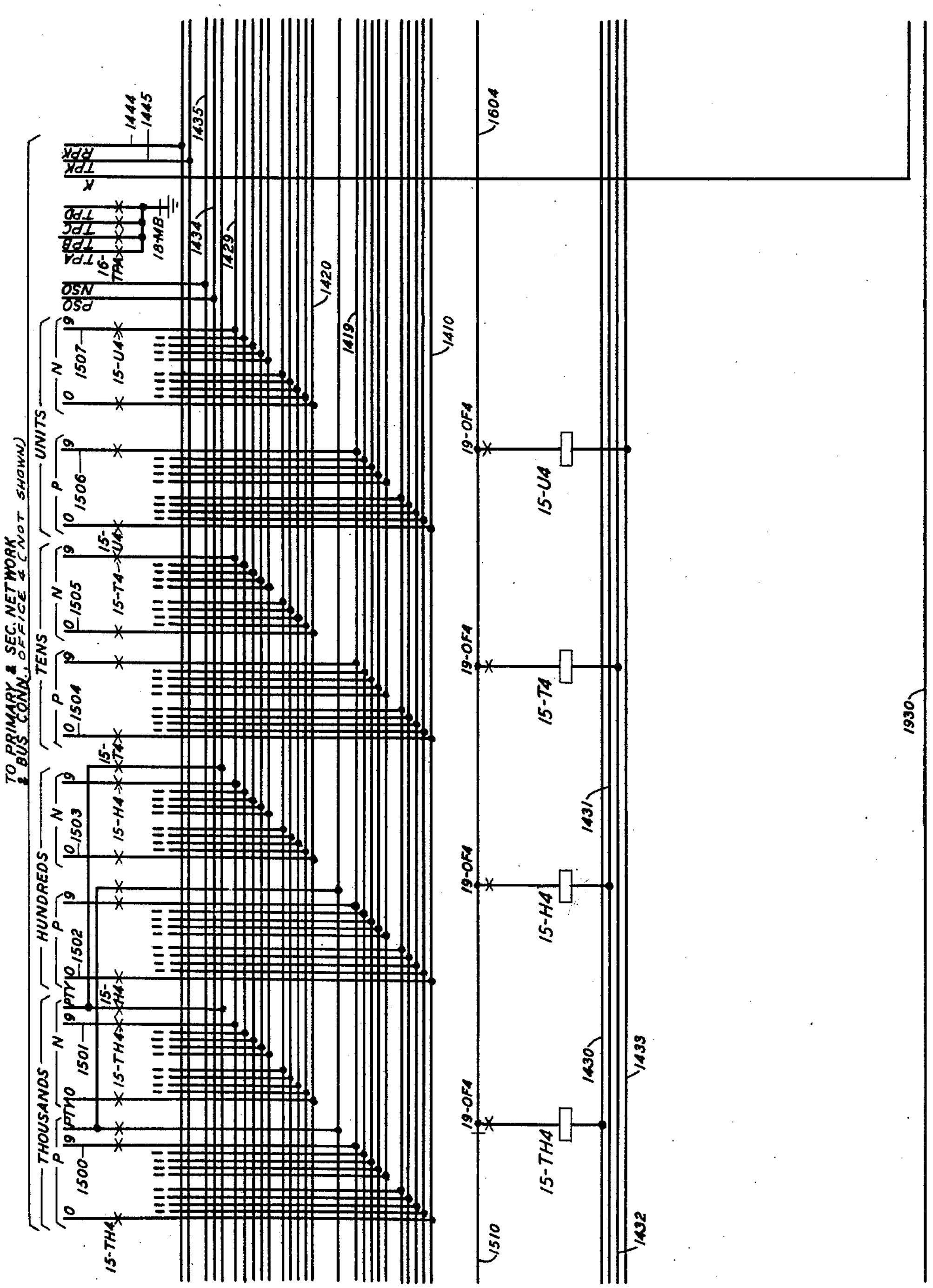

It will be apparent, particularly from FIG. 14, that there are duplicate sets of conductors for each digit, one-half of the secondary networks connected to each set. This is chiefly to permit balancing out noise picked up in conductors by connecting to opposite sides of the transformer at the input to the identifier.

To summarize, tone applied by the operation of relay 2–ID to the sleeve conductor 130 of the calling substation 100 appears on conductors 1400, 1403, 1404, and 1407 to identify the designation of substation 100 as 9009.

The operation of the identifier is controlled by means of a set of pulsing relays, including pulse generator relay 17–PG, pulse steering relay 17–PS, and pulse detector control relay 17–PD. The pulse generator relay 17–PG is a resistance capacitor timed polar relay of the well-known type. Relay 17–PG controls two sets of transfer contacts, namely, contact 1720 which controls the operation of relay 17–PG itself and contact 1721 which controls the pulse steering relay 17–PS. Prior to the operation of relay 16–ON a circuit is closed from —48 volt battery through resistor 17–PG1, lower winding of relay 17–PG, capacitor 17–PGC, conductor 1700, back contact of relay 16–ON to ground, in which circuit the capacitor 17–PGC is charged. A circuit is also closed from —48 volt battery through resistor 17–PG1, upper winding of relay 17–PG, adjustable resistor 17–PG3, back contact of relay 19–OFKC to ground on conductor 1700. The current flow in the upper winding of relay 17–PG holds transfer contacts 1720 and 1721 on their back contacts. As soon as relay 16–ON operates, ground is connected over a front contact of relay 16–ON, back contacts of relay 18–EP and transfer 1720 to the windings of relay 17–PG, in shunt of battery through resistor 17–PG1. The operation of relay 16–ON also disconnects ground from conductor 1700 and connects battery through resistor 17–PG2 and front contact of relay 16–ON to conductor 1700, thereby reversing the direction of current flow in both windings of relay 17–PG. The upper winding of relay 17–PG now energizes in a direction to cause transfer contacts 1720 and 1721 to close their front contacts, but initially this current flow is opposed by the current flow through the lower winding as capacitor 17–PGC discharges and recharges in the opposite direction. When the capacitor 17–PGC is charged, the current flow in the lower winding ceases and transfer contacts 1720 and 1721 close their front contacts. When contact 1720 closes its front contact, ground is connected over front contact of relay 16–ON, back contact of relay 18–EP, front contact of transfer contact 1720 to conductor 1700 and is removed from in shunt of battery through resistor 17–PG1, thereby restoring the direction of energization of the upper winding of relay 17–PG to cause the transfer contacts to close their back contacts. As before, the reversal of the energization of the lower winding of relay 17–PG causes capacitor 17–PGC to discharge and recharge, thereby delaying the effect of the upper winding. With the back contact of transfer contact 1720 closed, the above cycle is repeated and continues to be repeated until relay 18–EP is operated by the identifier or relay 16–ON is released by the outpulser.

Prior to the operation of relay 16–ON a circuit is closed for the pulse steering relay 17–PS which may be traced from battery through resistor 17–PS2, back contact of relay 19–OFKC, conductor 1701 through the upper winding of relay 17–PS, and in parallel therewith through capacitor 17–PSC and the lower winding of relay 17–PS, conductor 1702, back contact of relay 16–ON, resistor 17–PS5 to ground. The current flow through the windings of relay 17–PS at this time is in a direction to hold its back contact closed. As soon as relay 16–ON operates, this circuit is opened and relay 17–PS is placed under the control of the pulse generating relay 17–PG. With relay 16–ON operated, battery through resistor 17–PS2 is connected over back contact of relay 19–OFKC to conductor 1701 which connects with the right terminal of the upper winding of relay 17–PS and to capacitor 17–PSC, while battery through resistor 17–PS3 is connected over back contact of relay 19–OFKC and front contact of relay 16–ON to conductor 1702 which is connected to the left terminals of both windings of relay 17–PS. With the back contact of transfer contact 1721 closed, ground is connected over front contact of relay 16–ON, back contact of relay 18–EP, back contact 1721, front contact of relay 16–ON to conductor 1701 in shunt of battery through resistor 17–PS2. With the front contact of transfer contact 1721 closed, ground is connected over front contact of relay 16–ON, back contact of relay 18–EP, front contact 1721, to conductor 1702 in shunt of battery through resistor 17–PS3. The current flow at this time is such as to cause relay 17–PS to open its back contact. The initial current flow through the lower winding of relay 17–PS and capacitor 17–PSC opposes the current flow through the upper winding of relay 17–PS and serves to delay the opening or closing of the relay contact a measured interval.

The operation of relay 16–ON, together with the operation of relay 16–RP, closes a circuit from battery through the upper winding of relay 17–PD, adjustable resistor 17–PD2, conductor 1703, back contact of relay 18–EP, front contact of relay 16–RP to ground over the front contact of relay 16–ON. The lower winding of relay 17–PD is included in a circuit from battery through the lower winding of relay 17–PD, resistor 17–PD3, capacitor 17–PDC, and ground. At the time relay 16–ON operates, connecting ground to conductor 1703 and causing relay 17–PS to hold its back contact closed, as above described, a circuit is closed from battery through the winding of relay 17–P, back contact of relay 17–PS, conductor 1703 to ground, as above traced, operating relay 17–P. With relay 17–P operated, ground on conductor 1703 is extended over front contact of relay 17–P, normal contact of jack 17–PDJ to battery through the winding of relay 17–P1. Additional relays (not shown) would be connected in parallel with relay 17–P1 to provide a sufficient number of contacts. With relay 17–P1 and the associated relays operated, the amplifier detectors 1630 to 1641 are disabled as will be more clearly described hereinafter in connection with FIG. 28. With relay 17–P operated, ground on conductor 1703 is connected to the lower winding of relay 17–PD in shunt of the capacitor 17–PDC causing the capacitor to discharge and energizing the lower winding of relay 17–PD. As a result of the joint energization of the two windings of relay 17–PD, that relay holds its back contact open.

As above described, relay 17–PG alternately closes the back and front contacts of transfer contact 1721 causing relay 17–PS to alternately close and open its back contacts. At the first opening of the back contact of relay 17–PS, the circuit of relay 17–P is opened and that relay releases. Since the back contact of relay 17–PD is also open, the release of relay 17–P causes the release of relays 17–P1, etc. to enable the amplifier detectors 1630 to 1641. The release of relay 17–P also disconnects ground from the lower winding of relay 17–PD so that capacitor 17–PDC charges through the lower winding of relay 17–PD. The charging current is in a direction to hold the back contact of relay 17–PD open and when the current decreases, after a measured interval of approximately 12 milliseconds, the upper winding of relay 17–PD causes the back contact to reclose, completing an auxiliary circuit for operating relays 17–P1, etc. to again disable the amplifier detectors 1630 to 1641.

When relay 17–PS again closes its back contact, relay 17–P reoperates, again connecting ground to the lower winding of relay 17–PD to cause that relay to open its back contact. The opening of the back contact of relay 17–PD opens the auxiliary circuit for relay 17–P1, etc., but relay 17–P at its front contact has already reclosed the original circuit for these relays.

It will be apparent, therefore, that the amplifier detectors are normally disabled and are enabled for a measured time interval determined by the release time of relay 17–PD, the enabled periods occurring at times determined by relays 17–PD and 17–PS. The alternate enablement and disablement of the amplifier detectors continues until the pulse generator is stopped by the release of relay 16–ON or the operation of relay 18–EP. Relay 17–P, which operates and releases under the control of relays 17–PG and 17–PS, controls the operation of the office and digit steering relays, permitting the identifier to scan the output conductors of the number network.

There is an office steering relay such as relay 19–OF0 individual to each office served by the identifier. For purposes of illustration, it has been assumed that the identifier has access to five offices and steering relays 19–OF0 to 19–OF4 have been provided, but it will be understood that, if the identifier in any building serves less than five offices, one or more of the relays 19–OF1 to 19–OF4 will be omitted. If the identifier serves more than five offices, additional steering relays might be provided, but in order to save scanning time, a duplicate set of amplifier detectors would be provided, each steering relay then causing the output conductors of two number networks to be scanned. Means for distinguishing in which of the two offices the signal is found would also be provided.

When relays 16–ON and 16–RP are operated as above described, steering relay 19–OF0 is operated in a circuit from battery through the winding of that relay, back contacts of steering relays 19–OF1, 19–OF2, 19–OF3, 19–OF4, and 19–OFE, conductor 1900, back contact of relay 19–OFKA, conductor 1710, front contact of relay 16–RP, back contact of relay 18–LO, front contact of relay 16–ON to ground. Relay 19–OF0 operates in this circuit and closes a circuit for its auxiliary relay from battery through the winding of relay 19–OF0A, front contact of relay 19–OF0, conductor 1901, front contact of relay 16–ON to ground, operating relay 19–OF0A. Therefore, when relay 17–P operates for the first time, it completes a circuit which may be traced from battery through the winding of relay 17–PC1, back contact of relay 17–PC2, back contact of relay 18–EP, front contact of relay 17–P, back contact of relay 19–OFKC, conductor 1704, front contact of relay 19–OF0, and thence over the operating circuit for relay 19–OF0 to ground. Relay 17–PC1 operates in this circuit and closes a locking circuit for itself over its front contact through resistor 17–PCL, conductor 1710 to ground. When relay 17–P releases, approximately 4 milli-second after relay 16–ON operates, a circuit is closed from battery through the winding of relay 17–PC2, back contact of relay 17–PC2, front contact of relay 17–PC1, back contact of relay 17–P, back contact of relay 19–OFKC, conductor 1704, and thence as above traced for the operating circuit of relay 17–PC1 to ground. Relay 17–PC2 operates and locks over its front contact to ground on conductor 1710.

As above outlined, the number of the calling substation 100 is 9009 and the tone applied to the sleeve conductor of that line will appear on conductor 1400 of the thousands group, conductor 1403 in the hundreds group, conductor 1404 in the tens group, and conductor 1407 in the units group, thereby locating the calling line in office No. 0.

When relays 16–ON and 16–RP were operated as above described, in addition to closing the circuit for office steering relay 19–OF0, a circuit is closed from battery through the winding of thousands steering relay 17–THS, back contacts of relays 18–ES1, 18–ESA, 17–HS, 17–TS, 17–US, and 17–ES to ground on conductor 1710. Relay 17–THS operates in this circuit and closes a circuit from battery through the winding of auxiliary relay 18–THSA, front contact of relay 17–THS, conductor 1901 to ground over front contact of relay 16–ON. Relay 18–THSA operates in this circuit and closes a holding circuit for relay 17–THS independent of relays 18–ES1 and 18–ESA. With relays 17–THS and 19–OF0 operated, a circuit is closed from battery through ballast lamp 16–OF, front contact of relay 19–OF0 or back contact of relay 19–OFE, conductor 1604, back contact of relay 19–OF4, conductor 1510 and over the back contacts (not shown) of office steering relays 19–OF3 to 19–OF1, front contact of relay 19–OF0, winding of relay 14–TH0, conductor 1430, front contact of relay 17–THS, back contacts of relays 17–HS, 17–TS, 17–US, 18–LO, and 17–ES; front contact of relay 16–ON to ground. Relay 14–TH0 operates in this circuit and connects conductors 1400 and 1401, together with the other conductors of the thousands group, of the number network of office No. 0 to conductors 1410 to 1429 leading to the amplifier detectors 1630 to 1639.

Ralay 18–THSA also closes a circuit from ground over front cvontact of relay 16–ON, back contact of relay 17–ES, conductor 1605, back contacts of relay 18–USA, 18–TSA, and 18–HSA, front contact of relay 18–THSA, conductor 1606, front contacts of relays 25–ICA0 and 22–OCA, back contact of relay 25–U, winding of relay 25–TH to battery. Relay 25–TH operates in this circuit and prepares circuits which may be traced from amplifier detectors 1630 to 1639, conductors 1610 to 1617, front contacts of relays 25–ICA0 and 22–OCA, conductors 2510 to 2517, contacts of relay 25–TH to positive battery through the windings of relays 25–THA0, 25–THA1, 25–THA2, 25–THA4, and 25–THA7 to prepare for receiving the thousands digit.

Since tone appears on the thousands conductor 1400, it will pass over contact of relay 14–TH0, conductor 1419 to amplifier detector 1639. Assuming that there is no interference with the tone, amplifier detector 1639 will function as described hereinafter in connection with FIG. 28 to connect ground to conductors 1612 and 1617 thereby operating relays 25–THA2 and 25–THA7. Relays 25–THA2 and 25–THA7 lock over their front contacts and conductor 2500 to ground over the back contact of relay 23–IRL and front contact of relay 22–DW. This locking ground is extended back over conductors 1612 and 1617 to quench the output tubes of amplifier detector 1639. Relays 25–THA2 and 25–THA7 connect ground over back contacts of relay 23–OFK, front contacts of relays 22–OCA and 25–ICA0, conductor 1902, back contacts of relays 19–OFKE and 19–OFKC to battery through the winding of relay 19–OFK in the identifier.

Assuming that the call being described has occurred at a busy time, relay 18–HTR will be operated, as described hereinafter, and the operation of relay 19–OFK completes a circuit from battery through the winding of relay 19–OFKC, front contact of relay 18–HTR, front contact of relay 19–OFK, conductor 1903 to ground over front contact of relay 16–ON. Relay 19–OFKC operates in this circuit and locks over its own front contact to ground on conductor 1903. With relay 19–OFKC operated, ground on conductor 1902 is extended over back contact of relay 19–OFKE, front contact of relay 19–OFKC to battery through the winding of relay 19–OFKA. Relay 19–OFKA operates and locks over its own front contact to ground on conductor 1903. With relay 19–OFKA operated, a circuit is closed from ground, front contact of relay 19–OFKA, front contact of relay 19–OFOA, conductor 1910, front contacts of relays 25–ICA0 and 22–OCA to battery through the winding of relay 25–OF0. Relay 25–OF0 operates in this circuit to register the fact that the calling line was found in office No. 0 and locks to ground over its own front contact and front contact of relay 22–DW. Relay 25–OF0 closes an office checking circuit which may be traced from battery through the winding of relay 23–OFK, front contact of relay 25–OF0, back contacts of relays 25–OF1, 25–OF2, 25–OF3, and 25–OF4 to ground. With relays 19–OFKC and 23–OFK operated, a circuit is closed from ground on conductor 1710, front contact of relay 19–OFKC, conductor 1920, front contacts of relays 25–ICA0, 22–OCA, 23–OFK, 25–OF0, 22–OCA, 25–ICA0, conductor 1921, front contact of relay 19–OFKC to battery through the winding of relay 19–OF0 to hold that relay operated.

With relay 23–OFK operated, the contacts of relays 25–THA2 and 25–THA7 are disconnected from conductor 1902 and connected to the windings of relays 25–TH2 and 25–TH7 causing these relays to operate and register the thousands digit. Relays 25–TH2 and 25–TH7 lock to ground over their own front contacts and the front contact of relay 22–DW. A circuit is now closed for thousands check relay 23–THK which may be traced from battery through the winding of that relay, front contact of relay 25–TH7, back contact of relay 25–TH4, front contact of relay 25–TH2, back contacts of relays 25–TH1 and 25–TH0 to ground. Relay 23–THK operates in this circuit and closes a circuit from ground over front contacts of relays 23–THK, 22–OCA, and 25–ICA0, conductor 1620 to battery through the winding of thousands check relay 16–THK in the identifier.

Relay 19–OFKC, in operating as above described, opens the operating circuit for relay 19–OFK and that relay releases. When relay 19–OFK operated, it opened the circuit for operating relay 19–OF1 which will be traced hereinafter and when relay 19–OFKC operates, this circuit is opened at another point so that it cannot be reclosed by the release of relay 19–OFK. In addition, relay 19–OFK closed a temporary holding circuit for relay 19–OF0 which may be traced from battery through the winding of relay 19–OF0, front contact of relay 19–OFOA, conductor 1904, resistor 17–OFL, front contact of relay 19–OFK to ground on conductor 1710. When relay 19–OFKC operates, it closes a front contact in parallel with the front contact of relay 19–OFK, thereby holding relay 19–OF0 operated after relay 19–OFK releases.

Relay 19–OFKC substitutes variable resistor 17–PG4 for variable resistor 17–PG3 in the circuit of the pulse generating relay 17–PG and substitutes resistors 17–PS1 and 17–PS4 for resistors 17–PS2 and 17–PS3 respectively in the circuit of relay 17–PS to increase the speed with which the remaining digits are detected.

The amplifier detectors are disabled by the reoperation of relay 17–P1, etc., due to the release of relay 17–PD a measured interval after relay 17–P releases as above described. When relay 17–P reoperates, it closes the original circuit for holding relays 17–P1, etc. operated.

With relay 17–P operated, a circuit is closed from battery through the winding of relay 17–HS, back contact of relay 16–HK, front contact of relay 18–THSA, conductor 1706, back contact of relay 18–ESA, front contact of relay 19–OFKC, front contact of relay 17–PC2, back contact of relay 18–EP, front contact of relay 17–P, front contact of relay 19–OFKC, conductor 1707, front contacts of relay 18–THSA, back contacts of relays 17–HS, 17–TS, 17–US, and 17–ES to ground on conductor 1710. Relay 17–HS operates in this circuit and locks in a circuit from battery through its winding, front contact of relay 17–HS, back contacts of relays 17–TS, 17–US, and 17–ES to ground on conductor 1710. Relay 17–HS, in operating, closes a circuit from battery through the winding of relay 18–HSA, front contact of relay 17–HS to ground on conductor 1901, operating relay 18–HSA. Relay 17–HS opens its own operating circuit as well as the operating and locking circuits for relay 17–THS, but relay 17–THS is held operated in a circuit extending from battery through the winding of relay 17–THS, front contact of relay 18–THSA, conductor 1707, and thence as above traced over the front contact of relay 17–P to conductor 1706, front contact of relay 18–THSA, back contact of relay 16–HK, front contact of relay 17–HS and thence over the locking circuit of relay 17–HS to ground on conductor 1710.

With relay 17–HS operated, the circuit of relay 14–TH0 is opened and ground is connected over the front contact of relay 17–HS to conductor 1431, operating relay 14–H0 which connects the output conductors for the hundreds digit, including conductors 1402 and 1403 to the amplifier detectors 1630 to 1639.

Relay 18–HSA disconnects grounded conductor 1605 from conductor 1606, thereby releasing relay 25–TH, and connects ground to conductor 1607. When relay 25–TH releases, a circuit is completed from ground on conductor 1607, front contacts of relays 25–ICA0 and 22–OCA, winding of relay 25–H, back contact of relay 25–TH to battery, operating relay 25–H. The release of relay 25–TH disconnects conductors 2510 to 2519 from the windings of relays 25–THA0 to 25–THA7 and the operation of relay 25–H connects these conductors to positive battery through the windings of relays 26–HA0 to 26–HA7.

When relay 17–P next releases and relays 17–P1, etc. release and the amplifier detectors are enabled, the release of relay 17–P also opens the holding circuit for relay 17–THS and that relay releases, in turn releasing relay 18–THSA. The signal appearing on conductor 1403 is detected by detector 1630 causing the connection of ground to conductors 1614 and 1617.

Ground on conductors 1614 and 1617 is extended over front contacts of relays 25–ICA0, 22–OCA, and 25–H to the windings of relays 26–HA4 and 26–HA7 to cause these relays to operate. Relays 26–HA4 and 26HA7 lock over their own front contacts to ground on conductor 2500, quenching the output tubes of amplifier detector 1630. Relays 26–HA4 and 26–HA7 in turn operate relays 25–H4 and 25–H7 which lock to ground over their own front contacts and the front contact of relay 22–DW. With two of the hundreds register relays operated, a circuit is closed from battery through the winding of hundreds check relay 23–HK, front contacts of relays 25–H7 and 25–H4, back contacts of relays 25–H2, 25–H1, and 25–H0 to ground. Relay 23–HK connects ground over its own front contact and front contacts of relays 22–OCA and 25–ICA0 to conductor 1621 operating the hundreds check relay 16–HK in the identifier.

When relay 17–PD releases, as previously described, relays 17–P1, etc. are operated to disable the amplifier detectors.

The next operation of relay 17–P closes a circuit from battery through the winding of relay 17–TS, back contact of relay 16–TK, front contact of relay 18–HSA, back contact of relay 18–THSA, conductor 1706, and thence as above traced over the front contact of relay 17–P to conductor 1707, back contact of relay 18–THSA, front contact of relay 18–HSA, back contacts of relays 17–TS, 17–US, and 17–ES to ground on conductor 1710. Relay 17–TS operates in this circuit and locks over its front contact and the back contacts of relays 17–US and 17–ES to ground on conductor 1710. Relay 17–TS, in operating, extends ground on conductor 1901 over its front contact to battery through the winding of relay 18–TSA, operating the latter relay. With relay 17–TS operated, relay 14–H0 is released to disconnect the hundreds digit output conductors of the number network from the detectors and ground is connected to conductor 1432, operating relay 14–T0 to connect the tens conductors of the number network, including conductors 1404 and 1405, to the detectors. Relay 17–TS, in operating, opens its own operating circuit as well as the operating and locking circuits of relay 17–HS, but relay 17–HS is held under the control of relay 17–P in a circuit which may be traced from battery through the winding of relay 17–HS, front contact of relay 17–HS, front contact of relay 18–HSA, back contact of relay 18–THSA, conductor 1707, and back to conductor 1706 as previously traced, back contact of relay 18–THSA, front contact of relay 18–HSA, back contact of relay 16–TK, front contact of relay 17–TS, and thence over the locking circuit of relay 17–TS to ground on conductor 1710.

Relay 18–TSA disconnects ground from conductor 1607 thereby releasing relay 25–H to in turn disconnect conductors 2510 to 2517 from relays 26–HA0 to 26–HA7. Relay 18–TSA, when operated, connects ground to conductor 1608, over front contacts of relays 25–ICA0 and 22–0CA, winding of relay 25–T, back contacts of relays 25–H and 25–TH to battery thereby operating relay 25–T, which connects relays 26–TA0 to 26–TA7 to conductors 2510 to 2517.

When relay 17–P releases, relay 17–HS is released, in turn releasing relay 18–HSA. In addition, relays 17–P1, etc. are released to enable the detectors. Tone present on conductor 1404 is detected by detector 1630 resulting in the connection of ground to conductors 1614 and 1617 and thence to the windings of relays 26–TA4 and 26–TA7 causing these relays to operate and lock over the back contact of relay 23–IRL and front contact of relay 22–DW. With relays 26–TA4 and 26–TA7 operated, tens register relays 26–T4 and 26–T7 operate and lock under thec ontrol of relay 22–DW. With two of the tens register relays operated, tens check relay 23–TK operates in a circuit similar to that traced for relay 23–HK. With relay 23–TK operated, ground is connected over front contacts of relays 23–TK, 22–OCA, and 25–ICA0 to conductor 1622 operating the tens check relay 16–TK in the identifier.

When relay 17–P reoperates, following the test for the tens digit, a circuit is closed from battery through the winding of relay 17–US, back contact of relay 16–UK, front contact of relay 18–TSA, back contacts of relays 18–HSA and 18–THSA, conductor 1706, and thence as above traced to conductor 1707, back contacts of relays 18–THSA and 18–HSA, front contact of relay 18–TSA, back contacts of relays 17–US and 17–ES to ground on conductor 1710. Relay 17–US operates in this circuit and locks over its own front contact and back contact of relay 17–ES to ground on conductor 1710, in turn operating relay 18–USA. Relay 17–US opens its own operating circuit and the operating and locking circuits for relay 17–TS, but relay 17–TS is held operated under the control of relay 17–P in a circuit similar to that traced for the other digit steering relays.

Relay 17–US, in operating, opens the circuit of relay 14–TO to disconnect the tens digit output conductors from the detectors and closes the circuit of relay 14–UO to connect the units digit output conductors, including conductors 1406 and 1407 to the detectors.

Relay 18–USA disconnects ground from conductor 1608 releasing relay 25–T in turn disconnecting relays 26–TA0 to 26–TA7 from conductors 2510 to 2517. Relay 18–USA then connects ground to conductor 1609, completing a circuit over front contacts of relays 25–ICA0 and 22–OCA, winding of relay 25–U, back contacts of relays 25–T, 25–H, and 25–TH to battery, operating relay 25–U to connect relays 26–UA0 to 26–UA7 to conductors 2510 to 2517.

When relay 17–P releases, relay 17–TS releases, in turn releasing relay 18–TSA. The release of relay 17–P also releases relays 17–P1, etc., enabling the detectors, and tone on conductor 1407 is detected by the detector 1639, resulting in the connection of ground to conductors 1612 and 1617, completing circuits over front contacts of relays 25–ICA0, 22–OCA, and 25–U to battery through the windings of relays 26–UA2 and 26–UA7. Relays 26–UA2 and 26–UA7 operate, lock to ground over their own front contacts, back contact of relay 23–IRL and front contact of relay 22–DW and close circuits for operating units register relays 26–U2 and 26–U7 to register the units digit 9. The latter relays lock under the control of relay 22–DW and in turn operate units check relay 23–UK. With relay 23–UK operated, ground is connected over front contacts of relays 23–UK, 22–OCA, and 25–ICA0, conductor 1623 to battery through the units check relay 16–UK of the identifier, operating that relay.

As soon as relay 23–UK operates, a circuit is closed from battery through the winding of identifier release relay 23–IRL over front contacts of the digit and office check relays 23–UK, 23–TK, 23–HK, 23–THK, and 23–OFK, back contact of relay 20–GRF to ground. Relay 23–IRL operates in this circuit and locks over its own front contact to ground over the front contact of relay 22–ON. With relay 23–IRL operated, the locking circuit of relay 16–ON is opened and that relay releases, restoring the identifier to normal. The operation of relay 23–IRL opens the circuit of the out-pulser preference relay 22–OP and that relay releases, in turn releasing the connector relays 22–OCA and 25–ICA0. The identifier is now free to be seized by another outpulser.

Relay 23–IRL, in operating, disconnects ground from conductor 2200 thereby opening the circuit previously traced for relay 2–ID. Relay 2–ID releases, disconnecting the identifier tone from the sleeve of the substation 100 and disconnecting the frame oscillator from the identifier. With relay 2–ID released, the circuit of relay 22–TNK is opened and that relay releases, completing a circuit from battery through the winding of relay 24–MF, back contact of relay 22–TNK, front contact of relay 24–TNKA to ground. Relay 24–MF operates in this circuit to prepare the outpulser for transmitting the identified number to the tandem sender. Relay 23–IRL also closes a circuit from ground over front contacts of relays 23–IRL, 24–TRS, 22–TKCI, conductor 2203, contact of crosspoint 700, conductor 406, front contacts of relays 4–ON and 4–SP to battery through the winding of relay 4–MF to prepare the trunk circuit for outpulsing. Furthermore, relay 23–IRL in operating, releases relays 24–RP and 24–PK.

With relays 24–MF and 4–MF operated, the outpulsing circuit is closed from the multifrequency receiving circuit 303 through the tandem sender 302, including back contacts of relay 3–TR, sender link 301, front contacts of relay 3–T, left windings of repeating coil 3–R in the incoming trunk circuit 300, interoffice trunk conductors 200 and 201, front contacts of relay 4–MF, conductors 207 and 208, front contacts of relay 4–MF, conductors 404 and 405, contacts of crosspoint 700, conductors 2202 and 2200, front contacts of relay 22–TKCI, front contacts of relay 24–MF, conductors 2204 and 2205, right windings of repeating coil 21–TR to the winding of relay 21–TT. Relay 21–TT is a trunk test relay and, if the above-traced circuit is continuous, battery and ground supplied by the multifrequency receiving circuit will operate relay 21TT.

In the trunk circuit, with relay 4–MF operated, relays 2–CS and 2–CS1 are disconnected from the interoffice trunk and relay 2–CS releases. Relay 2–A is held operated under the control of the calling subscriber. In the outpulser, the operation of relay 24–MF connects battery to ground through resistors 21–D1 to 21–D5 which supply a variety of potentials to terminals 21–VA, 21–VB, and 21–VC which are cross-connected as necessary to terminals 21–V0, 21–V1, 21–V2, 21–V4, 21–V7 and 21–V10 individual to the frequency generators 2100 to 2110.

Since six frequencies are required for outpulsing as will appear hereinafter, six frequency generators are provided, one for each frequency needed. Each frequency generator uses a transistor oscillator which receives power from the voltage divider made up of resistors 21–D1 to 21–D5 and drives a tuned circuit consisting of the winding of a transformer such as transformer 21–TR0 and a capacitor such as capacitor 21–C0. A resistor, such as resistor 21–F0, is included in the output of each oscillator to improve the impedance match with the trunk. Five of the frequencies generated are used, two at a time, to represent the various digits in accordance with the well-known two-out-of-five code. The sixth frequency is combined with one of the five frequencies as a key pulse or gate opener signal.

The following table shows the frequencies generated by each oscillator, together with the combinations of frequencies for representing the various digits.

| Digit | Oscillator Designation | | | | | |
|---|---|---|---|---|---|---|
| | 2100 | 2101 | 2102 | 2104 | 2107 | 2110 |
| | Frequency Generated | | | | | |
| | 700 | 900 | 1,100 | 1,300 | 1,500 | 1,700 |
| 0 | | | | x | x | |
| 1 | x | x | | | | |
| 2 | x | | x | | | |
| 3 | | x | x | | | |
| 4 | x | | | x | | |
| 5 | | x | | x | | |
| 6 | | | x | x | | |
| 7 | x | | | | x | |
| 8 | | x | | | x | |
| 9 | | | x | | x | |
| Key Pulse | | | x | | | x |

The outpulser is now ready to transmit the identified designation to the tandem sender. Assuming that the designation was successfully identified, eight digits are sent out following the key pulse signal. In case of trouble, only one digit is sent out following the key pulse signal as will be described hereinafter.

Outpulsing is controlled by the pulse generator comprising relays 20–PG and 20–PG1. When the outpulser is idle, a circuit is closed from battery through resistor 20–PG7, conductor 2000, right winding of relay 20–PG, back contact of relay 20–KP, resistor 20–PG2, conductor 2001, resistor 20–PG1 to battery and from battery through resistor 20–PG7, conductor 2000, left winding of relay 20–PG, capacitor 20–PGA, conductor 2001, resistor 20–PG1 to battery. Since battery is connected to both ends of the windings of relay 20–PG and the armature of the relay is not biased, the armature takes no definite position at this time. When relay 22–ON operates, following the seizure of the outpulser, ground is connected over a front contact of relay 22–ON and a back contact of relay 24–SP to conductor 2001 and thereby to capacitor 20–PGA and resistor 20–PG2 in shunt of the battery through resistor 20–PG1 so that condenser 20–PGA is charged and the right winding of relay 20–PG is energized in a direction to hold its contact open.

As soon as relay 24–MF is operated, a circuit is closed from battery through the winding of relay 20–KP, back contact of relay 24–SP, front contact of relay 24–MF to ground. Relay 20–KP operates in this circuit and locks over its own front contact and the back contacts of relays 20–IDS to 20–EP to ground over the front contact of relay 24–MF. With relay 20–KP operated, the shunt around resistor 20–PG3 in the circuit of relay 20–PG is opened to slow the operation of relay 20–PG for the key pulse signal.

When relay 21–TT operates in response to the trunk test, a circuit is closed from battery through the winding of relay 24–SP, front contact of relay 21–TT, back contact of relay 24–PT to ground, operating relay 24–SP, which locks to ground over its own front contact and the front contact of relay 24–MF. With relay 24–SP operated, ground is disconnected from conductor 2001 and is connected over front contact of relay 24–SP, back contact of relay 20–PG1 and conductor 2000 to both windings of relay 20–PG in shunt of battery through resistor 20–PG7, thereby reversing the energization of the right winding of relay 20–PG and causing capacitor 20–PGA to discharge and recharge in the reverse direction. The current flow in the right winding of relay 20–PG is in a direction to cause relay 20–PG to close its contact, but is initially opposed by the current flow through the left winding of relay 20–PG due to the discharge and recharge of capacitor 20–PGA. When the charging current dies away, after an interval predetermined by the values of the resistors and capacitor, relay 20–PG closes its contact completing a circuit from ground over front contacts of relays 22–ON and 20–PG to battery through the winding of relay 20–PG1. Relay 20–PG1 operates, disconnecting ground from conductor 2000 and connecting ground to conductor 2001 to again reverse the energization of relay 20–PG. As before, the right winding does not become effective until the current in the left winding, due to the discharge and recharge of capacitor 20–PGA, dies away at which time relay 20–PG opens its contact, thereby opening the circuit of relay 20–PG1 and the latter relay releases. Releases 20–PG and 20–PG1 therefore complete a pulsing arrangement which continues until a supplementary circuit is closed for holding relay 20–PG1 operated as will be described hereinafter.

As soon as relay 24–SP is operated, the key pulse signal is transmitted to the tandem office by connecting the output of oscillators 2102 and 2110 over front contacts of relay 20–KP, conductors 2111 and 2112, back contacts of relay 20–PG1, and front contacts of relay 24–SP to the left windings of repeating coil 21–TR. The two tones are transmitted over the outpulsing circuit previously traced through the right windings of repeating coil 21–TR to the multifrequency receiving circuit 303 at the tandem office to prepare that circuit for receiving the digit pulses.

When relay 24–SP operated, it set up means for transmitting an information digit to the tandem sender. If, as assumed, the calling line number was automatically identified without difficulty, a circuit will be closed from ground over front contact of relay 24–SP, back contacts of relays 23–ETM1, 20–CCKF, 24–2TR, and 25–PTY to battery through the winding of relay 23–ID0. Relay 23–ID0 operates in this circuit. The conditions under which relays 23–ID1 and 23–ID2 are operated and the signals transmitted under such conditions will be described hereinafter.

With relay 24–SP operated, prior to the operation of relay 20–PG1 and following the operation of relay 20–KP, a circuit is closed from battery through the winding of relay 20–IDS, back contact of relay 20–IDS, front contact of relay 20–KP, back contact of relay 20–PG1, front contacts of relays 24–SP and 24–MF to ground. Relay 20–IDS operates in this circuit and locks over its own front contact and the back contacts of relays 20–AS to 20–EP, front contact of relay 24–MF to ground.

Relay 20–IDS opens the previously traced locking circuit for relay 20–KP, but relay 20–KP is held operated over its own front contact, front contact of relay 20–IDS, back contact of relay 20–PG1 to ground over the front contacts of relays 24–SP and 24–MF.

When relay 20–PG1 operates to terminate the key pulse signal, relay 20–KP releases, again shunting resistor 20–PG3 to speed up the pulsing of the digits. Relay 20–IDS prepares for sending the information digit and when relay 20–PG1 against releases, the left winding of repeating coil 21–TR is extended over front contacts of relay 24–SP, back contacts of relays 20–PG1 and 20–KP, front contacts of relay 20–IDS, front contacts of relay 23–ID0, and back contacts of relay 25–S0 to oscillators 2104 and 2107, thereby transmitting the digit 0.

When relay 20–PG1 is released to transmit the information digit, a circuit is closed from ground over front contacts of relays 24–MF and 24–SP, back contact of relay 20–PG1, back contact of relay 20–KP, front contact of relay 20–IDS, front contact of relay 23–ID0, back contact and winding of relay 20–AS to battery, operating relay 20–AS. Relay 20–AS locks over its own front contact, back contacts of relays 20–BS to 20–EP, front contact of relay 24–MF to ground.

The outpulser is now ready to transmit the three digits representing the code of the office in which the calling line is located. Each of the office register relays 25–OF0 to 25–OF4, when operated, is arranged to prepare, either directly or by means of individual auxiliary relays, three pairs of connections between the outpulsing circuit and a set of cross-connecting terminals such as terminals 2120. These terminals are cross connected to a set of terminals 2121 connected with the output conductors of the oscillators 2100 to 2107 in accordance with the designation of the office identified by the operated office register relay. Only the connections for office relay 25–OF0 have been shown, but similar connections would be closed by relays 25–OF1 to 25–OF4.

With relay 20–AS operated, relay 20–IDS is held operated over its own front contact, front contact of relay 20–AS, back contact of relay 20–PG1, front contacts of relays 24–SP and 24–MF to ground until relay 20–PG1 reoperates. When relay 20–PG1 reoperates, relay 20–IDS is released and conductors 2111 and 2112 are extended over back contacts of relays 20–KP and 20–IDS, front contacts of relay 20–AS and by way of the established cross connections between the sets of terminals 2120 and 2121 to the oscillators. When relay 20–PG1 again releases, the code frequencies are transmitted to the tandem office.

Similarly, circuits are provided for the next two office code digits under the control of relays 20–BS and 20–CS followed by the thousands, hundreds, tens, and units digits of the calling subscriber as identified by the identifier and registered in the outpulser as previously described.

When relay 20–PG1 releases during the transmission of the units digit so that the relay 20–US is operated, a circuit is closed from battery through the winding of relay 20–EP, back contact of relay 20–EP, front contact of relay 20–US, back contacts of relays 20–TS to 20–KP, back contact of relay 20–PG1, front contacts of relays 24–SP and 24–MF to ground. Relay 20–EP operates and locks to ground over its own front contact and the front contact of relay 24–MF. Relay 20–US is held operated under the control of relays 20–EP and 20–PG1 until relay 20–PG1 reoperates at the end of the units digit.

With relay 20–US released, when relay 20–PG1 again releases a circuit is closed from battery through the winding of relay 20–RL, front contact of relay 23–IRL, back contact of relay 26–TKL, front contact of relay 20–EP, back contacts of relays 20–US to 20–KP, back contact of relay 20–PG1, front contacts of relays 24–SP and 24–MF to ground. Relay 20–RL operates in this circuit and locks over its own front contact and the front contact of relay 22–OB to ground.

Relay 20–RL, in operating, closes a locking circuit for relay 20–PG1 to stop the pulsing and opens the locking circuit of relay 22–ON causing that relay to release. Relay 22–ON releases relay 22–OB, which in turn releases relays 7–OB00, 8–OB70, and the other outpulser busy relays individual to this outpulser in the outpulser link. Relay 22–OB releases relays 22–HMK and 22–DCK, in turn releasing relay 22–TCK1 and the hold magnet 7–HM00 in the outpulser link thereby opening crosspoint 700 and disconnecting the outpulser from the trunk circuit. In addition, relay 22–OB releases relay 20–RL.

Relay 22–ON also releases relay 22–DW which opens the locking circuits for the office and digit register relays, causing the operated register relays to release. With relay 22–DW released, a circuit is closed from ground over front contact of relay 20–W, back contact of relay 20–Z, back contact of relay 22–DW to battery through the winding of relay 20–Z. Relay 20–Z operates in this circuit and closes a locking circuit for itself over front contact of relay 20–Z, front contact of relay 20–W to ground. Relay 20–Z opens the previously-traced locking circuit for relay 20–W, but relay 20–W is held operated over the back contact of relay 22–DW, front contact of relay 20–Z and its own front contact during the time that the outpulser is idle. When relay 22–DW is operated for the next call, relay 20–W releases and the identifier connector relay 25–ICA1 is operated over the back contact of relay 20–W and a front contact of relay 20–Z so that the other identifier will be used for the next call.

Relay 22–ON also releases relays 24–IK and 24–SPL1 and the identifier release relay 23–IRL. With relay 22–ON released, relay 24–TNKA releases, in turn releasing relay 24–MF. With relay 24–MF released, power is removed from the oscillators 2100 to 2110 and relays 24–SP and 20–EP are released. The outpulser is now ready to handle the next call.

In the tandem sender the called number transmitted from the originating sender is received by the multi-frequency receiving circuit 303 and is transferred digit by digit to the called number registers after which relays 3–REC and 3–CSX (not shown) are operated to direct the multi-frequency receiving circuit to the information digit register 304. It will be remembered that, since the number was successfully identified and the call was not being observed, the information digit 0 was transmitted by the outpulser. Therefore, relays 3–4 and 3–7 are operated in register 304. With these relays operated, a circuit is closed from ground over front contact of relay 3–ON (not shown), back contacts of relays 3–0 and 3–1, front contact of relay 3–4, back contacts of relays 3–2 and 3–10, upper winding of relay 3–AI, winding of relay 3–NL0 to battery. Relay 3–AI operates and releases relay 3–CSX so that the remaining digits will be directed to the calling number registers, while relay 3–NL0 informs the transverter that the line was not under observation.

The tandem sender then proceeds to complete its functions including the control of making an initial entry for charging purposes.

When relay 23–IRL of the outpulser releases, as above described, it removes ground from conductor 2203 and thereby from conductor 406, releasing relay 4–MF and restoring the outgoing supervisory circuit of the trunk, causing relay 2–CS to reoperate. The trunk circuit of FIGS. 2 and 4 remains in this condition while the connection is established to the called line.

When the called subscriber answers, the connection of battery and ground to conductors 200 and 201 is again reversed, causing relay 2–CS to release and relay 2–CS1 to operate. When relay 2–CS1 now operates, it closes a circuit from ground over front contact of relay 2–CS1, front contact of relay 4–ON, back contact of relay 2–ON1, front contact of relay 2–CS2, back contact of relay 4–TM to battery through the lower winding of relay 2–SI. Relay 2–SI operates and locks through its lower winding over its own front contact and front contact of relay 4–ON to ground. With relay 2–SI operated, the circuit of relay 4–ON previously traced is opened, but a new circuit is established over a front contact of relay 2–SI and a back contact of relay 4–TM, relay 4–ON remaining operated during the interval between the opening of the back contact and the closure of the front contact of relay 2–SI because of its slow-to-release characteristic.

Disconnect is normally under the control of the calling subscriber. When the calling subscriber disconnects, relay 2–A releases, opening the circuit of relay 4–ON which releases after a time interval determined by its slow-to-release characteristic. With relay 4–ON released, ground is disconnected from the sleeve conductor 107 and the hold magnets of the link switches 101 and of the district and office link switches 103 are released, as well as the district junctor 102. Release of relay 4–ON opens the locking circuits of relays 4–SP, 2–CT1, and 2–SI and these relays release. The release of relay 2–A removes the shunt from the lower windings of relays 2–CS and 2–CS1, releasing relay 3–A as a disconnect signal to the tandem office. When the trunk circuit 300 at the tandem office is released, the direction of the connection of battery and ground to conductors 200 and 201 is restored, causing relay 2–CS1 to release and relay 2–CS to operate. The release of relay 2–CS1 in turn releases relays 2–CS2 and 2–RV, restoring the trunk circuit of FIGS. 2 and 4 to normal.

If the calling subscriber fails to release after the called subscriber disconnects, a timed disconnect feature of the tandem trunk 300 functions to restore the direction of the connection of battery and ground to conductors 200 and 201, releasing relay 2–CS1 and reoperating relay 2–CS. When relay 2–CS1 releases, it closes a circuit from ground over the back contacts of relays 2–CS1, 4–MF, and 2–ON1, front contacts of relays 2–CS2, 4–SP, and 2–SI, conductor 210 to battery through the upper winding of relay 4–TM. Relay 4–TM operates and, since relay 2–SI is operated, opens the operating circuit for relay 4–ON which thereupon releases slowly. Relay 4–ON, in releasing, disconnects relay 2–CT from conductor 107 thereby releasing the hold magnets of line link switches 101 and of the district and office link switches 103 to restore the originating end of the connection to normal. The release of these switches opens the circuit of relay 2–A and that relay opens the shunt around the lower windings of relays 2–CS and 2–CS1 to restore the incoming trunk at the tandem office to normal. Relay 2–A also opens the operating circuit of relay 4–ON to insure that the latter relay will remain deenergized. The release of relay 4–ON also opens the locking circuits of relays 2–CT1, 2–CS2, and 4–SP causing these relays to release. With relay 2–CS2 released, relay 2–SI also releases, in turn releasing relay 2–RV. The release of relays 2–CS2 and 4–SP releases relay 4–TM and the trunk circuit is restored to normal.

*Calling Line in Other Than First Office*

In the foregoing description it was assumed that the calling line was in the first or No. 0 office. In order to more completely describe the office scanning function of the identifier, it will now be assumed that the calling line is in the No. 4 office and that the numerical designation is the same as above assumed so that the identification tone will appear on conductors 1500, 1503, 1504, and 1507. Scanning of the thousands conductors of the No. 0 office will take place as above described, but, since no tone is found on any of these conductors, relay 19–OFK is not operated while relay 19–OF0 is operated.

When relay 17–P reoperates, following the test for the tone on the thousands conductors of the first office, a circuit is closed from battery through the winding of relay 19–OF1, back contact of relay 19–OFEA, front contact of relay 19–OF0, conductor 1705, back contacts of relays 19–OFK and 19–OFKC, front contact of relay 17–PC2, back contact of relay 18–EP, front contact of relay 17–P, back contact of relay 19–OFKC, conductor 1704, front contact of relay 19–OF0, back contacts of relays 19–OF1, 19–OF2, 19–OF3, 19–OF4, and 19–OFE, conductor 1900, back contact of relay 19–OFKA to ground on conductor 1710. Relay 19–OF1 operates in this circuit, in turn operating relay 19–OF1A. Relay 19–OF1 closes a locking circuit for itself over its own front contact, back contacts of relays 19–OF2 to 19–OFE to ground over conductor 1900 as above traced.

Relay 19–OF1 opens its own operating circuit as well as the operating circuit of relay 19–OF0, but relay 19–OF0 is held operated under the control of relay 17–P in a circuit from battery through the winding of relay 19–OF0, front contact of relay 19–OF0, conductor 1704, back contact of relay 19–OFKC, front contact of relay 17–P, back contact of relay 18–EP, front contact of relay 17–PC2, back contacts of relays 19–OFKC and 19–OFK, conductor 1705, front contact of relay 19–OF0, back contact of relay 19–OFEA, and thence over the locking circuit of relay 19–OF1 to ground.

Relay 19–OF1, in operating, opens the operating circuit for relay 14–TH0 and closes a circuit for the thousands connector relay associated with the second office, which connects the thousands output conductors from the number network of the second office to the detectors. When relay 17–P releases, it enables the detectors as previously described and also releases relay 19–OF0 followed by relay 19–OF0A.

Since the calling line was assumed to be in the No. 4 office, relay 19–OFK will not be operated and when relay 17–P reoperates, a circuit is closed for relay 19–OF2 extending from battery through the winding of relay 19–OF2, front contact of relay 19–OF1A, back contact of relay 19–OF0A, conductor 1705 and thence as above traced over the front contact of relay 17–P to conductor 1704, back contact of relay 19–OF0A, front contact of relay 19–OF1A, back contacts of relays 19–OF2 to 19–OFE to ground over conductor 1900 as above traced. As in the case of relay 19–OF1, the operating circuit includes back contacts of the steering relays which have not yet been operated as well as those which have been previously operated and released, together with the front contact of the steering relay which controlled the test just completed. It will be noted that the operation of the steering relays and the transfer of the connection from one number network to another take place while the detectors are disabled.

Relay 19–OF2 operates in the above-traced circuit, in turn operating relay 19–OF2A. The operation of relay 19–OF2 disconnects the thousands output conductors of the second office from the detectors and connects those of the third office to the detectors. Relay 19–OF2 also holds relays 19–OF1 and 19–OF1A until relay 17–P releases, at which time the third office is tested for the presence of the calling line signal. Since the calling line is not in the third office, relay 19–OFK is not operated and relays 19–OF3 and 19–OF3A are similarly operated to test the number network of the fourth office for the identification tone, followed by the release of relays 19–OF2 and 19–OF2A. After the test of the fourth office without relay 19–OFK being operated, relays 19–OF4 and 14–OF4A are operated and the thousands digit output conductors of the number network at the fifth office are tested. Since it was assumed that the calling line is in this office, the presence of tone on conductor 1500 causes the detector 1639 to function and connect ground to conductors 1612 and 1617.

Ground on conductors 1612 and 1617 is extended over front contacts of relays 25–ICA0 and 22–OCA, conductors 2512 and 2517, front contacts of relay 25–TH to battery through the windings of relays 25–THA2 and 25–THA7. Relays 25–THA2 and 25–THA7, in operating, connect ground over back contacts of relay 23–OFK, front contacts of relays 22–OCA and 25–ICA0, conductor 1902, and thence as previously traced to battery through the winding of relay 19–OFK. Relay 19–OFK operates relay 19–OFKA which closes a circuit from ground over front contacts of relays 19–OFKA and 19–OF4A, conductor 1914 to battery through the winding of relay 25–OF4. Relay 25–OF4 operates in this circuit and locks to ground over its own front contact and the front contact of relay 22–DW. With relay 25–OF4 operated, a circuit is closed from battery through the winding of office check relay 23–OFK, back contacts of relays 25–OF0 to 25–OF3, front contact of relay 25–OF4 to ground. Relay 23–OFK operates in this circuit and closes a holding circuit for relay 19–OF4 which may be traced from ground on conductor 1710, front contact of relay 19–OFKC, conductor 1920, front contacts of relays 25–ICA0, 22–OCA, 23–OFK, 25–OF4, 22–OCA, 25–ICA0, conductor 1924, front contact of relay 19–OFKC to battery through the winding of relay 19–OF4. Relay 19–OF4 is also held operated in a circuit from battery through the winding of relay 19–OF4, front contact of relay 19–OF4A, back contacts of relays 19–OF3A to 19–OF0A, conductor 1904, resistor 17–OFL, front contact of relay 19–OFK, which is later supplemented by the front contact of relay 19–OFKC, to ground on conductor 1710, and the identifier will proceed to identify the remaining digits in the manner previously described.

*Office Identification From Hundreds Digit*

It is possible that at the moment the identifier is connected with a number network, the identification signal, although directed to one of the conductors being scanned, will be shorted out by the central office switches or may be lost in a surge that is induced in the signaling path. If this interference comes during the time that the amplifier detectors are enabled and lasts long enough, it can cause failure to identify the digit. If this happens during the scan for office and thousands identification, the identifier continues to scan the thousands output conductors of the number networks of the remaining offices.

Assuming that such an interference occurs at the time the identifier is scanning the output conductors of the fifth office in the foregoing description, relay 19–OFK is not operated and therefore when relay 17–P reoperates, a circuit is closed from battery through the winding of relay 19–OFE, front contact of relay 19–OF4A, back contacts of relays 19–OF3A to 19–OF0A, conductor 1705, and thence as previously traced to conductor 1704, over the back contacts of relays 19–OF0A to 19–OF3A, front contact of relay 19–OF4A, back contact of relay 19–OFE to ground over conductor 1900. Relay 19–OFE operates in this circuit and locks over a back contact of relay 19–OF0A, front contact of relay 19–OFE to ground on conductor 1900, in turn operating relay 19–OFEA. With relay 19–OFE operated, since relay 19–OF0 is released at this time, battery is disconnected from conductor 1604 and none of the connector relays can operate. Therefore, the detectors are inactive even though enabled by the subsequent release of relay 17–P. In the manner previously described, relays 19–OF4 and 19–OF4A are held operated under the control of relays 19–OFE and 17–P.

With relay 19–OFEA operated, a circuit is closed from battery through the winding of relay 17–HS, back contact of relay 16–HK, front contact of relay 18–THSA, conductor 1706, back contact of relay 18–ESA, front contact of relay 18–THSA, back contact of relay 19–OFKE, front contact of relay 19–OFEA, conductor 1707, front contact of relay 18–THSA, and thence over the locking circuit of relay 17–THS to ground on conductor 1710. Relay 17–HS operates in this circuit and locks over its front contact and the back contacts of relays 17–TS, 17–US, and 17–ES to ground on conductor 1710. Relay 17–HS also operates relay 18–HSA as previously described. With relay 17–HS operated, the operating and locking circuits of relay 17–THS are opened but relay 17–THS is held operated under the control of relay 19–OFEA and over the operating and locking circuits of relay 17–HS. With relay 18–HSA operated, ground is disconnected from conductor 1606 and connected to conductor 1607.

The disconnection of ground from conductor 1606 causes relay 25–TH to release and the connection of ground to conductor 1607 following the release of relay 25–TH causes relay 25–H to operate. As previously described, the release of relay 25–TH disconnects the output conductors of the amplifier detectors from the thousands relays 25–THA0 to 25–THA7 and connects them to the hundreds relays 25–HA0 to 25–HA7.

When relay 17–P releases, relays 19–OF4 and 19–OFA4 release.

When relay 17–P again operates, relay 19–OF0 is reoperated, the circuit extending at this time from battery through the winding of relay 19–OF0, front contact of relay 19–OFEA, back contacts of relays 19–OF4A to 19–OF0A, conductor 1705, and thence as previously traced over the front contact of relay 17–P to conductor 1704, back contacts of relays 19–OF0A to 19–OF4A, front contact of relay 19–OFEA, back contact of relay 19–OF0A, front contact of relay 19–OFE to ground on conductor 1900. Relay 19–OF0 operates in this circuit and locks in a circuit from battery, through the winding of relay 19–OF0, front contact of relay 19–OFEA, front contact of relay 19–OF0 to ground on conductor 1900. With relays 19–OF0 and 17–HS operated, a circuit is closed from battery through ballast lamp 16–OF, front contact of relay 19–OF0, conductor 1604, back contact of relay 19–OF4 and of the other office steering relays, front contact of relay 19–OF0, winding of relay 14–H0, conductor 1431, front contact of relays 17–HS, back contacts of relays 17–TS, 17–US, 18–L0, and 17–ES, front contact of relay 16–ON to ground, so that the detectors are now connected to the hundreds output conductors of the first office. The identifier will now scan the hundreds digit output conductors from the number networks of the offices in turn, in the manner described for scanning the thousands digit conductors.

When relay 19–OF0A is operated, as above described, it opens the above-traced locking circuit for relay 19–OFE, but relay 19–OFE is held operated in a circuit from battery through the winding of relay 19–OFE, front contact of relay 19–OFEA, front contact of relay 19–OF0, conductor 1705, and thence over the front contact of relay 17–P as previously traced to conductor 1704, front contact of relay 19–OF0, front contact of relay 19–OFEA, front contact of relay 19–OF0 to ground on conductor 1900.

When relay 17–P releases, the above-traced holding circuit for relay 19–OFE is opened and that relay releases in turn releasing relay 19–OFEA. With relays 19–OFE and 19–OFEA released, the original operating circuit for relay 19–OF0 is restored and the holding circuit for relay 17–THS is opened so that relays 17–THS and 17–THSA are released. The identifier is now able to rescan each office as above described, except that on this second attempt the identifier will look for a signal in the hundreds output conductors instead of on the thousands output conductors.

When a signal is detected, the information is transmitted to the outpulser and the office identification is registered in the outpulser in the manner previously described.

*Failure to Identify Office on Second Trial*

If during this second attempt the identifier fails to detect a signal, relays 19–OFE and 19–OFEA will be operated as on the first attempt. With relays 19–OFEA and 18–HSA operated, a circuit is closed from battery through the winding of relay 18–EP, back contact of relay 18–THSA, front contacts of relays 19–OFEA and 18–HSA to ground, operating relay 18–EP which grounds conductor 1624 completing a circuit over front contacts of relays 25–ICA0 and 22–OCA, conductor 2300, back contact of relay 24–IF1 to battery through the winding of relay 24–1TR. Relay 24–1TR operates in this circuit and locks to ground over its own contact and front contact of relay 22–DW. With relay 24–1TR operated and relay 23–OFK unoperated, a circuit is completed from ground over front contact of relay 24–1TR, back contact of relay 23–OFK, back contact of relay 24–IF to battery through the winding of relay 24–IF. Relay 24–IF operates in this circuit and locks to ground over its own front contact and front contact of relay 22–ON. Relay 24–IF extends its locking ground through the winding of relay 24–IF1 to battery through resistor 24–IF1R, but relay 24–IF1 cannot operate, being shunted by the operating ground for relay 24–IF over a back contact of relay 24–IF1 which extends to resistor 24–IF1R in shunt of the winding of relay 24–IF1. With relay 24–IF operated, a circuit is closed from ground over front contact of relay 24–1TR, back contact of relay 23–OFK, front contact of relay 24–IF, back contacts of relays 24–IF1 and 26–CFTF to battery through the winding of relay 24–TTST. Relay 24–TTST operates and connects battery through resistor 26–TTR, back contact of relay 24–TTB, front contact of relay 24–TTST to the start conductor 2600 for the trouble ticketer. If the trouble ticketer is idle, it connects ground to conductor 2601 operating relay 26–TTC to connect a plurality of circuits to the trouble ticketer so that the trouble ticketer will print a record of the information which has been set up in the outpulser, including the identity of the trunk circuit and the stage of the operation of the outpulser at which the trouble ticketer was called in. Relay 26–TTC also closes a circuit from ground over its front contact, front contact of relays 22–OCA and 25–ICA0, conductor 1940 to battery through the winding of relay 19–TBL operating relay 19–TBL. With relay 19–TBL operated, the operating circuits of relays 18–EP, 18–ES1, 18–ESA, 18–THSA, 18–HSA, 18–TSA, and 18–USA are connected to the trouble ticketer to record which of these relays was operated at the time the trouble occurred. In addition relay 19–TBL, in operating, connects ground to conductor 1804 to record which identifier is in use. If relay 19–OFEA is operated or relays 18–ES2 and 18–ESA are both operated, ground is connected to conductor 1805 to indicate that the trouble occurred during a second attempt to identify the calling line number.

When the trouble ticketer has been connected to the outpulser and the information recorded, it connects ground to conductor 2602 and a circuit will be completed over front contact of relay 24–TTST to battery through the winding of relay 24–TTB. Relay 24–TTB connects ground to conductor 2602 to mark the trouble ticketer busy to other outpulsers.

If the trouble ticketer had been busy when the outpulser attempted to seize it, ground would have been present on conductor 2602 and relay 24–TTB would be operated at once.

With relay 24–TTB operated, the circuit of relay 22–DW is opened and relay 22–DW releases. The release of relay 22–DW opens the circuit of relay 25–ICA0 restoring the identifier to normal. The release of relay 22–DW also releases the register and check relays that were operated on the first attempt to identify. With relay 22–DW released, relay 20–Z is operated and relay 20–W held operated as previously described.

With relays 25–ICA0 and 25–DW released, relay 24–1TR is released, opening the shunt around the winding of relay 24–IF1, permitting that relay to operate. The release of relay 24–1TR also opens the circuit of relay 24–TTST, releasing the trouble ticketer and in turn relay 24–TTB. When relay 24–TTB releases, the operating circuit for relay 22–DW is closed extending as previously traced except it extends over a front contact of relay 24–IF1 instead of over a back contact of relay 24–IF. With relay 22–DW reoperated, the holding circuit for relay 20–W is opened and that relay releases, completing a circuit from ground over front contact of relay 22–OCA, back contact of relay 20–W, front contact of relay 20–Z, front contact of relay 20–DW to battery through the winding of relay 25–ICA1 connecting the outpulser to the other identifier, which will attempt to identify the calling line number in the manner described for the first identifier.

If the second identifier successfully identifies the calling line, the outpulser completes its functions and the call is completed as previously described.

If the second identifier also fails to identify the office in which the calling line is located and connects ground to the conductor corresponding to conductor 1624, a circuit is completed from that conductor, front contact of relay 25–ICA1, front contact of relay 22–OCA, conductor 2300, front contact of relay 24–IF1 to battery through the winding of relay 24–2TR. As in the first trial, a trouble ticket is made, after which relay 24–TTB is operated and relay 22–DW is released. A circuit is now closed from battery through the winding of relay 23–IRL, front contacts of relays 24–2TR, 24–IF1, and 24–TTB, back contact of relay 22–DW to ground, operating relay 23–IRL to release the identifier.

When relay 24–TTB operates with relay 24–2TR operated, a circuit is closed for relay 24–MF. Relay 24–MF prepares the outpulsing circuit and when relay 21–TT operates, relay 24–SP operates and locks under the control of relay 24–MF. With relay 24–SP operated, a circuit is closed from battery through the winding of relay 23–ID2, front contact of relay 24–2TR, back contacts of relays 20–CCFK and 23–ETMI, front contact of relay 24–SP to ground. The key pulse signal is transmitted, as previously described, followed by the identification digit. With relay 23–ID2 operated, the outpulsing circuit is extended to oscillators 2100 and 2102 to transmit the digit 2 to the tandem sender. During the transmission of the information digit, since relay 23–ID2 is operated, a circuit is closed for end-pulsing relay 20–EP which extends from battery through the winding of relay 20–EP, back contact of relay 20–EP, front contact of relay 23–ID2, front contact of relay 20–IDS, back contact of relay 20–KP, back contact of relay 20–PG1 and thence to ground as previously traced. Relay 20–IDS is held operated under the control of relay 20–PG1. When relay 20–PG1 operates at the end of the information digit, relay 20–IDS releases and on the next release of relay 20–PG1, relay 20–RL is operated to restore the outpulser to normal as previously described.

In the tandem sender, information digit register relays 3–0 and 3–2 are operated, completing a circuit from ground over front contact of relay 3–ON, front contact of relay 3–0, back contacts of relays 3–1, 3–4, and 3–7, front contact of relay 3–2, upper winding of information failure relay 3–IF, winding of relay 3–NL0 to battery. With relay 3–IF operated, relays 3–CW and 3–TR are operated, relay 3–CW extending its operating ground to the position link to cause the link to select an idle operator position. Relay 3–TR connects the trunk circuit to the position link and the selected operator position and releases relay CSX so that the calling number may be registered under the control of the operator as described in the above-identified Breed et al. application. The release of the outpulser releases relay 4–MF in the trunk circuit to establish the talking circuit between the operator position and the calling subscriber.

If neither identifier succeeds in identifying the office, it may indicate a break in the tone circuit and means is provided to lock up the connection if there are an unusual number of trouble tickets showing failure to identify the office on second trial and it seems desirable to trace calls on which such tickets occur. For this purpose, a key in the miscellaneous circuit for the trouble ticketer is operated, in turn operating a relay which connects ground to conductor 2603 and to corresponding conductors leading to other outpulsers. If now a second trial is made, without identifying any of the digits, a circuit is completed from ground on conductor 2603, back contacts of relays 23–UK, 23–TK, 23–HK, and 23–THK, front contact of relay 24–2TR to battery through the winding of relay 24–TKL. When a trouble ticket has been made, the key pulse signal and the information digit are transmitted to the tandem sender, relay 20–EP being operated during the transmission of the information digit. With relay 20–EP operated, when relay 20–PG1 releases, a circuit is closed from battery through the winding of relay 20–OTPT, back contacts of relays 26–LK0 and 26–TKLB, front contact of relay 26–TKL, front contact of relay 20–EP, back contacts of relays 20–US to 20–KP, back contact of relay 20–PG1, front contacts of relays 24–SP and 24–MF to ground. Relay 20–OTPT operates in this circuit and closes an obvious circuit for relay 26–LK0. Relay 26–LK0 is slow to operate and after an interval locks over its own front contact, front contact of relay 26–TKL and conductor 2604 to ground in the miscellaneous circuit. With relay 26–LK0 operated, ground is connected to conductors 2605 to 2608 which are connected in the other outpulsers to the conductor corresponding to conductor 2609 to operate relays like relay 26–TKLB in those outpulsers. In addition, relay 26–LK0 releases relay 20–OTPT after which relay 26–TKLB also operates.

During the time that relay 20–OTPT is operated, a circuit is closed from battery through resistor 22–TPT, front contacts of relays 20–OTPT, 24–TRS, and 22–TKCI, conductor 2206, crosspoint 700, conductor 407, front contact of relay 4–MF to ground through the lower winding of relay 4–TM operating relay 4–TM. When a call is to be held for tracing relay 4–LU (not shown) is operated in the frame circuit and relay 4–TM locks over its front contact, front contact of relay 4–SP, back contact of relay 2–S1, front contact of relay 4–LU to battery through resistor lamp 4–LUR. With relay 4–TM operated, a holding circuit is closed for relay 4–ON over back contact of relay 2–SI and front contact of relay 4–TM. Relay 4–TM also opens the operating circuit for relay 2–S so that relay 4–ON remains operated to hold the district and office link switches 103, the district junctor 102, the line switches 101, and the calling line under the control of the maintenance force.

With relay 26–TKLB operated, relay 20–RL operates in a circuit from battery through its winding, front contacts of relays 23–IRL, 26–TKLB, 26–TKL, 20–EP, and thence as above traced over the back contact of relay PG–1 to ground. Relay 20–RL operates in this circuit, releasing the outpulser and the outpulser link. The release of the outpulser also releases relay 4–MF in the trunk circuit to permit an operator to obtain the calling line number from the calling subscriber. With relay 4–TM locked operated, the restoration of the calling subscriber's telephone to the switchhook is ineffective to release the connection.

Relay 26–LK0 remains operated under the control of the miscellaneous circuit, thereby holding relay 26–TKLB operated in all of the outpulsers. If, under this condition, the same or another outpulser again encounters a condition where identification failure occurs on second trial, relay 26–TKL is operated and since relay 26–TKLB is held operated, relay 20–RL operates in response to the release of relay 20–PG1 following the operation of relay 20–EP and the outpulser is released in the manner previously described.

*Forced Release of Identifier*

As above described, the identifier is normally released by the outpulser removing ground from conductor 1600 and releasing relay 16–ON.

However, if the outpulser fails to release relay 16–ON, for example because identification is incomplete, the identifier is arranged to force its release by operating relay 18–EP to ground work-completed conductor 1624.

The manner in which relay 18–EP is operated when no office identification is made has been described.

When the identifier has identified the units digit, the outpulser will check that digit and release the identifier before relay 17–P can reoperate. If relay 16–ON is not released, when relay 17–P reoperates following the registration and check of the units digit, a circuit is closed from battery through the winding of the end of steering relay 17–ES, front contact of relay 18–USA, back contacts of relays 18–TSA, 18–HSA, and 18–THSA, conductor 1706, and thence as previously traced to conductor 1707, back contacts of relays 18–THSA, 18–HSA, and 18–TSA, front contact of relay 18–USA, back contact of relay 17–ES to ground on conductor 1710. Relay 17–ES operates in this circuit, locks over back contact of relay 18–ESR and its own front contact to ground on conductor 1710 and operates relay 18–ESA. Relay 17–ES opens its operating circuit and the operating circuit of relay 17–US, but relay 17–US is held operated under the control of relay 17–P in the manner described for the previous digit steering relays. Relay 17–ES opens the circuit of relay 14–UO, disconnecting the number network from the detectors and removes ground from conductor 1609. When relay 17–P releases, relays 17–US and 18–USA release. With relay 18–USA released, a circuit is closed from battery through the winding of relay 18–ES1, front contact of relay 18–ESA, back contact of relay 18–USA to ground on conductor 1903.

When relay 17–P reoperates, if all of the digit check relays have been operated by the outpulser, all-check relay 17–AK operates in a circuit which may be traced from battery through the winding of that relay, front contacts of the check relays 16–UK, 16–TK, 16–HK, and 16–THK, back contacts of relays 18–ESR and 18–ES2, front contacts of relays 18–ES1, 18–ESA, 19–OFKC, and 17–PC2, back contact of relay 18–EP, front contact of relay 17–P, front contacts of relays 19–OFKC, 18–ESA, and 18–ES1 to ground on conductor 1710. Relay 17–AK operates in this circuit and closes a circuit for the end of steering relay 18–ESR, which may be traced from battery through the winding of relay 18–ESR, front contact of relay 17–AK, front contact of relay 18–ES1 to ground on conductor 1903. Relay 18–ESR, in operating, opens the previously traced locking circuit for relay 17–ES, but closes a holding circuit for relay 17–ES under the control of relay 17–P. Therefore, when relay 17–P next releases, relays 17–ES and 18–ESA also release. With relay 18–ESA released, a circuit is closed from battery through the winding of relay 18–ES2, back contact of relay 18–ESA, front contact of relay 18–ES1 to ground on conductor 1903.

With relay 18–ES2 operated, a circuit is closed from battery through the winding of relay 17–ES, front contacts of relays 18–ES2 and 17–AK to ground on conductor 1710, reoperating relay 17–ES and in turn relay 18–ESA. With relay 18–ES2 operated, the operation of relay 18–ESA completes a circuit for operating end-pulsing relay 18–EP. Relay 18–EP connects ground to the work-completed conductor 1624 leading to the outpulser as a signal that the outpulser should release the identifier. Relay 18–EP also disconnects ground from contacts 1720 and 1721 of the pulse generating relay stopping the pulsing.

*Digit Missing*

From the previous description of the identification of the digits following office identification by means of the thousands digit, it will be apparent that the advance of the digit steering relays does not depend upon the successful identification of the previous digit, but that, for each digit that is registered in the outpulser, a corresponding check relay is operated in the identifier by the outpulser. If the outpulser fails to register one or more digits, the corresponding check relay in the identifier will fail to operate. If one or more check relays are not operated, the all-check relay 17–AK cannot operate and the identifier will be recycled to make a second attempt to find the missing digits.

This will of course be the condition when, as above described, the office identification is made from the hundreds output conductors. To further illustrate the operation when digits are missing, let it be assumed that, having identified the office in connection with the hundreds digit, the tens digit also is not identified. Having registered the hundreds digit by which the office was identified, the outpulser will operate check relay 16–HK and, under the assumption that the units digit was also identified and registered, check relay 16–UK will be operated.

In the outpulser, relays 23–OFK, 23–HK, and 23–UK will be operated, but, since relays 23–THK and 23–TK are not operated, identifier release relay 23–IRL cannot operate and the identifier remains connected with the outpulser.

Since check relays 16–THK and 16–TK are not operated, relay 17–AK cannot operate in response to the operation of relay 17–P following the operation of relays 17–ES, 18–ESA, and 18–ES1, but a circuit is closed from battery through the winding of relay 17–THS, back contacts of relays 16–THK, 18–ESR, and 18–ES2, front contacts of relays 18–ES1, 18–ESA, 19–OFKC, and 17–PC2, back contact of relay 18–EP, front contact of relay 17–P, front contacts of relays 19–OFKC, 18–ESA, and 18–ES1 to ground on conductor 1710. Relay 17–THS operates in this circuit, locking as previously described and operating relay 18–THSA. Relay 17–THS also operates the thousands connector relay for the identified office. Relay 18–THSA grounds conductor 1606 operating relay 25–TH in the outpulser so that the digit to be identified will be registered as the thousands digit. In addition, relay 18–THSA closes a circuit from ground on conductor 1903, front contacts of relays 18–ES1 and 18–THSA to battery through the winding of relay 18–ESR, causing the latter relay to operate.

With relay 18–ESR operated, the operating circuit for relay 17–THS is opened, but relay 17–THS is held operated over its previously traced locking circuit. Relay 18–ESR opens the previously traced holding circuit for relay 17–ES and closes a holding circuit for that relay which may be traced from battery through the winding of relay 17–ES, front contacts of relays 18–ESR, 18–ESA, 18–ES1, 18–ESA, 19–OFKC, and 17–PC2, back contact of relay 18–EP, front contacts of relays 17–P, 19–OFKC, 18–ESA, and 18–ES1 to ground on conductor 1710.

When relay 17–P releases, this holding circuit for relay 17–ES is opened and that relay releases, in turn releasing relay 18–ESA. At the same time, the detectors are enabled to permit the detection of the missing thousands digit. If it is detected successfully, two of the relays 25–THA0 to 25–THA7 in the outpulser will operate and lock, in turn operating the corresponding ones of the thousands register relays 25–TH0 to 25–TH7 followed by thousands check relay 23–THK. Relay 23–THK operates check relay 16–THK in the identifier.

With relay 18–ES1 operated, the release of relay 18–ESA closes a circuit from battery through the winding of relay 18–ES2, back contact of relay 18–ESA, front contact of relay 18–ES1 to ground on conductor 1903. Relay 18–ES2 operates in this circuit and locks over its own front contact to ground on conductor 1903.

When relay 17–P reoperates, a circuit will be closed from battery through the winding of relay 17–TS, back contact of relay 16–TK, front contacts of relays 16–HK and 18–THSA, conductor 1706, back contact of relay 18–ESA, front contacts of relays 19–OFKC and 17–PC2, back contact of relay 18–EP, front contact of relay 17–P, front contact of relay 19–OFKC, conductor 1707, front contacts of relay 18–THSA, back contacts of relays 17–HS, 17–TS, 17–US, and 17–ES to ground on conductor 1710. Relay 17–TS operates and locks as previously described, holding relay 17–THS operated until relay 17–P releases to enable the detectors. Assuming that the tens digit is identified on this trial, it will be registered on the tens register relays 26–T0 to 26–T7 in the outpulser and check relay 23–TK will be operated, in turn operating relay 16–TK. With relays 23–OFK, 23–THK, 23–HK, 23–TK, and 23–UK operated, the circuit of relay 23–IRL will be completed to release the identifier and the call will be completed as previously described.

If during the second attempt as above described, one of the missing digits, for example the tens digit, had not been identified, relay 17–ES would be reoperated at the next operation of relay 17–P in a circuit from battery through the winding of relay 17–ES, front contact of relay 16–UK, front contact of relay 18–TSA, back contacts of relays 18–HSA and 18–THSA, conductor 1706, and thence as previously traced to conductor 1707, back contacts of relays 18–THSA and 18–HSA, front contacts of relay 18–TSA, back contacts of relays 17–US and 17–ES to ground on condluctor 1710. Relay 17–ES operates, in turn operating relay 18–ESA. With relay 18–ES2 operated, the operation of relay 18–ESA operates relay 18–EP to connect ground to conductor 1624 operating relay 24–ITR in the outpulser.

The outpulser thereupon releases the first identifier and connects with the second identifier as above described. If the second identifier identifies some but not all of the digits, it will also ground conductor 1624 and the outpulser will transmit an identification failure signal to the tandem office. Since one or more digits were identified on both trials, relay 26–TKL will not be operated even though conductor 2603 is grounded by the miscellaneous circuit.

*Tip Party*

In the foregoing description, it has been assumed that the calling station was an individual line. For a two-party line such as that serving substations 110 and 111, the sleeve conductor 132 will be connected to two equipment number terminals such as terminals 133 and 134. Each substation will have an individual designation and the equipment number terminals will be cross connected to the directory number terminals representing the individual designations.

Assuming that the designation of substation 110 is 0990 and that of substation 111 is 9999, equipment terminal 133 individual to the ring substation 110 will be cross connected to directory number terminal 0990 and thence to terminating network 910 comprising capacitor 911, grounded resistor 912, and identifying resistors 913 and 914. Since the terminating network 910 is associated with a ring party substation having the designation 0990, resistor 913 will be connected to vertical conductor 915, representing thousands digit 0 and units digit 0 extending to a back contact of relay 10–TP0 and thence over conductor 1001 to the secondary number network and the individual network 1210 comprising grounded resistor 1211 and identifying resistors 1212 and 1213. Resistor 1212 is connected to vertical conductor 1450, identifying thousands digit 0. Resistor 1213 is connected to horizontal conductor 1451 identifying units digit 0. Resistor 914 will be connected to horizontal conductor 916 representing hundreds digit 9 and tens digit 9 extending to a back contact of relay 11–TP19 and thence over conductor 1101 to the secondary number network and therein to individual network 1310. Network 1310 comprises grounded resistor 1311 and identifying resistors 1312 and 1313. Resistor 1312 is connected to conductor 1451 identifying hundreds digit 9 and resistor 1313 is connected to conductor 1453 identifying the tens digit 9.

Equipment number terminal 134, associated with the tip party substation having the designation 9999, will be cross connected to directory number terminal 9999 and thence to terminating network 920 comprising capacitor 921, grounded resistor 922, and identifying resistors 923 and 924. Resistor 923 will be connected to tip party vertical conductor 925 representing thousands digit 9 and units digit 9 and extending to a front contact of relay 10–TP9. With relay 10–TP9 operated as will be described hereinafter, conductor 925 will be extended over conductor 1000 to individual secondary network 1200 and thereover to conductor 1400 identifying the thousands digit 9 and conductor 1407 identifying the units digit 9. Resistor 924 will be connected to tip party horizontal conductor 926 representing hundreds digit 9 and tens digit 9 and extending to a front contact of relay 11–TP19. With relay 11–TP19 operated, conductor 926 will be extended over conductor 1101 to individual secondary network 1310 and therethrough to conductor 1452 identifying hundreds digit 9 and conductor 1453 identifying tens digit 9.

Assuming that the subscriber on tip party substation 111 initiates a call which requires extension by way of the tandem office, the substation will be connected to the incoming conductors 104 and 105 of the trunk circuit of FIGS. 2 and 4 in the manner previously described.

During the establishment of this connection, the tip party indication is registered in the originating sender which passes this indication to the originating marker. While the marker is setting up the connection to the trunk of FIGS. 2 and 4, it connects high voltage battery to conductor 106, completing a circuit over a back contact of relay 4–SP through the winding of relay 2–TP, resistor 2–TPR to 48-volt battery. Relay 2–TP operates in this circuit and in turn operates relay T–TP1. With both relays 2–TP and 2–TP1 operated, a shunt extending through resistor 2–TPR1 and front contacts of relays 2–TP and 2–TP1 is connected around resistor 2–TPR as an indication to the marker that the tip party indication has been recorded in the trunk. After the marker has operated the district and office link switches 103, ground is connected to conductor 106 to hold relay 2–TP, and in turn relay 2–TP1, operated throughout the duration of the call.

When the outpulser has been connected with the trunk circuit as previously described, a circuit is closed from ground over front contacts of relays 2–TP and 2–TP1, back contact of relay 4–SP, conductor 404, crosspoint 700, conductor 2202, front contact of relay 22–TKCI, back contacts of relays 24–MF and 24–TRS to battery through the winding of relay 22–I2. Relay 22–I2 operates in this circuit and closes a circuit through the left winding of relay 24–TP operating the latter relay. Relay 24–TP, in operating, locks through its own right winding over its own front contact, winding of relay 24–PK, back contact of relay 23–IRL to ground over front contact of relay 22–ON. Relay 24–PK operates in this circuit and with relay 22–I2 operated, closes a circuit for operating relay 24–IK to permit the outpulser to continue its operations as previously described.

When the outpulser has been connected with an identifier, a circuit is closed from ground over front contacts of relays 24–TP, 22–OCA, and 25–ICA0, conductor 1601 to battery through the winding of relay 16–TPA. With relay 16–TPA operated, ground is connected to four conductors leading to the number networks of each office, other relays (not shown) being connected in parallel with relay 16–TPA to supply the requisite number of contacts. For example, relay 16–TPA connects ground through back contact of relay 13–MB to conductors 1440 to 1443 leading to the number network of the first office, where relays 10–TP0 to 11–TP19 are operated to disconnect the output conductors from the primary number network associated with ring party subscribers from the secondary number network and connect the output conductors associated with tip party subscribers to the secondary number network. Identification now takes place as described for the individual subscriber.

*Multiparty Lines*

The automatic number identification circuit of the present invention is not arranged to make identification for multiparty lines. For a multiparty line such as the line serving substations 120 to 123, the sleeve conductor is connected to a single equipment number terminal such as terminal 135 and this terminal is cross connected to the directory number terminals which are individual to the designations assigned to the substations 120 to 123. Assuming that one of the directory number terminals to which the terminal 135 is connected is directory number terminal 9349, the sleeve conductor will be extended to individual network 909 comprising capacitor 931, grounded resistor 932, and identifying resistors 933 and 934. Resistor 933 is left unconnected, while resistor 934 is connected to multiparty conductor 935 which extends in the secondary number network to an individual network comprising a grounded resistor 1321 and identifying resistor 1322. The resistor 1322 is connected to conductor 1408 leading to the identifier. The director number terminals of the other substations are similarly connected to the multiparty conductor 1408. Conductor 1408 is included in the group of conductors extended to the amplifier detectors when the identifier is making office identification by means of the thousands digit and, because interference may prevent the reception of the signal during the attempt to make thousands identification, a branch is also included in the group of conductors extended to the amplifier detectors when the identifier is making office identification by means of the hundreds digit.

The trunk circuit will be given either a ring party or a tip party indication resulting in the operation of either relay 16–RP or 16–TPA, but since the identifying circuit for the multiparty line extends as above outlined, it is independent of relays 10–TP0 to 11–TP19. The operation of the identifier is the same in either case. The identifier will attempt to make office identification in the manner previously described. With the thousands connector relay 14–TH0 operated, that relay, in addition to connecting the thousands output conductors from the number network of the first office to the amplifier detectors 1630 to 1639, connects the multiparty conductor 1408 to the party line amplifier detector 1640. Similarly, if the identifier has failed to make office identification over the thousands output conductors and operates relay 14–H0, the multiple of conductor 1408 will be connected to the party line detector 1640.

The fact that the call is from a multiparty line will be determined during the office scanning, since the signal will appear either on a digit output conductor or on the multiparty output conductors or neither, but never on both.

Assuming the signal is found on conductor 1408, while testing the thousands output conductors from office No. 0, amplifier detector 1640 functions to ground conductor 1625 leading to the outpulser, completing a circuit over front contacts of relays 25–ICA0 and 22–OCA, winding of relay 25–PTYA to battery. Relay 25–PTYA operates in this circuit and locks over conductor 2500 under the control of relays 23–IRL and 22–DW. It also closes a circuit for operating relay 25–PTY which locks under the control of relay 22–DW. With relay 25–PTY operated, relay 23–IRL is operated and locks under the control of relay 22–ON. Relay 23–IRL releases relay 25–PTYA and opens the circuit of relay 16–ON to release the identifier.

The operation of relay 23–IRL releases relay 2–ID which in turn releases relay 22–TNK to operate relay 24–MF as previously described, and also operates relay 4–MF in the trunk circuit. Relay 24–MF prepares the outpulsing circuit in which relay 21–TT operates to in turn operate relay 24–SP. With relays 24–SP and 25–PTY operated, a circuit is closed from ground over front contact of relay 24–SP, back contacts of relays 23–ETM1, 20–CCKF, and 24–2TR, front contact of relay 25–PTY to battery through the winding of relay 23–ID1. Relay 24–SP starts the pulsing circuit and the steering circuit which functions to control the transmission of the key pulse signal and the identification digit as previously described. With relay 23–ID1 operated, the outpulsing circuit is connected to oscillators 2100 and 2101 to cause the transmission of the digit 1 as the information digit. With relay 23–ID1 operated, relay 20–EP is operated immediately after the transmission of the information digit and the outpulser is released as previously described.

In the tandem sender, the reception of the information digit 1 causes relays 3–0 and 3–1 to operate, completing a circuit from ground over the front contacts of these relays through the upper winding of relay 3–0I and the winding of relay 3–NL0 to battery, operating these relays. Relay 3–0I operates relays 3–CW and 3–TR to cause the position link to connect an operator position with the incoming trunk while relay 3–NL0 indicates that the line is not being observed.

*Servicing Observing*

The service on subscriber lines may be observed for a number of reasons, but chiefly for complaints or for traffic measuring purposes. The service observing equipment is connected with the line by means of a service observing shoe. When the line is being observed, a special mark is needed on the accounting tape at the tandem office. With the service observing shoe connected to terminals of a line to be observed, a branch of the sleeve conductor of the line will be extended to the service observing equipment where for complaint observation it will be extended directly to one of a number of conductors connected with the number network. When the line is being observed for traffic measuring purposes, this connection is closed only if an operator observes on the line.

Assuming that the line of substation 100 is being observed, sleeve conductor 130 will be extended through the service observing equipment (not shown) to one of the service observing conductors, for example, conductor 1330. This conductor connects with an individual network 1331 comprising capacitor 1332, grounded resistor 1333, and identifying resistor 1334. Resistor 1334 is connected over conductor 1335 to a secondary network including grounded resistor 1336 and identifying resistor 1337, which is in turn connected to conductor 1435, leading to the identifier. Therefore, when tone is supplied to the sleeve conductor of substation 100, the tone will appear both on the digit conductors and on the service observing conductor 1435. The line designation will be identified as previously described and at the same time, amplifier detector 1641 will respond to the tone signal on conductor 1435 and connect ground to conductor 1626. Ground on conductor 1626 completes a circuit over front contacts of relays 25–ICA0 and 22–OCA to battery through the winding of relay 25–SOA. Relay 25–SOA operates and locks over its own front contact under the control of relays 23–IRL and 22–DW. Relay 25–SOA, in turn, operates relay 25–SO which locks under the control of relay 22–DW.

Assuming that relay 23–ID0 is operated indicating that the calling line designation was successfully identified, when relay 20–IDS operates to transmit the information digit, the outpulsing circuit will be connected over front contacts of relays 20–IDS, 23–ID0, and 25–SO to oscillators 2101 and 2102 to transmit the digit 3 as the information digit. In the tandem office, the information digit register relays 3–1 and 3–2 operate, in turn closing a circuit from ground over front contact of relay 3–ON, back contact of relay 3–0, front contact of relay 3–1, back contacts of relays 3–4, 3–7, and 3–10, lower winding of relay 3–AI, winding of relay 3–LO to battery. Relay 3–AI releases relay 3–CSX to direct the digits of the calling line number to the calling number registers. Relay 3–LO operates relay 3–LOB which transmits a signal to the transverter to cause an observation mark to be made on the accounting tape to indicate that the calling line is under observation.

Figure 21:
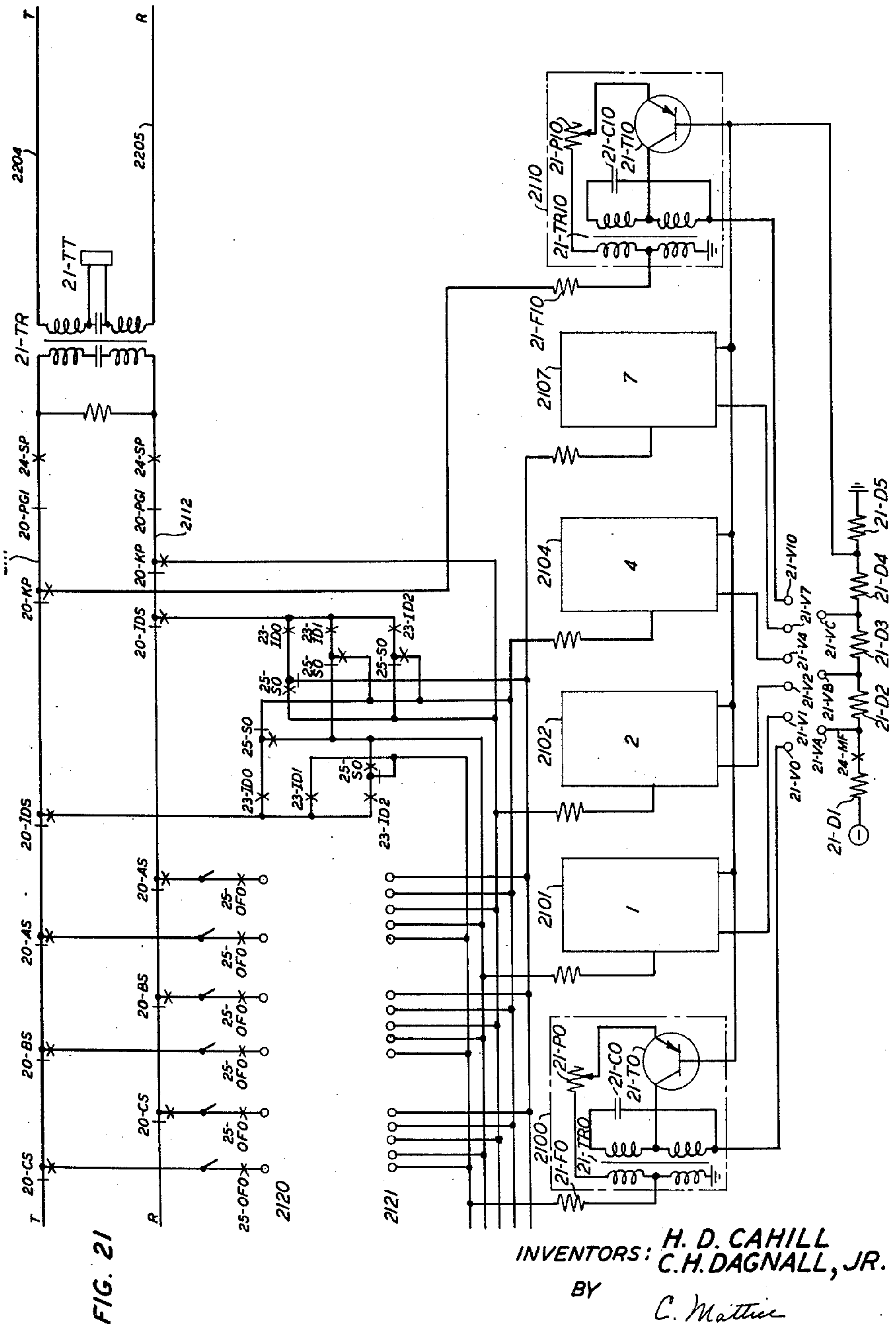
Figure 22:
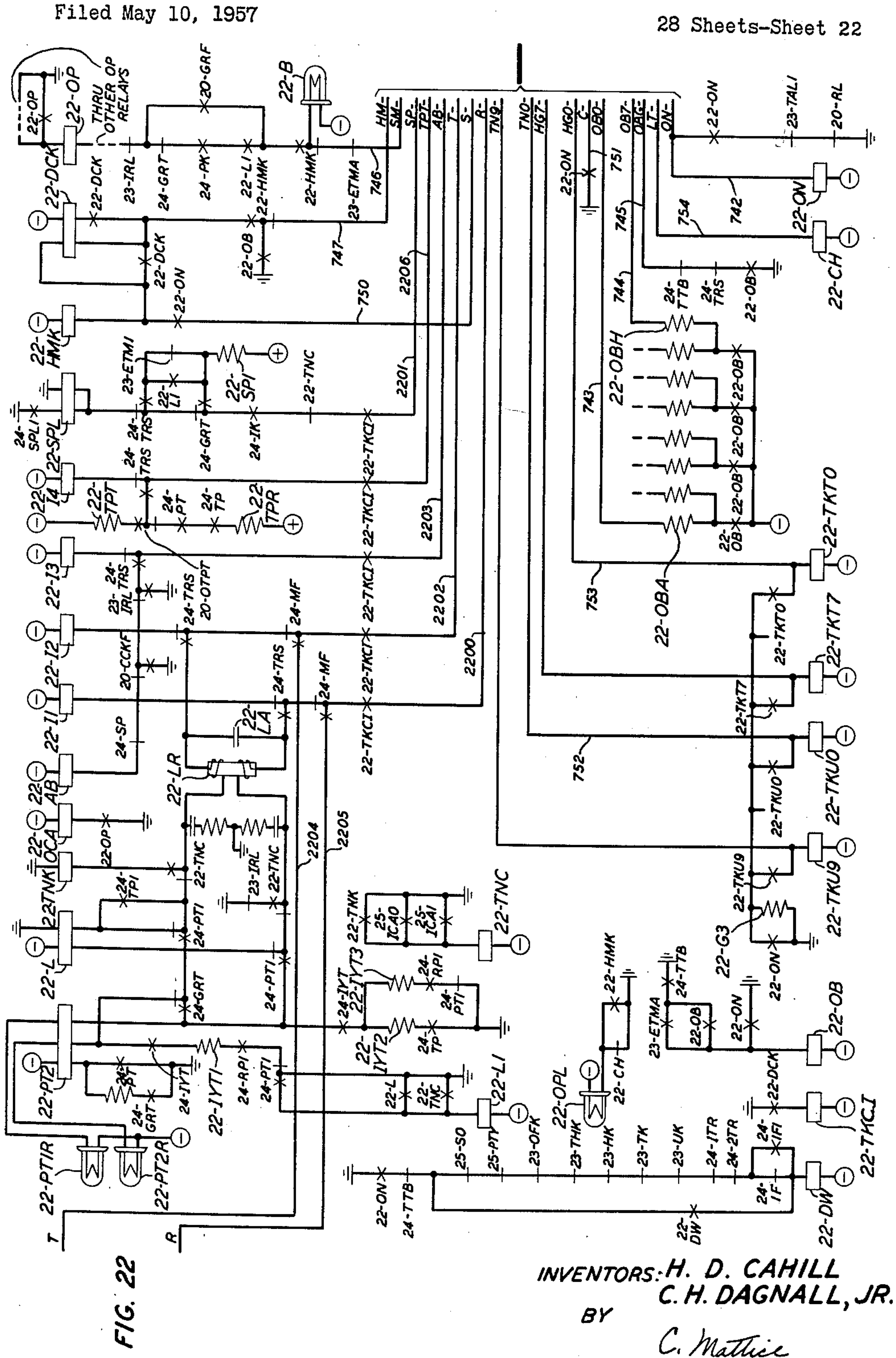
Figure 23:
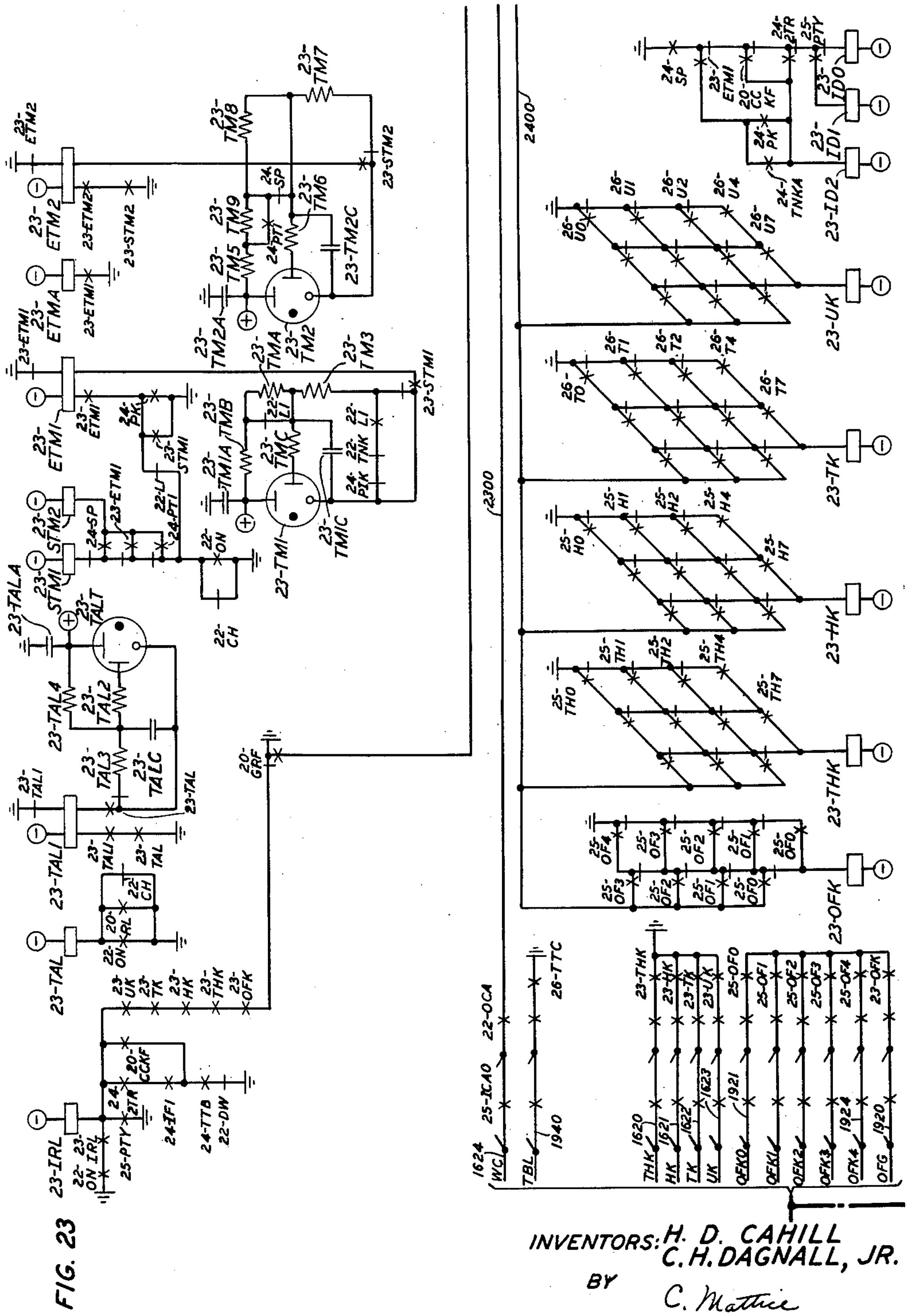
Figure 24:
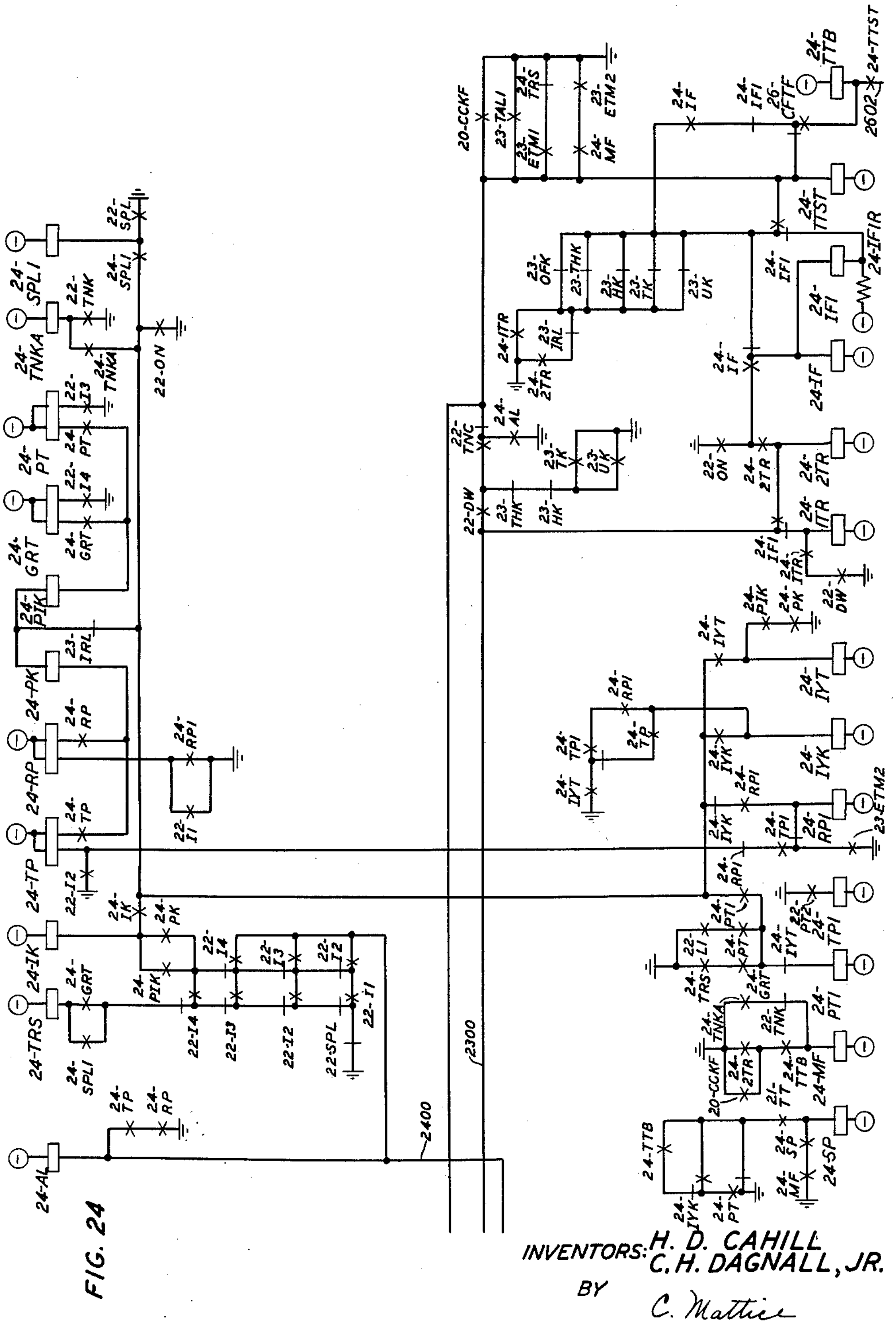
Figure 25:
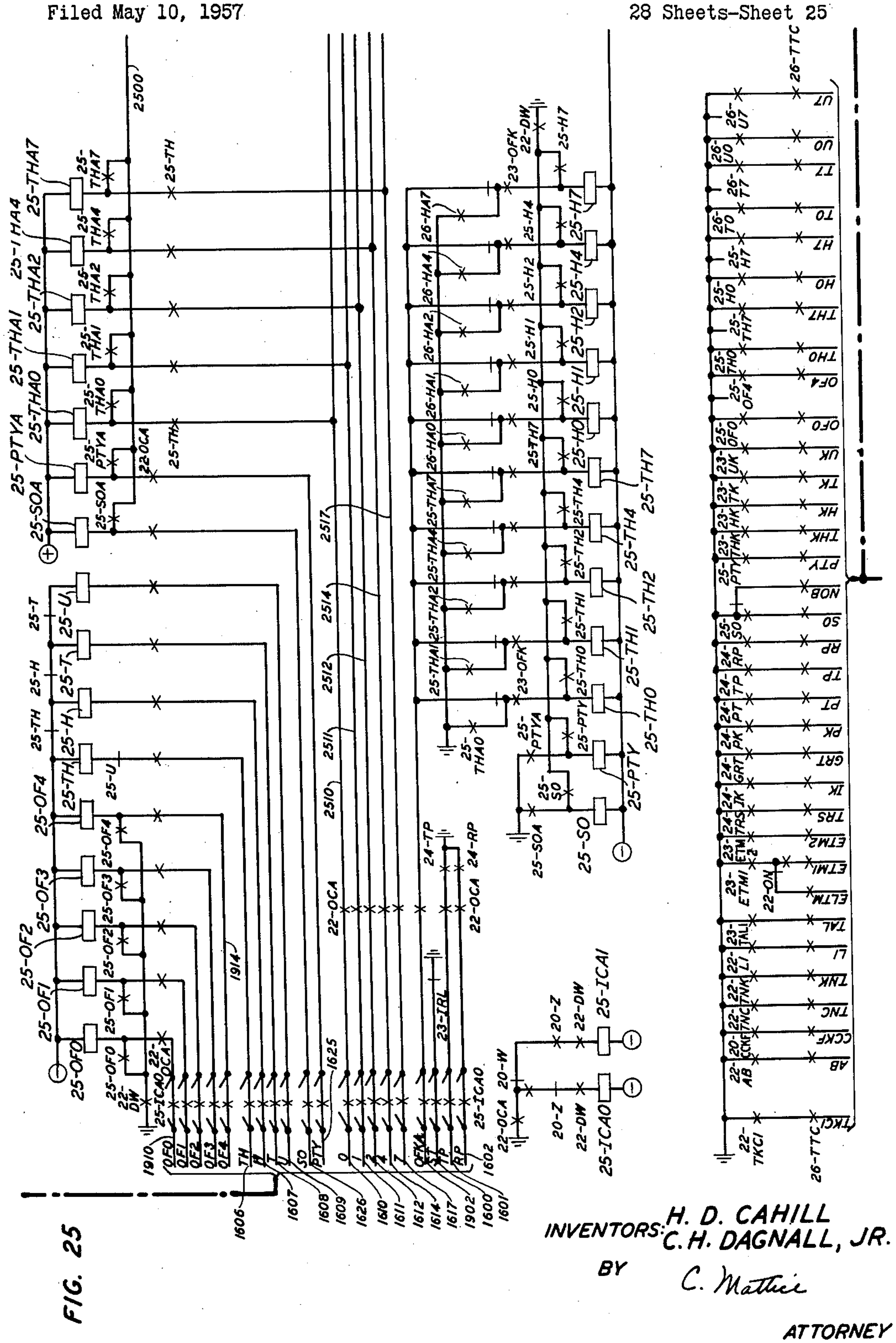
Figure 26:
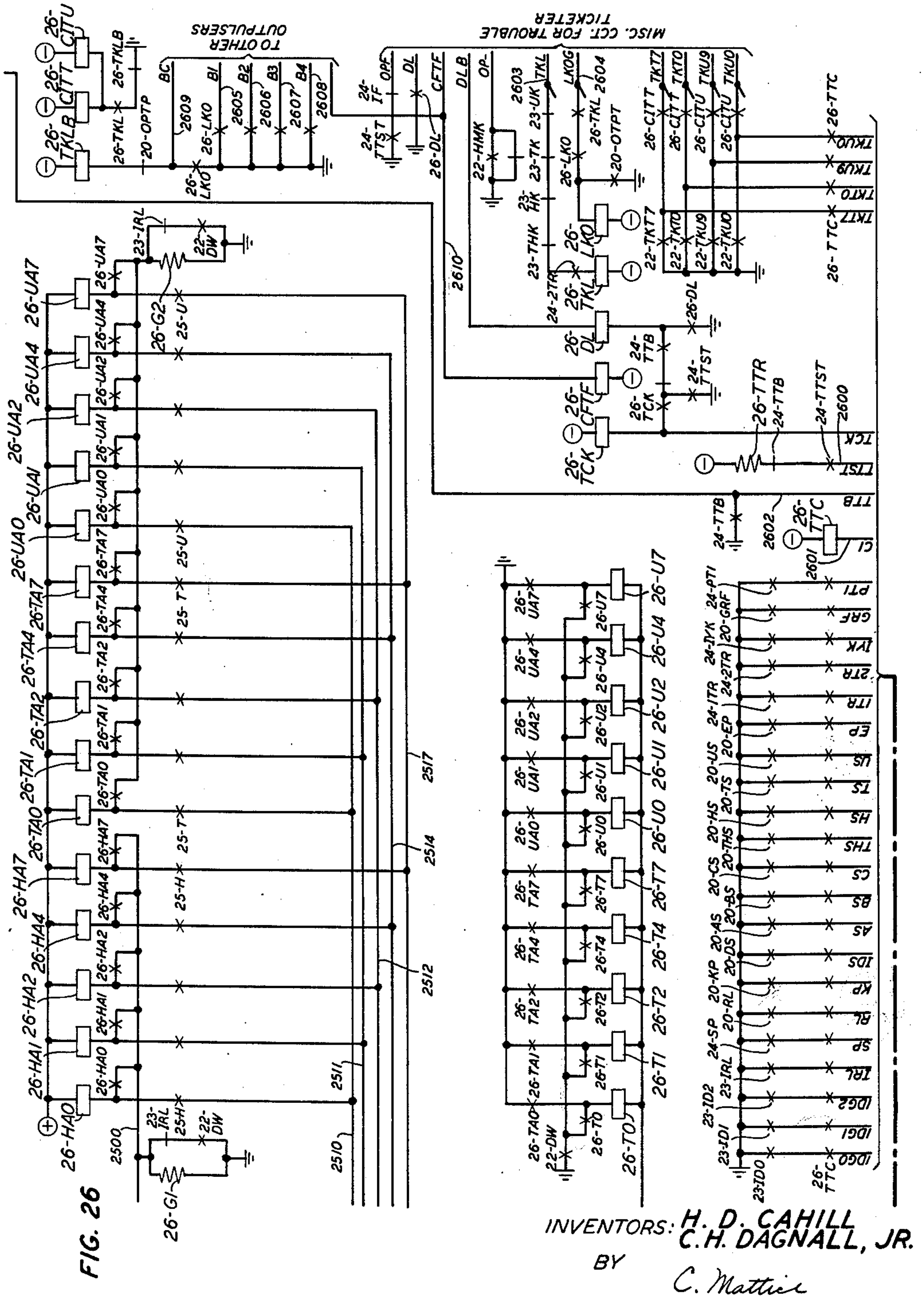
Figure 27:
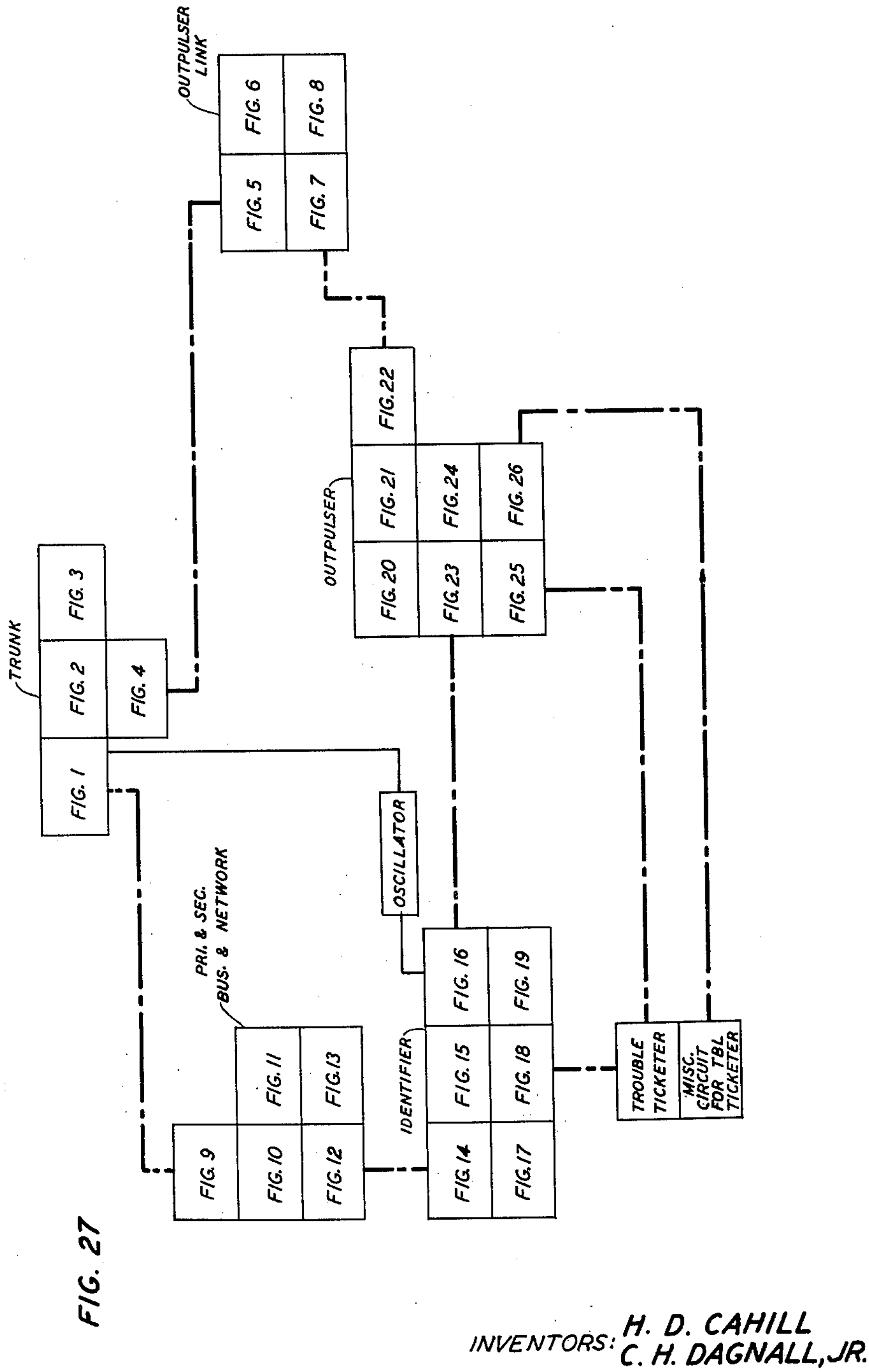
FIG. 27 shows the relationship between the various pieces of equipment and the manner in which the figures illustrating those pieces of equipment should be arranged.

It will be remembered that, following a successful identification of the calling line, relay 23–ID0 was operated and the information digit 0 was transmitted; that for a multiparty line, relay 23–ID1 was operated and the information digit 1 was transmitted and that for failure to identify relay 23–ID2 was operated and the digit 2 was transmitted. As described, when the successfully identified line is being observed, the information digit transmitted is the digit 3. As shown in FIG. 21, if relay 25–SO is operated in combination with relay 23–ID1, the outpulsing circuit is extended to oscillators 2100 and 2104 to cause the information digit 4 to be transmitted. If relay 25–SO is operated in combination with relay 23–ID2, the outpulsing circuit is extended to oscillators 2101 and 2104 so that the information digit 5 is transmitted. To summarize, the operation of relay 25–SO adds a predetermined value, namely 3 to the information digit transmitted when the line is observed.

*Identifier Lockout*

As previously mentioned, two identifiers are normally provided and the outpulsers use them alternately. It is of course obvious that both identifiers cannot scan at the same time. Therefore, a lockout relay such as relay 18–LO is provided in each identifier. The seizure of the identifier and the start of the pulsing relays is permitted to proceed, but as soon as relay 17–PC1 operates, ground is connected to conductor 1802 leading to the second identifier and, if the second identifier has been seized, to the winding of relay 18–LO2 in the other identifier. Similarly, if, when the first identifier is seized by an outpulser, operating relay 16–ON, and the second identifier has operated its relay PC1–2 corresponding to relay 17–PC1, ground will appear on conductor 1803 extending over the front contact of relay 16–ON to battery through the winding of relay 18–LO. With relay 18–LO operated, the circuit for operating the connector relays such as relay 14–TH0 is opened, ground is removed from conductor 1710 to prevent the advance of the office and digit steering relays, and the operating circuit for relay 18–HTC is opened. If relay 18–LO2 is operated in the second identifier, the circuit by which ground is connected to conductor 1803 is opened. As soon as the identifier which has started scanning is released, the lockout relay of the waiting identifier is released and it may proceed to make identification.

*Light Traffic*

In the foregoing description it was assumed that the identification was made during a heavy traffic period with relay 18–HTR operated. The distinction between light and heavy traffic periods is made in accordance with the length of time which elapses between successive seizures of the identifier. When the identifier is seized and is not locked out as above described, a circuit is closed from battery through the winding of relay 18–HTC, back contact of relay 18–LO, front contact of relay 16–ON to ground. Relay 18–HTC operates in this circuit and locks in a circuit from battery through its winding, back contact of relay 18–LO, front contact of relay 18–HTC, back contact of relay 18–HTR, back contact of relay 18–HTT to ground. When the identifier is released and relay 16–ON releases, a circuit is closed from battery through the winding of relay 18–HTR, front contact of relay 18–HTC, back contact of relay 16–ON to ground. Relay 18–HTR operates in this circuit and locks over its own front contact and the back contact of relay 18–HTT to ground and therefore remains operated even after relay 16–ON is operated at the next seizure of the identifier. Relay 18–HTR, in operating, opens the locking circuit of relay 18–HTC and relay 18–HTC releases. Relay 18–HTR starts the traffic timer, which includes gas filled tube 18–HTTT and capacitor 18–HTTC. Whenever the identifier is in use, capacitor 18–HTTC is normally connected in a discharging circuit through resistor 18–HTT2 and over a front contact of relay 16–ON, or over a front contact of relay 18–HTC, or over a back contact of relay 18–HTR. When the identifier is released, relays 16–ON and 18–HTC are released, as previously described, and relay 18–HTR is operated. With relay 18–HTR operated, +130-volt battery, which is connected to the cathode of tube 18–HTTT is also connected through resistor 18–HTTR, capacitor 18–HTTC, front contact of relay 18–HTR, back contact of relay 18–HTT, front contact of relay 18–HTR to ground through the winding of relay 18–HTT. Capacitor 18–HTTC charges in this circuit and the potential developed on the capacitor is applied through resistor 18–HTT1 to the control anode of tube 18–HTTT. If the charging continues for a sufficient length of time, tube 18–HTTT breaks down and relay 18–HTT operates over contacts of relay 18–HTR, and the main gap of tube 18–HTTT. Relay 18–HTT, in operating, locks over front contact of relay 18–HTR, front contact of relay 18–HTT, resistor 18–HTT3 to +130-volt battery and quenches tube 18–HTTT. The operation of relay 18–HTT opens the locking circuit for relay 18–HTR and that relay releases, in turn releasing relay 18–HTT, and the next call will proceed as for light traffic. If the identifier is reseized before relay 18–HTT operates, the operation of relay 16–ON closes the above-mentioned discharge circuit for capacitor 18–HTTC, thereby preparing the timing circuit to time the next idle period. Since relay 18–HTT was not operated, relay 18–HTR remains operated and the call is handled as for a heavy traffic condition. When the identifier is released, the timing circuit is ready to time the next idle interval.

If relay 18–HTR is not operated, whenever the outpulser grounds conductor 1902 to operate relay 19–OFK after the calling office has been identified, the operation of relay 19–OFK completes a circuit from battery through the winding of relay 19–OFKE, back contact of relay 18–HTR, front contact of relay 19–OFK to ground on conductor 1903. With relay 19–OFKE operated, ground on conductor 1902 is extended to the winding of relay 19–OFKA which operates, to ground one of the conductors 1910 to 1914 to identify the office in which the identification signal was found. With relay 18–HTR released, relay 19–OFK locks over its own front contact, back contact of relay 18–HTR, back contact of relay 17–ORK1 to ground on conductor 1903.

Assuming that the called line was found in the first office, with relay 19–OF0 operated office relay 25–OF0 will be operated in the outpulser to register the identity of the calling office. Relay 25–OF0 operates relay relay 23–OFK. With relays 23–OFK and 25–OF0 operated, conductor 1920 is connected to conductor 1921. Under heavy traffic conditions, when relay 19–OFKC operates immediately, as previously described, the outpulser provides a supplementary holding circuit for the office relay as previously traced. Under the present conditions, where the operation of relay 19–OFK is followed by the operation of relay 19–OFKE and the operation of relay 19–OFKC is delayed, ground on conductor 1710 will be extended over a back contact of relay 19–ORK, front contact of relay 19–OFK, conductor 1920 connected by the outpulser as above traced to conductor 1921, back contact of relay 19–OFKC to battery through the winding of relay 19–ORK. Relay 19–ORK operates and locks over its own front contact to ground on conductor 1710. With relay 19–ORK operated, when relay 17–P releases, a circuit is closed from battery through the upper winding of relay 17–ORK1, front contact of relay 19–ORK, back contact of relay 17–P, back contact of relay 19–OFKC, conductor 1704, front contact of relay 19–OF0, back contacts of relays 19–OF1 through 19–OFE to ground on conductor 1900. Relay 17–ORK1 operates and locks over its own front contact, to ground on conductor 1710. In addition relay 19–ORK also disconnects the output conductors of the detectors from conductors 1610 to 1617 leading to the outpulser and connects them in multiple to the winding of relay 16–OFX1 and +130-volt battery.

With relay 17–ORK1 operated and locked, the next operation of relay 17–P closes a circuit for relay 19–OF1 which extends as previously traced except that front contact of relay 17–ORK1 is substituted for the back contact of relay 19–OFK and conductor 1710 is connected to conductor 1900 over the back contacts of relays 18–HTR and 19–OFKC.

The identifier thereafter scans the remaining offices for the presence of tone in order to detect possible false cross connections in the number networks. If such a tone is detected, relay 16–OFX1 operates and locks over its own front contact and front contact of relay 16–ON. Relay 16–OFX1 in operating in turn operates relay 16–OFX4. With relay 16–OFX4 operated, relay 18–EP is operated to stop the advance of the office steering and ground conductor 1624 to signal the outpulser that it cannot proceed. Relay 24–1TR is operated and the trouble ticketer is called in as previously described. With relay 16–OFX4 operated ground is connected to conductor 1806 to record the fact that there has been a double office identification.

If no false tone is detected, office scanning will proceed until relays 19–OFE and 19–OFEA are operated as previously described, whereupon a circuit will be closed from battery through the winding of relay 19–OFKC, front contact of relay 19–OFEA, back contact of relay 18–HTR, front contact of relay 19–OFKE to ground on conductor 1903. Relay 19–OFKC operates in this circuit, disconnects ground from conductor 1900 thereby releasing relay 19–ORK and also opens the locking circuit of relay 17–ORK1 causing that relay to release. Digit identification will proceed as previously described.

*Amplifier Detector*

Figure 16:
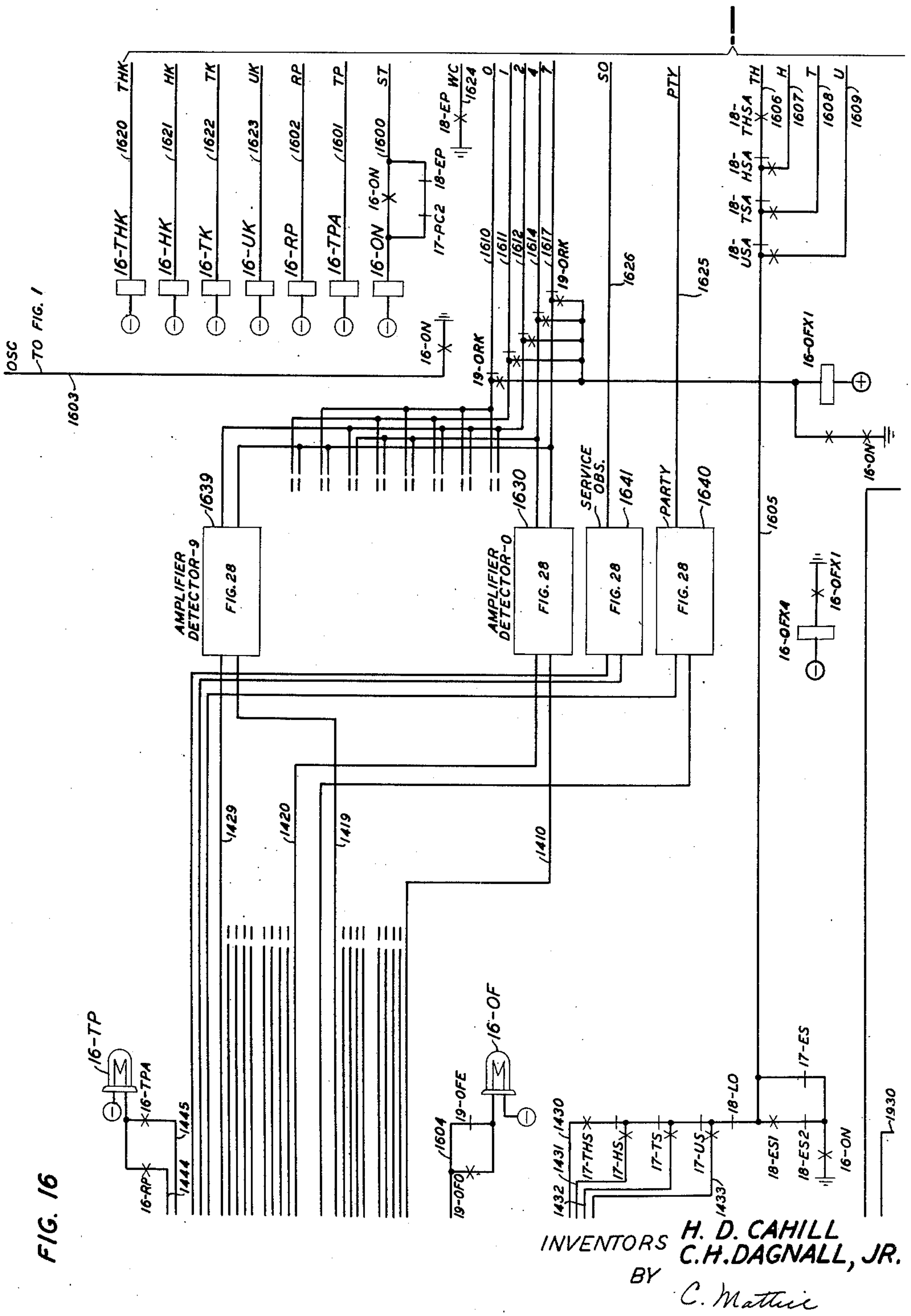
Figure 17:
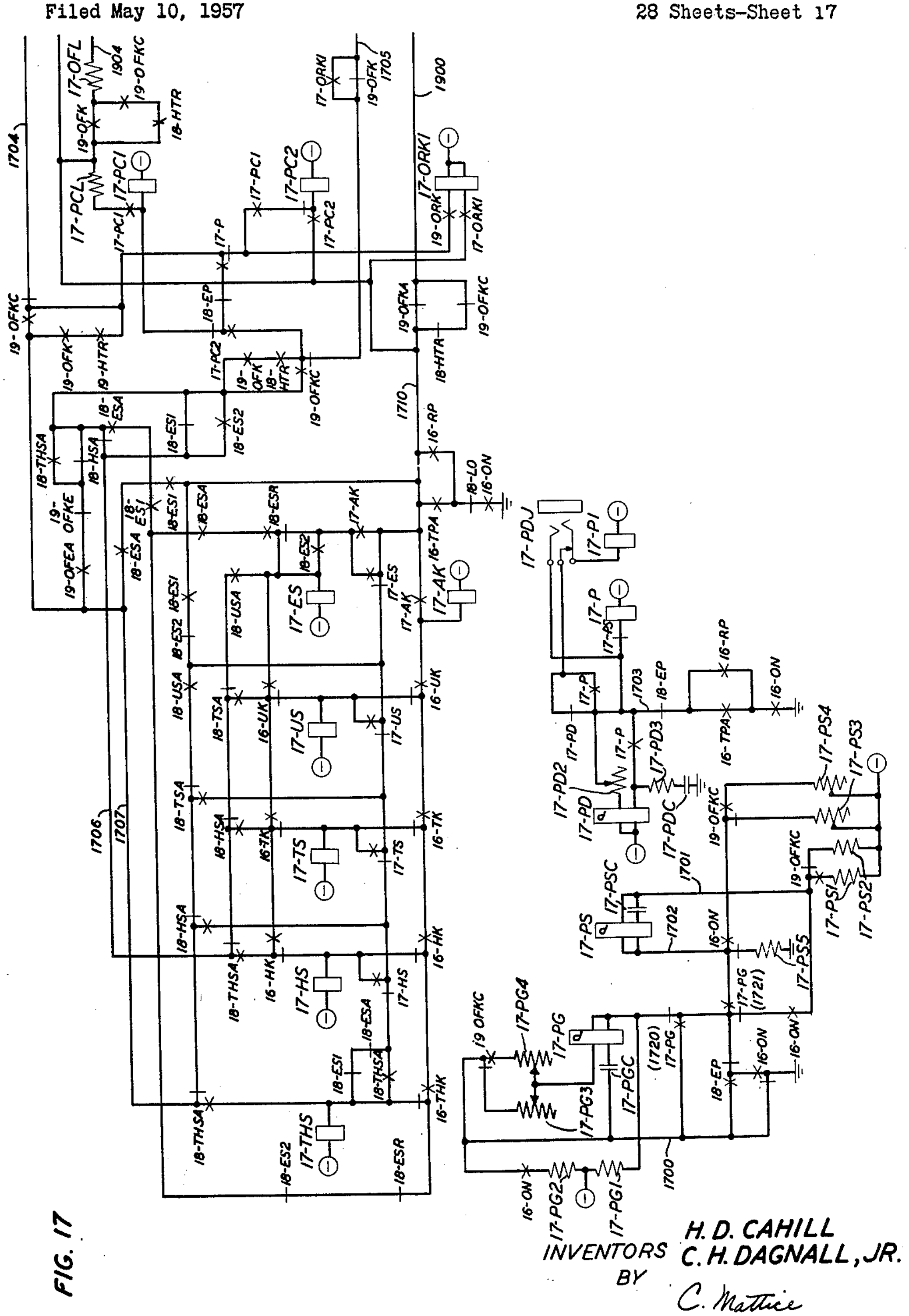
Figure 18:
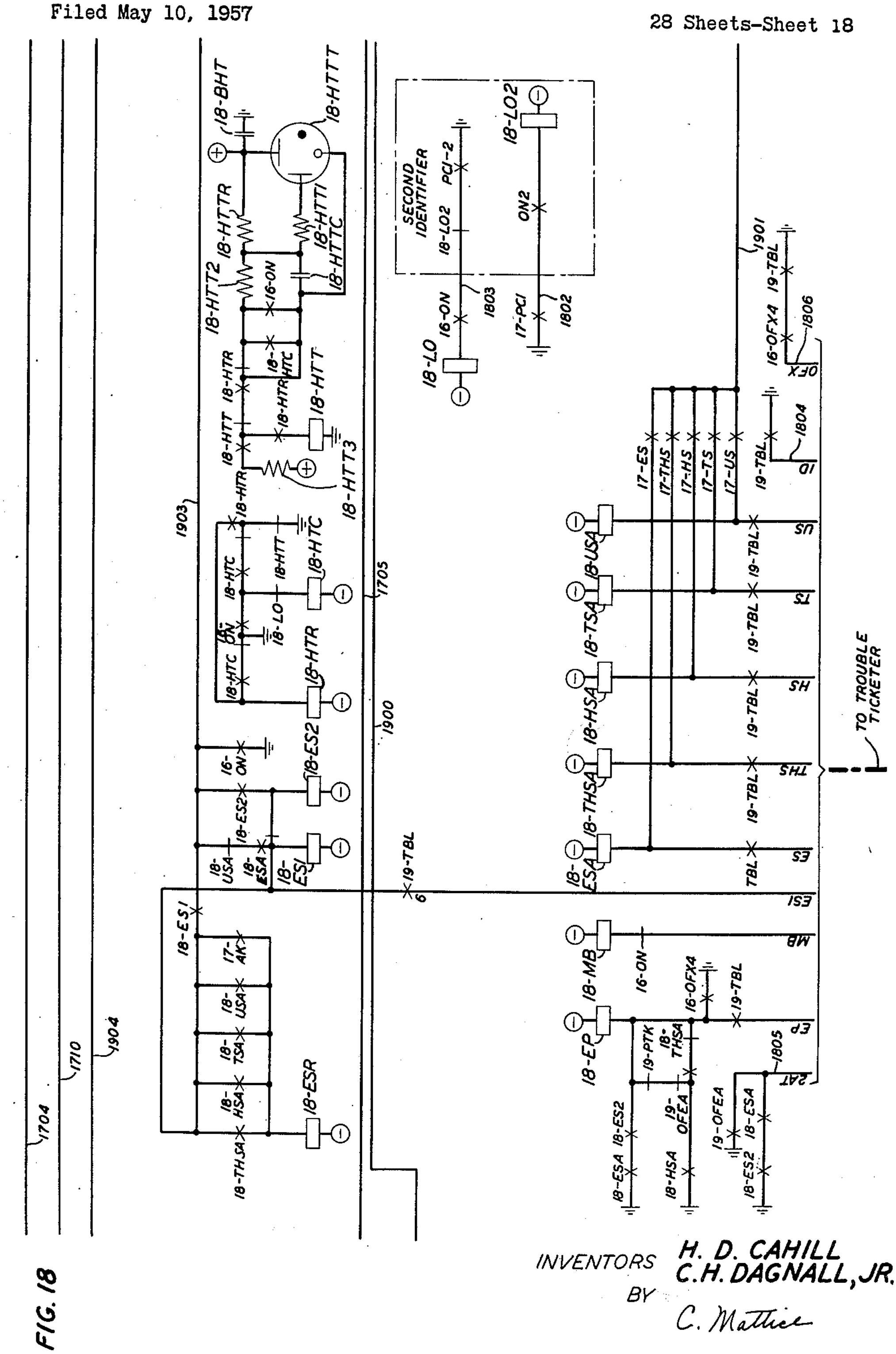
Figure 19:
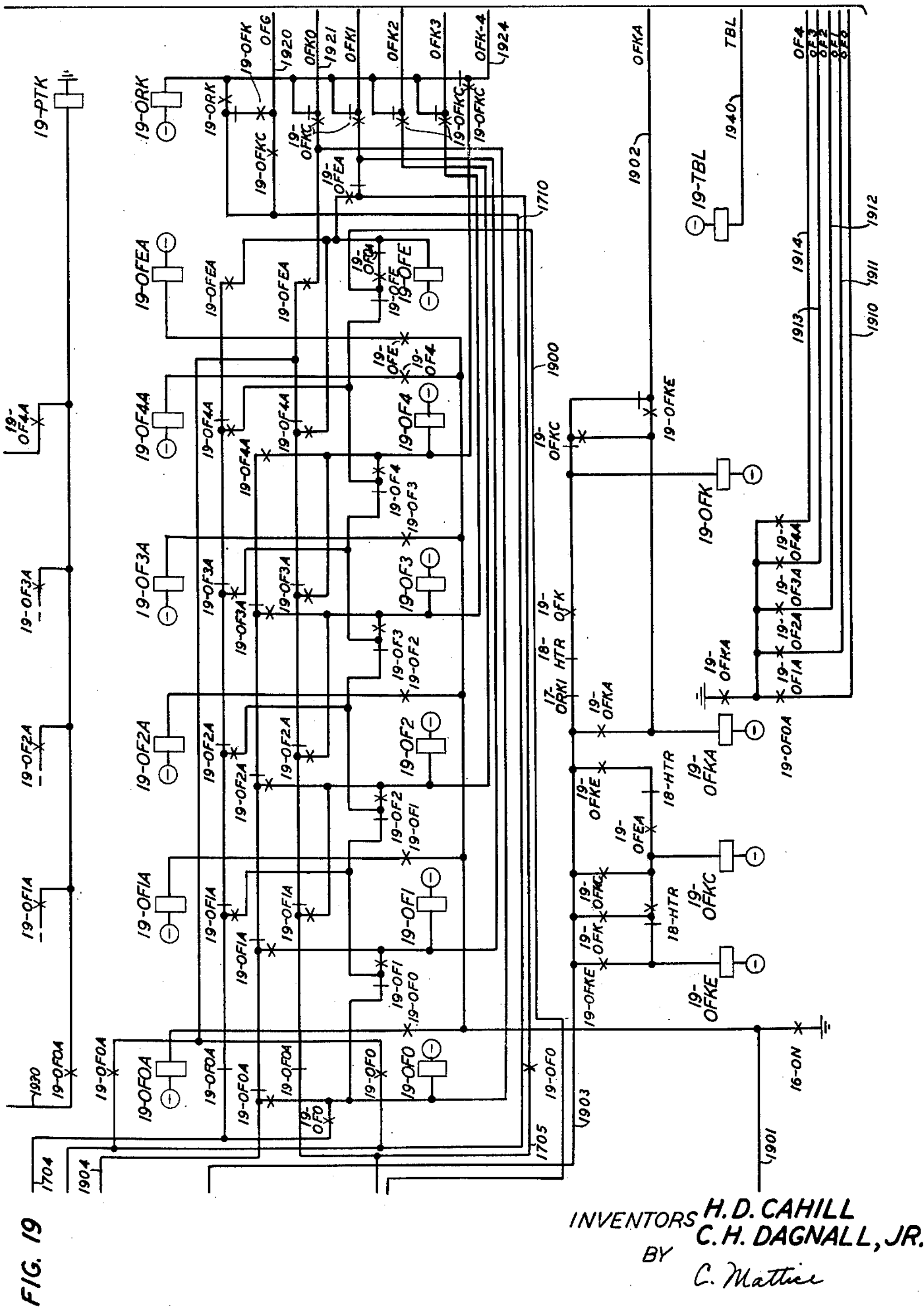
Figure 20:
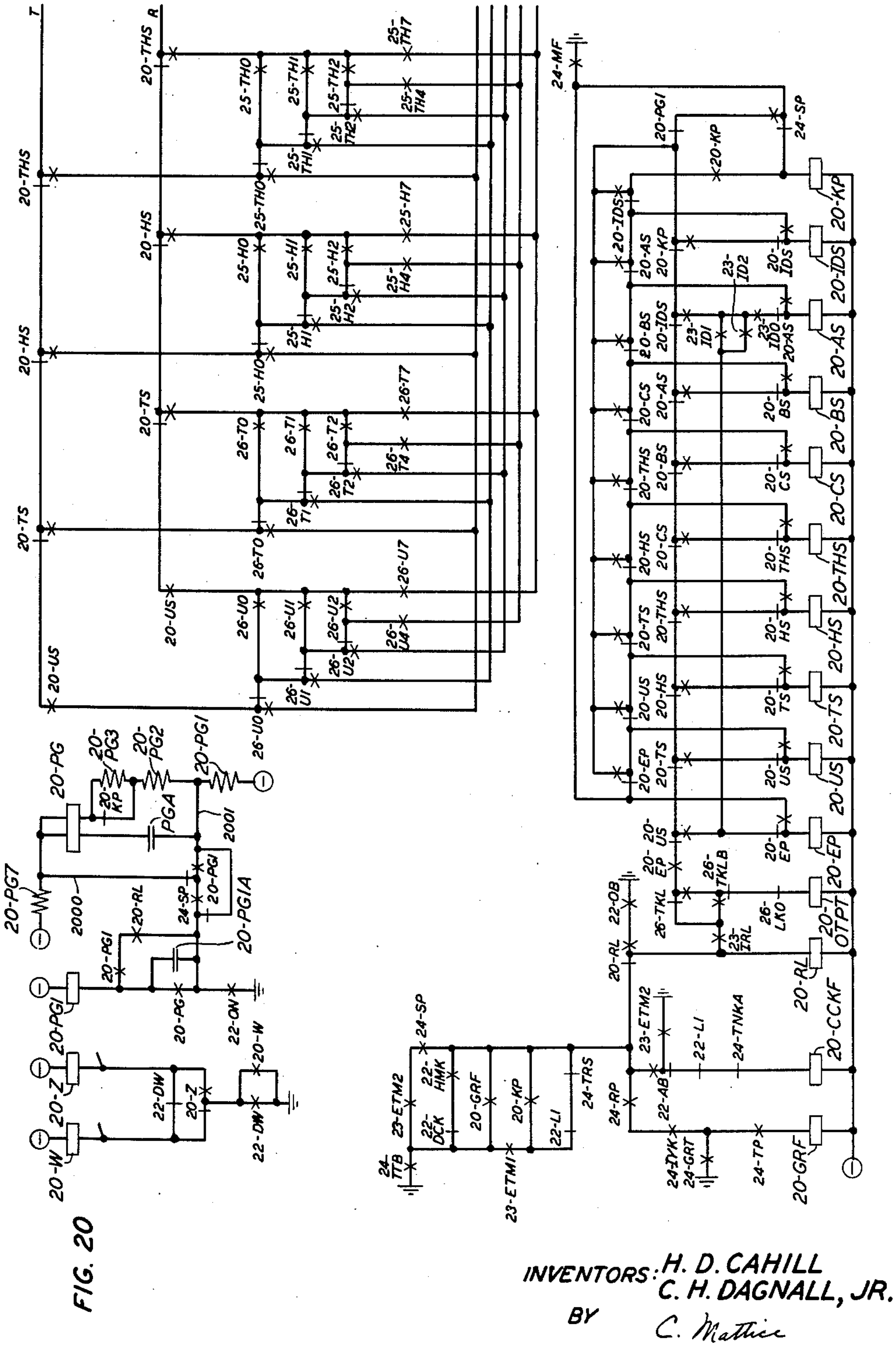
FIGS. 20 to 26 show the outpulser, FIG. 20 showing the outpulsing steering relays, FIG. 21 showing the tone generators, FIG. 22 showing the circuits for controlling the connection between the outpulser and the trunk circuit, FIG. 23 showing a plurality of timing circuits, FIG. 24 showing party indicating relays, and FIGS. 25 and 26 showing the register relays.

As indicated in FIG. 16, there are twelve amplifier detectors in the identifier, of which detectors 1630 to 1639 correspond to the ten digits 0 to 9, detector 1640 being used for detecting calls on multiparty lines and detector 1641 being used for detecting calls on which service is being observed. These amplifier detectors are identical except for the connections to the input and output conductors and therefore, a single amplifier detector has been shown in detail in FIG. 28 which will now be described.

Figure 28:
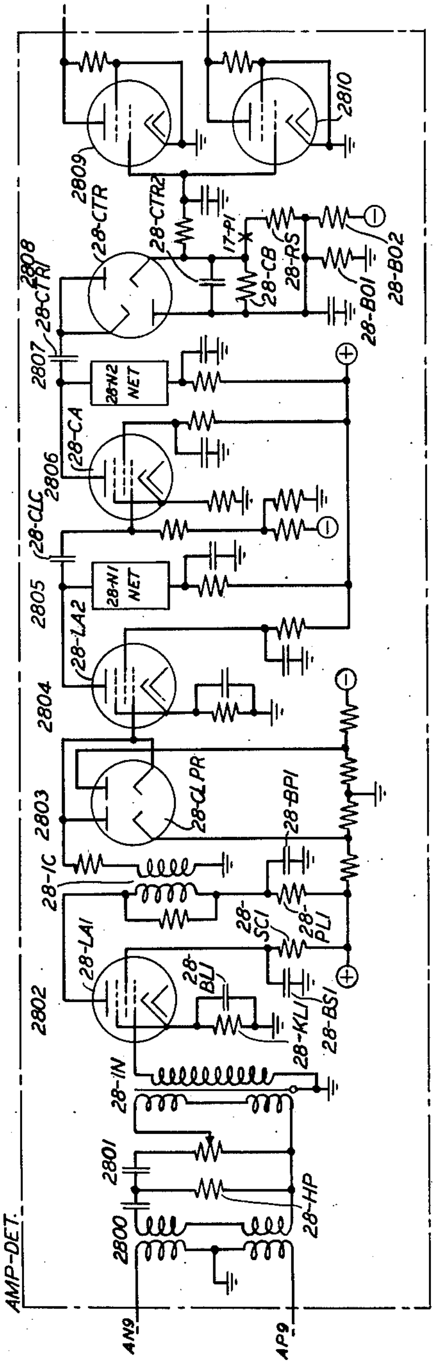
FIG. 28 shows in detail one of the amplifier detectors.

The amplifier detector of FIG. 28 consists of an input transformer 2800, a high pass filter 2801, a first linear amplifier stage 2802, a clipping stage 2803, a second linear amplifier stage 2804 having a tuned plate circuit 2805, a class C amplifier stage 2806 which also has a tuned plate circuit 2807, a dipper and bucket counter 2808, a control contact shown as a contact of relay 17–P1, and an output stage employing thyratrons 2809 and 2810.

The function of the amplifier detector is to receive a 5800-cycle signal whose voltage is between 125 and 250 microvolts, check it to be sure it is the identification signal, and operate two relays in the outpulser. It must reject other signals, some of which may have much higher voltages. The filter 2801 and the two tuned amplifiers 2804 and 2806 separate out noise and frequencies other than 5800 cycles. The class C stage is biased about 24 volts beyond cut-off so that it prevents transmission of low voltage noise. The counter 2808 makes sure that the input signal is not just an isolated surge containing a sufficient voltage of 5800-cycle noise, by counting cycles for about 8 milliseconds before operating the output thyratrons 2809 and 2810.

The primary winding of transformer 2800 is grounded at the mid-point so that a signal appearing on a conductor in either of the duplicate sets previously mentioned may be detected.

The signal arriving at the amplifier detector, having passed through transformer 2800, passes through the high pass filter 2801, which eliminates noise of the type induced from commercial current and low frequency disturbances caused by the operation and release of relays and switches connected to the sleeve conductor over which the identifying signal is received. Transformer 28–IN serves to match the low impedance of the input network to the high impedance of the grid in the first linear amplifier stage 2802 where the signal is amplified and passed through the transformer 28–IC to the second linear amplifier stage 2804. The clipping stage 2803 including tube 28–CLPR responds to a high voltage surge to limit the voltage on the grid of the tube 28–LA2 of the second amplifier stage 2804. This clipping stage helps prevent false operations of the amplifier detector.

The second linear amplifier stage has a network 28–N1 associated with its output circuit which is rather sharply tuned, and has a peak response at a frequency of 5800 cycles and is coupled to the class C stage by capacitor 28–CLC. The network 28–N2, associated with the output of the class C stage 2806 is tuned to the 5800-cycle frequency. Networks 28–N1 and 28–N2 separate out unwanted frequencies of noise so that the amplifier detector responds only to the indentification frequency. Network 28–N2 also converts the pulsing output of tube 28–CA into sine waves.

Capacitor 28–CTR1 charges through the left half of tube 28–CTR on the negative half cycles of the signal from stage 2806 then, on the following positive half cycle, capacitor 28–CTR1 discharges into capacitor 28–CTR2 through the right half of tube 28–CTR. This process repeats every cycle and the charge gradually builds up on capacitor 28–CTR2 to a point where thyratrons 2809 and 2810 break down. Resistors 28–BO1 and 28–BO2 control the point at which charging starts. Resistor 28–CB permits a small part of the charge to leak off capactor 28–CTR2 so that a charge resulting from a momentary surge will be gone before it can cause false operation of the thyratron.

The output stage including thyratrons 2809 and 2810 has three functions, namely, to detect the proper voltage level on capacitor 28–CTR2 corresponding to a "good" signal, to lock in the condition of the signal having been found so that capacitor 28–CTR2 can later be discharged without wiping out the indication, and, by the connections with the outpulser, to translate the digit into a two-out-of-five indication.

As previously described, relays 17–P1, etc. are normally operated during scanning, closing a contact in each amplifier detector which connects low resistance resistor 28–RS across capacitor 28–CTR2 to maintain the capacitor discharged. After the identifier has been connected to a set of output conductors from a number network, relays 17–P1, etc. are released, opening their contacts for 12 to 15 milliseconds to enable the amplifier detectors. During this time, if a signal is present, a charge builds up on capacitor 28–CTR2 sufficient to operate thyratrons 2809 and 2810. At the end of the 12 to 15 millisecond period, relays 17–P1, etc. are reoperated and capacitor 28–CTR2 discharges through resistor 28–RS whether or not the signal was present. If thyratrons 2809 and 2810 first, they remain conducting until shunted down by the locking ground from the register relays with which they are connected or until the high voltage supply circuit is opened.

The amplifier detectors 1640 and 1641 differ from that shown in FIG. 28 only in that a single output thyratron is employed and a single indicating relay is operated.

Means is provided in the identifier to ensure that the amplifier detectors are all connected to ring party identification conductors or to tip party identification conductors. For this purpose, whenever the identifier is connected with a secondary number network, for example with the number network of the first office, a circuit will be closed from ground through the winding of relay 19–PTK, front contact of relay 19–OF0A, conductor 1930 to the number network where it checks that the tip party relays are either all released or all operated. If all of the tip party relays are released, the circuit of relay 19–PTK will be extended over back contacts of relays 10–TP0 to 11–TP19, conductor 1444 and with relay 16–RP operated, over the front contact of relay 16–RP to battery through resistor lamp 16–TP. Similarly, if all of the tip party relays are operated, the circuit of relay 19–PTK will be extended over front contacts of relays 10–TP0 to 11–TP19 to conductor 1445, and with relay 16–TPA operated, over the front contact of relay 16–TPA to battery through lamp 16–TP. The operation or non-operation of relay 19–PTK is ineffective while the identifier is scanning the thousands output conductors to identify the calling office. If the identifier fails to identify the calling office from the thousands output conductors and advances to scan the hundreds output conductors, relay 18–HSA will be operated and relay 19–OFEA released. If now relay 19–PTK releases, a circuit is closed from ground over front contact of relay 18–HSA, back contact of relay 19–OFEA, back contact of relay 19–PTK to battery through the winding of relay 18–EP, operating relay 18–EP which grounds conductor 1624, operating relay 24–1TR in the outpulser to cause the outpulser to release the identifier, seize the other identifier, and make a second attempt to identify the calling line.

Since the office auxiliary relays overlap in their operation, relay 19–PTK will be held operated as long as relays 10–TP0 to 11–TP19 function properly.

*Outpulser Link*

It will be remembered that, after crosspoint 700 was closed to connect the outpulser of FIGS. 20 to 26 with the trunk circuit of FIGS. 2 and 4, relay 4–SP, in operating, disconnected battery from conductor 401, releasing relay 5–TP00 to restore the link control circuit to normal. If, when relay 5–TP00 releases some other trunk preference relay such as relay 5–TP09 has been operated, it will connect battery over its front contact to conductor 540, holding relay 7–OP00 operated until relay 7–OB00 operates to extend the preference to the next outpulser, after which the outpulser link control circuit will function to connect the waiting trunk to an outpulser.

When the outpulser has completed its operation, relay 22–OB releases and removes ground from conductor 750 permitting the hold magnet 7–HM00 to release, and removes battery from conductors 743, 744, etc. to permit the outpulser busy relays to release. However, if at the time the circuit of relay 7–OB00 is opened, a trunk preference relay, for example relay 5–TP09, is operated, relay 7–OB00 will be held operated in a circuit from battery through its lower winding and over its front contact, conductor 754, back contact of any unoperated outpulser busy relays, for example relay 5–OB03, conductor 544 to ground over the front contact of the operated trunk preference relay, relay 5–TP09. This locking of the outpulser busy relay keeps the preference circuit closed to an outpulser being selected at the moment.

*Timing*

It is customary in automatic telephone systems to provide timing circuits to insure the efficient operation of the circuits by detecting undue delays in completing their functions or in the overall operation of the equipment. In the automatic line identification circuits of the present disclosure, these timing circuits are located in the outpulser, where three timing circuits are provided, including a circuit for timing the overall operation of the outpulser employing tube 23–TALT and two work timers employing tubes 23–TM1 and 23–TM2.

In general, these timers are similar, each comprising a normally shunted capacitor connected between the control anode and the cathode of a gas filled tube, the main anode of which is connected to +130-volt battery, in combination with suitable resistors for determining the time interval to be measured. When a timing operation is to be started, the shunt is removed from the capacitor and a relay winding is connected to the cathode of the tube. If the operation being timed is completed within the time interval provided by the timing circuit, the shunt is restored and the relay winding is disconnected. If the timing is completed, the relay operates to dispose of the call.

Both the overall timer employing tube 23–TALT and the first work timer employing tube 23–TM1 are started when an attempt is made to seize the outpulser. When the outpulser link control circuit is idle, ground is connected over the back contacts of all of the outpulser busy relays, including relays 7–OB00 and 8–OB70, and the back contacts of all of the outpulser preference relays, including relays 8–OP70 and 7–OP00, to conductor 754 and through the winding of relay 22–CH to battery, holding relay 22–CH operated. A similar circuit is provided over the contacts of the outpulser preference relays and outpulser busy relays for each outpulser.

When, as above described, trunk preference relay 5–TP00 is operated, in turn operating outpulser preference relay 7–OP00, ground is disconnected from conductor 754 and relay 22–CH releases. With relay 22–CH released, lamp 22–OPL is lighted, an obvious circuit is closed for relay 23–TAL which controls the overall timer and a circuit is closed from ground over back contacts of relays 22–CH, 24–PT1, 23–ETM1, and 24–SP to battery through the winding of relay 23–STM1 which controls the first work timer. Relays 23–TAL and 23–STM1 operate in these circuits.

Relay 23–TAL, in operating, opens the shunt around capacitor 23–TALC and connects ground over a back contact of relay 23–TAL1 through the right winding of that relay and front contact of relay 23–TAL to the cathode of tube 23–TALT. Capacitor 23–TALC now charges from +130-volt battery through resistor 23–TAL4. The values of capacitor 23–TALC and resistor 23–TAL4 are so chosen that the time required for the voltage on capacitor 23–TALC to reach the breakdown voltage for tube 23–TALT is sufficient to cover the normal operating time of the outpulser, for example, three to five seconds. When relay 22–ON operates, it closes a substitute circuit for relay 23–TAL. After the connection between the trunk circuit and the outpulser has been established, all of the outpulser busy relays in the outpulser link are operated as previously described, completing a substitue operating circuit for relay 22–CH and relay 22–CH operates, opening the original operating circuit for relay 23–TAL. The operation of relay 22–CH opens the circuit for lamp 22–OPL but relay 22–HMK, which has already operated, holds the lamp lighted. When relay 20–RL is operated to bring about the release of the outpulser, relay 20–RL closes an additional holding circuit for relay 23–TAL so that the overall timing continues until the outpulser is completely restored to normal. When relay 20–RL releases, relay 23–TAL releases, closing a shunt through resistor 23–TAL3 around the capacitor 23–TALC and the overall timer is restored to normal.

If the operation of the outpulser is delayed so that capacitor 23–TALC receives a sufficient charge, tube 23–TALT breaks down and operates relay 23–TAL1. Relay 23–TAL1 locks in a circuit from battery through its left winding, front contacts of relays 23–TAL1 and 23–TAL to ground. Relay 23–TAL1 closes a circuit for relay 24–TTST, operating that relay to cause a trouble ticket to be printed. In addition, relay 23–TAL1 opens the circuit of relay 22–ON to restore the outpulser to normal as perviously described.

In the first work timer, relay 23–STM1 opens a shunt around capacitor 23–TM1C and connects ground over a back contact of relay 23–ETM1, right winding of that relay, front contact of relay 23–STM1 to the cathode of tube 23–TM1. Capacitor 23–TM1C charges from +130-volt battery through resistor 23–TMB and, if the charging continues until the breakdown potential for tube 23–TM1 is reached, the tube breaks down and causes relay 23–ETM1 to operate. If relay 23–ETM1 operates, it locks through its left winding to ground over front contact of relay 23–STM1 or over front contact of relay 24–PK, or over back contact of relay 22–L1 and front contact of relay 22–ON.

This timer is recycled when relay 22–L1 operates after the outpulser has determined that the call has not been abandoned as described above. With relay 22–L1 operated, a new shunt is closed around capacitor 23–TM1C including back contacts of relays 24–PIK and 22–TNK. After the identifier has been connected with the outpulser, relay 22–TNK is operated as previously described, again opening the shunt around capacitor 22–TM1C and the first work timer times the identificattion of the calling line designation. With relay 22–L1 operated, resistor 23–TMA is included in the charging circuit for condenser 23–TM1C to increase the time interval for this period.

When relay 24–SP operates when the outpulser is ready to transmit the designation to the tandem sender, the circuit of relay 23–STM1 is opened and the first work timer is restored to normal. In addition, a circuit is closed from ground over front contact of relay 22–ON, back contact of relay 24–PT1, back contact of relay 23–ETM1, and front contact of relay 24–SP to battery through the winding of relay 23–STM2.

With relay 23–STM2 operated, the second work timer is activated. This timer includes capacitor 23–TM2C, tube 23–TM2, and resistors 23–TM5 to 23–TM9. The values of capacitor 23–TM2C and resistors 23–TM5 and 23–TM8 are selected to provide a timing interval of 1.25 to 1.75 seconds. With relay 23–STM2 operated, a shunt is removed from capacitor 23–TM2C and relay 23–ETM2 is connected to the cathode of tube 23–TM2. Capacitor 23–TM2C charges from +130-volt battery through resistors 23–TM5, 23–TM9, and 23–TM8 and if the charging continues for a sufficient length of time, causes tube 23–TM2 to break down and operate relay 23–ETM2. If relay 23–ETM2 operates, it locks through its left winding under the control of relay 23–STM2.

The second work timer is also activated if the first work timer operates relay 23–ETM1. The operation of the latter relay releases relay 23–STM1 to restore the first work timer to normal and operates relay 23–STM2 to cause the second work timer to time the release of the outpulser.

If relay 23–ETM1 is operated prior to the operation of relay 24–TRS, in addition to restoring the first work timer and causing the second work timer to function, it closes a circuit from ground over back contact of relay 24–TRS, front contact of relay 23–ETM1 to battery through the winding of relay 24–TTST to cause a trouble ticket to be made. After the trouble ticket has been made relay 24–TTB is operated, completing a circuit from ground over front contact of relay 24 TTB, front contact of relay 23–ETM1, back contacts of relays 22–L1 and 24–TRS back contact and winding of relay 20–RL to battery, thereby causing the outpulser to release. Similarly, if relay 23–ETM2 operates following the operation of relay 24–MF, a circuit is closed from ground over front contact of relay 23–ETM2, front contact of relay 24–MF to battery through the winding of relay 24–TTST to trouble ticket to be printed. When relay 24–TTB operates, a circuit is closed from ground over front contact of relay 24–TTB, front contact of relay 23–ETM2, front contact of relay 24–SP, back contact and winding of relay 20–RL to battery to cause the release of the outpulser.

Relay 23–ETM1 also operates relay 23-ETMA which is effective if the link has not been successful in selecting an outpulser. Relay 23–ETMA opens the select magnet operating circuit and with relay 24–TTB operated, closes a circuit for operating relay 22–OB to in turn operate all of the outpulser busy relays in the outpulser link to cause the outpulser link to prefer another outpulser.

If the first work timer operates relay 23–ETM1 before relay 22–L1 is operated, indicating that the call may have been abandoned, the outpulser makes an additional test for abandonment for the call. Relay 23–ETM1 causes the start of the second work timer and disconnects battery from conductor 2201 releasing relay 4–SP1. Release of relay 4–SP1 connects the calling line to the windings of relay 2–A and that relay reoperates if the call has not been abandoned. At this time a circuit is closed from battery through the winding of relay 22–AB, back contacts of relays 24–SP, 20–CCKF, and 23–IRL, front contacts of relays 24–TRS and 22–TKCI, conductor 2203 through crosspoint 700 to conductor 406. With relay 4–ON operated, conductor 406 extends over front contacts of relays 4–ON and 4–SP to battery through the winding of relay 4–MF. If the calling subscriber has not abandoned the call, relay 2–A will remain operated, in turn holding relay 4–ON operated, and relay 22–AB does not operate. When the second work timer operates relay 23–ETM2, a circuit is closed from ground over front contact of relay 23–ETM2, back contacts of relays 22–AB, 22–L1 and 24–TNKA, winding of relay 20–CCKF to battery. Relay 20–CCKF operates in this circuit to indicate a continuity check failure and operates relay 24–TTST to cause a trouble ticket to be made. With relay 20–CCKF operated, ground is connected to conductor 2203 to operate relay 4–MF and prepare the trunk for transmitting an identification failure signal to the tandem office. In addition, when the trouble ticket has been made with relay 20–CCKF operated the operation of relay 24–TTB operates relay 24–MF to prepare the outpulser for transmitting the identification failure signal. Relay 20–CCKF also prepares a circuit for operating relay 23–ID2 which is completed when relay 24–SP operates to start the outpulsing. With relays 24–TTB, 23–ETM2 and 24–SP operated, relay 20–RL is operated to release the outpulser.

If the calling subscriber has released the connection, relay 2–A is released and after an interval releases relay 4–ON. With relay 4–ON released, ground is connected to conductor 406 and thence to conductor 2202 to operate relay 22–AB. With relay 22–AB operated, when relay 23–ETM2 operates at the end of the timing interval measured by the second work timer, a circuit is closed from ground over front contacts of relays 23–ETM2 and relay 22–AB, back contact and winding of relay 20–RL to battery operating relay 20–RL to release the outpulser.

In the trunk circuit the release of relay 4–ON releases the incoming end of the connection and also releases relays 2–CT1 and 4–SP. The locking circuit of relay 2–CS2 is opened, but this relay is slow to release so that relay 2–SI has time to operate in a circuit from ground through its upper winding, back contact of relay 4–ON, front contact of relay 2–CS2 to battery through resistor 2–SIR. Relay 2–SI, in operating, closes an auxiliary locking circuit for relay 2–RV which may be traced from battery through the lower winding of relay 2–RV, front contact of relay 2–RV, back contact of relay 2–ON1, front contract of relay 2–SI to ground. With relays 2–A and 4–SP1 released and relay 2–RV held operated, the shunt around the lower windings of relays 2–CS and 2–CS1 is opened and the high resistance in the supervisory circuit causes relay 3–A to release as a disconnect signal. After a time interval determined by the slow-to-release characteristics of relay 2–CS2, relay 2–CS2 releases, which in turn releases relay 2–SI, followed by relay 2–RV, restoring the trunk circuit to normal.

A trouble ticket may also be made following a failure to identify one or more of the digits during a first trial as previously described and is always made following a similar failure on a second trial. If it seems desirable not to make trouble tickets following first trial failures, a key may be operated in the miscellaneous circuit for the trouble ticketer which connects ground to conductor 2610 leading to all of outpulsers, operating relay 26–CFTF. With relay 2–CFTF operated, the circuit for operating relay 24–TTST following a first trial failure is opened and is extended to winding of relay 24–TTB to operate relay 24–TTB to simulate the completion of a trouble ticket and permit the outpulser to start the second trial.

In addition, a trouble ticket is made if any of the check relays fails to operate because more than the proper number of indications are registered. If more than one of the relays 22–I1 to 22–I4, which register information from the trunk are operated, for example if both relays 22–I1 and 22–I4 are operated, no circuit is closed for relay 24–IK and a circuit is closed from ground over back contact of relay 22–SPL, front contact of relay 22–I1, back contacts of relays 22–I2 and 22–I3, front contact of relay 22–I4, conductor 2400 to battery through the winding of relay 24–AL operating that relay. If both the tip party relay 24–TP and the ring party relay 24–RP are operated, an obvious circuit is closed to ground conductor 2400 and operate relay 24–AL. Only one of the office register relays 25–OF0 to 25–OF4 should be operated, but if two of these relays, for example 25–OF0 and 25–OF1 are operated, no circuit is completed for the office check relay 23–OFK, but a circuit will be closed from ground over back contacts of relays 25–OF4, 25–OF3, and 25–OF2, front contacts of relays 25–OF1 and 25–OF0 to conductor 2400 to operate relay 24–AL. The circuits for the digit check relays 23–THK to 23–UK are similar since in each case no more than two of the register relays should be operated. If three register relays are operated, for example relays 25–TH0, 25–TH1, and 25–TH2 in the thousands digit register, the circuit for operating the thousands check relay 23–THK will be opened and ground will be connected over front contacts of relays 25–TH0, 25–TH1, and 25–TH2 to conductor 2400 operating relay 24–AL. Similar circuits for operating relay 24–AL are provided for each of the digit registers. With relay 24–AL operated, when relay 22–TNC releases preparatory to transmitting the line designation to the tandem office, a circuit is closed from ground over front contact of relay 24–AL, back contact of relay 22–TNC to battery through the winding of relay 24–TTST to cause a trouble ticket to be made when the first work timer times out, relay 23–ID2 is operated and the identification failure signal is transmitted to the tandem office.

*Panel Type Office*

The foregoing description has been confined to the operation of the automatic line identification circuits in connection with a crossbar office. The operation in connection with a step-by-step office would be similar, since in such offices the trunk has means for indicating to the outpulser whether a ring party or a tip party subscriber is calling.

As previously mentioned, trunks outgoing from panel type officers are not equipped to supply the party information but are provided with cross-connecting terminals by which one of three indications may be transmitted to the outpulser. If no party lines are included in the office, ground will be connected to conductor 405 leading to the outpulser link and will be extended through the link to conductor 2200 and the winding of relay 22–I1 after which the outpulser functions as above described for an individual subscriber.

If there are party lines, ground will be connected to conductor 406 which is extended by the outpulser link to conductor 2203 to operate relay 22–I3 and cause the outpulser to make the party test. If the outpulser determines that the calling substation is a tip party, this information is transmitted back to the trunk circuit and when the connection is released, the outpulser link is reoperated to call in an outpulser to determine whether the ground characteristic of a tip party has been removed. For this purpose, the trunk connects ground to conductor 407 which extends through the outpulser link to conductor 2206 to cause the operation of relay 22–I4.

Assuming that relay 22I3 is operated, a circuit is closed from ground over front contact of relay 22–I3 to battery through the right winding of relay 24PT. Relay 24–PT operates and locks in a circuit from battery through its left winding and over its own front contact, winding of relay 24–PIK, back contact of relay 23–IRL, front contact of relay 22–ON to ground. Relay 24–PIK operates in this circuit and closes a checking circuit for operating relay 24–IK. As previously described, the operation of relay 24–IK causes the operation of relay 22–SPL which in turn operates relay 24–SPL1 to cause the operation of the splitting relay in the trunk circuit, after which relays 22–SPL and 22–I3 are released. With relay 22–SPL released, relay 24–TRS operates and causes the tip and ring conductors of the trunk to be extended to the windings of relay 22–L to check that the calling subscriber has not abandoned the call. If the call has not been abandoned, relay 22–L operates in turn operating relay 22–L1.

With relay 24–PT operated, the operation of relay 22–L1 completes a circuit from ground over front contact of relay 22–L1, front contact of relay 24–PT, back contact of relay 24–IYT to battery through the winding of relay 24–PT1. Relay 24–PT1 operates and locks over the back contact of relay 24–IYT and the front contact of relay 24–PT1 to ground over front contact of relay 22–ON. Relay 24–PT1 also closes a holding circuit for relay 22–L1. With relay 24–PT1 operated, relay 22–L is disconnected from conductors 2200 and 2202 leading to the subscriber's line and conductor 2202 is extended over front contact of relay 24–PT1 and back contact of relay 24–GRT, through the middle winding of relay 22–PT2 to battery through resistance lamp 22–PT2R. Conductor 2200 is extended over front contact of relay 24–PT1 through the right winding of relay 22–PT2 to battery through resistance lamp 22–PT1R. A polarizing circuit is closed through the left winding of relay 22–PT2 under the control of relay 24–PT. Relay 24–PT1 opens the circuit of relay 23–STM1 to stop the first work timer and closes a circuit from ground over front contact of relay 22–ON, front contact of relay 24–PT1 to battery through the winding of relay 23–STM2 starting the second work timer.

If no ground is present, indicating that the calling line is the ring party, relay 22–PT2 does not operate and when relay 23–ETM2 operates under the control of the second work timer, a circuit is closed from ground over front contact of relay 23–ETM2, back contact of relay 24–TP1 to battery through the winding of relay 24–RP1 operating that relay. Relay 24–RP1 locks over its own front contact and the back contact of relay 24–IYK to ground over front contact of relay 22–ON. With relay 24–RP1 operated, an obvious circuit is closed for operating relay 24–RP which in turn operates relay 24–PK, after which the outpulser makes an integrity test of relay 22–PT2 as will be disclosed hereinafter.

If ground is present on the calling line, indicating that the calling customer is a tip party station, relay 22–PT2 operates in turn operating relay 24–TP1. When the second work timer operates relay 23-ETM2, a circuit is closed from ground over front contact of relay 23–ETM2, front contact of relay 24–TP1, back contact of relay 24–RP1, left winding of relay 24–TP to battery. Relay 24–TP operates and locks through the winding of relay 24–PK to initiate the test of relay 22–PT2. When relay 24–TP1 operates, it connects ground through the right winding of relay 22–L to the circuit extending to the tip conductor of the calling substation to discharge the line to prevent the induced voltage resulting from the opening of the tip circuit causing the ring party station bell to tap. With relays 24–PT and 24–TP operated, +130-volt battery is connected through resistor 22–TPR, front contacts of relays 24–TP and 24–PT, back contact of relay 20–OTPT, front contacts of relays 24–TRS and 22–TKCI to conductor 2206 and thence to the trunk circuit to operate a relay in the trunk circuit to register the fact that the call was originated by a tip party subscriber.

Whenever the outpulser makes party line identification, integrity check is made of relay 22–PT2. With relays 24–PK and 24–PIK operated, a circuit is closed from ground over front contacts of these relays to battery through the winding of relay 24–IYT. Relay 24–IYT operates and locks under the control of relay 22–ON. The operation of relay 24–IYT opens the circuit of relay 24–PT1 and that relay releases. If relay 24–RP1 is operated, a circuit is now closed from ground over back contact of relay 24–PT1, front contact of relay 24–RP1, through resistor 22–IYT1, front contact of relay 24–IYT through the middle winding of relay 22–PT2 to battery through lamp 22–PT2R. A second circuit is closed from ground over back contact of relay 24–PT1, front contact of relay 24–RP1, resistor 22–IYT3, front contact of relay 24–IYT through the right winding of relay 22–PT2 to battery through resistance lamp 22–PT1R. If relay 22–PT2 operates, it closes an obvious circuit for operating relay 24–TP1 which closes a circuit from ground over front contacts of relays 24–IYT, 24–TP1, and 24–RP1 to battery through the winding of integrity check relay 24–IYK. Relay 24–IYK operates and locks over its own front contact under the control of relay 22–ON.

If relay 24–TP has been operated as a result of indentifying a tip party substation, a circuit is closed from ground over front contact of relay 24–TP, resistor 22–IYT2, front contact of relay 24–IYT through the right winding of relay 22–PT2 to battery through resistance lamp 22–PT1R. Resistor 22–IYT2 is of such value that when relay 22–PT2 is disconnected from the calling line, it should not remain operated in the circuit traced through its right winding. With relay 22–PT2 released, relay 24–TP1 releases. A circuit is now closed from ground over front contact of relay 24–IYT, back contact of relay 24–TP1, front contact of relay 24–TP to battery through the winding of check relay 24–IYK. Relay 24–IYK operates and locks under the control of relay 22–ON at the same time releasing relay 24–RP1. While relay 24–PT is operated to instruct the outpulser to make party test, relay 24–SP cannot operate until relay 24–IYK has operated, after which the call proceeds as previously described.

When the outpulser has identified a tip party line and has registered an indication of that fact in the trunk circuit, if the call has been answered, disconnection by the calling line causes the trunk circuit to again operate the outpulser link to seize an outpulser and operate relay 22–I4 in the outpulser to instruct the outpulser to make a ground removal test. With relay 22–I4 operated, a circuit is closed through the right winding of ground removal test relay 24–GRT, operating that relay which locks through its left winding and the winding of relay 24–PIK causing relay 24–PIK to operate. Relay 24–IK is operated over front contacts of relays 22–I4 and 24–PIK and locks. Relays 22–SPL and 24–SPL1 operate, together with the splitting relay in the trunk circuit. Relay 22–SPL releases and relay 24–TRS operates. With relays 24–PT1 and 24–GRT operated, the tip conductor extending to conductor 2202 is connected through the right winding of relay 22–PT2 to battery through resistance lamp 22–PT1R. With relay 24–PT1 operated, the ring conductor extending to conductor 2200 is also connected to the right winding of relay 22–PT2. As previously described, relay 24–PT1 starts the second work timer and, if the ground has been removed so that relay 22–PT2 does not operate, when relay 23–ETM2 operates, relay 24–RP1 is operated, in turn operating relay 24–RP as previously described and the integrity check is made of relay 22–PT2. When relay 24–IYK operates, a circuit is closed from ground over front contacts of relays 24–GRT, 24–IYK, and 24–RP, back contact and winding of relay 20–RL to battery operating relay 20–RL to release the outpulser.

If ground has not been removed from the calling line, relay 22–PT2 operates, in turn operating relay 24–TP1. When relay 23–ETM2 operates, relay 24–TP is operated and a circuit is clsed frm ground over front contacts of relays 24–GRT and 24–TP to battery through the winding of relay 20–GRF operating that relay to indicate a ground removal failure. With relay 23–GRF operated, a circuit is closed for operating the outpulser preference relay 22–OP to seize an identifier and identify the designation of the calling line on which the ground was removed. Relay 24–GRF also operates relay 24–TTST to call in the trouble ticketer and makes a trouble record. When relay 24–TTB operates, a circuit is closed over front contacts of relays 24–TTB and 20–GRF to operate relay 20–RL and release the outpulser.

What is claimed is:

1. In a calling line identification system, a plurality of office units, a plurality of marking conductors individual to each office, the conductors individual to each office including a set of conductors for each digit of a calling line number, means for marking the sets of conductors of an office in accordance with the identity of a calling line in that office, a line identifier, a set of detectors in said identifier including a detector for each conductor of a set, means to sequentially connect said detectors to the set of conductors for a particular digit in each office to test for the presence of said marking on said set of conductors, means responsive to the operation of one of said detectors to register the identity of the office and of the digit detected, and means effective if none of the detectors is operated to connect said detectors sequentially to the set of conductors for a different digit in each office, the operation of one of said detectors in response to the presence of said marking on one of said different digit conductors being effective to register the identity of the office and of said different digit in said register means.

2. A line identifying system in accordance with claim 1 in which the registration of said particular digit or of said different digit causes said identifier to sequentially connect said detectors with the other sets of digit conductors individual to the identified office to detect and register the remaining digits.

3. A line identifying system in accordance with claim 2 including indicating means individual to each digit, means operated in response to the registration of each digit for operating the individual indicating means, and means responsive to the operation of all of said indicating means for releasing said identifier.

4. A line identifying system in accordance with claim 2 including means effective if less than all of said remaining digits are detected to again connect the detectors to the sets of digit conductors for the digits which were not previously identified.

5. A line identifying system in accordance with claim 3 including means effective if less than all of said indicating means have been operated to connect said detectors sequentially with the digit conductors for which said indicating means have not been operated.

6. In a telephone system, a local office, calling line circuits, identifying equipment at said local office including means for registering the digits of a calling line designation, a tandem office, charge recording means at said tandem office, an operator position at said tandem office, means to connect said line identifying equipment with a calling line circuit to register the designation of said line, means under the control of said registering means to transmit an information digit followed by the digits of said calling line designation to said charge recording means, means effective if said line identifying equipment cannot identify the calling line designation to transmit a different information digit to said tandem office, and means responsive to said different information digit to connect said operator position with said calling line and to place said charge recording means under the control of said operator position.

7. In a telephone system, a local office, calling line circuits, identifying equipment at said local office including means for registering the digits of a calling line designation, a tandem office, charge recording means at said tandem office, an operator position at said tandem office, means to connect said line identifying equipment with a calling line circuit to register the designation of said line, means under the control of said registering means to transmit the digits of said calling line designation to said charge recording means, means effective if said line identifying equipment cannot completely identify the calling line designation to transmit a special signal to said tandem office and prevent the transmission of any registered digit, and means responsive to said special signal to place said charge recording means under the control of said operator position.

8. In a telephone system, a local office, calling line circuits, identifying equipment at said local office including means for registering the digits of a calling line designation, a tandem office, charge recording means at said tandem office, an operator position at said tandem office, means to connect said line identifying equipment with a calling line circuit to register the designation of said line, means under the control of said registering means to transmit the digits of said calling line designation to said charge recording means, means effective if said line identifying equipment cannot identify the calling line designation to transmit a special signal to tandem office, means responsive to said special signal to place said charge recording means under the control of said operator position, service observing equipment connected with said calling line circuit, means under the control of said service observing equipment effective when said identifying equipment is connected with said calling line circuit to operate a service observing indicator in said identifying equipment, means under the control of said service observing indicator to modify said special signal, and means under the control of said modified special signal to cause said charge recording means to also record that the calling line was under observation.

9. In a telephone system, a local office, calling line circuits, identifying equipment at said local office including means for registering the digits of a calling line designation, a tandem office, charge recording means at said tandem office, an operator position at said tandem office means to connect said line identifying equipment with a calling line circuit to register the designation of said line, means under the control of said registering means to transmit an information digit followed by the digits of said calling line designation to said charge recording means, means effective if said line identifying equipment cannot identify the calling line designation to transmit a different information digit to said tandem office, means responsive to said different information digit to place said charge recording means under the control of said operator position, service observing equipment connected with said calling line circuit, means under the control of said service observing equipment effective when said identifying equipment is connected with said calling line circuit to operate a service observing indicator in said identifying equipment, means under the control of said service observing indicator to increase said information digit by a fixed amount, and means under the control of said increased information digit to cause said charge recording means to also record that the calling line was under observation.

10. In a telephone system, a local office, calling line circuits, identifying equipment at said local office including means for registering the digits of a calling line designation, a tandem office, charge recording means at said tandem office, an operator position at said tandem office, means to connect said line identifying equipment with a calling line circuit to register the designation of said line, means under the control of said registering means to transmit an information digit followed by the digits of said calling line designation to said charge recording means, means effective if said line identifying equipment cannot identify the calling line designation to transmit a different information digit to said tandem office, means responsive to said different information digit to connect said operator position with said calling line and to place said charge recording means under the control of said operator position, service observing equipment connected with said calling line circuit, means under the control of said service observing equipment effective when said identifying equipment is connected with said calling line circuit to operate a service observing indicator in said identifying equipment, means under the control of said service observing indicator to increase said information digit or said different information digit by a fixed amount, and means under the control of said increased information digit or said increased different information digit to cause said charge recording means to also record that the calling line was under observation.

11. In a telephone system, a local office, one party, two party and multiparty line circuits in said local office, calling line identifying equipment at said local office including means for registering the digits of a calling line designation, a tandem office, charge recording means at said tandem office, an operator position at said tandem office, sets of line identifying conductors at said local office, means to mark said conductors over calling one party or two party line circuits in accordance with the designation of said lines, an additional conductor, means to mark said additional conductor over calling multiparty line circuits, means to connect said line identifying equipment with the conductors marked over a calling line circuit, means to register said designation if said calling line is a one party line or a two party line, auxiliary registering means operated if said calling line is a multiparty line, means under the control of said digit registering means to transmit the digits of a calling line designation to said charge recording means, means under the control of said auxiliary register to transmit a special signal to said tandem office, means responsive to said special signal to place said charge recording means under the control of said operator position, service observing equipment connected with said calling line circuit, service observing conductors, means under the control of said service observing equipment to mark a service observing conductor when said line identifying conductors are marked or when said additional conductor is marked, a service observing indicator in said identifying equipment, means to operate said service observing indicator when said digit registering means is operated or said auxiliary registering means is operated, means under the control of said service observing indicator to increase said information digit or said different information digit by a fixed amount, and means under the control of said increased information digit or said increased different information digit to cause said charge recording means to also record that the calling line was under observation.

12. In a telephone system, calling line circuits, sets of conductors common to said line circuits, means for marking said sets of conductors over said calling line circuits in accordance with the identity of the calling line, a line identifier, switching equipment, outgoing trunk circuits, means under the control of a calling line for connecting said line over said switching equipment with one of said outgoing trunk circuits, said connection normally held under the control of said calling line, means under the control of said trunk circuit to seize said identifier, means in said identifier to test said sets of conductors for said markings, means normally under the control of said test means to record the identity of the calling line and to permit the further extension of the connection from said trunk circuit, and means effective if said identifier fails to find any marking to hold the connection between said calling line and said trunk circuit independent of the control of said calling line.

13. In a telephone system, calling line circuits, sets of conductors common to said line circuits, means for marking said sets of conductors over said calling line circuits in accordance with the identity of the calling line, a line identifier, switching equipment, outgoing trunk circuits, means under the control of a calling line for connecting said line over said switching equipment with one of said outgoing trunk circuits, said connection normally held under the control of said calling line, means under the control of said trunk circuit to seize said identifier, means in said identifier to test said sets of conductors for said markings, means normally under the control of said test means to record the identity of the calling line and to permit the further extension of the connection from said trunk circuit, manually controlled holding means in said trunk circuit, and means effective if said identifier fails to find any marking to operate said holding means to hold the connection between said calling line and said trunk circuit independent of the control of said calling line.

14. In a telephone system, a local office, calling line circuits at said local office, a plurality of marking conductors including a set of conductors for each digit of the calling line designation, means for marking the sets of conductors over a calling line circuit in accordance with the designation of the calling line, switching equipment, outgoing trunk circuits, means under the control of a calling line to extend a connection from the calling line over said switching equipment to one of said outgoing trunk circuits, said connection normally held under the control of said calling line, a line identifier including a set of detectors, means under the control of said outgoing trunk circuit to seize said identifier, means in said identifier to connect said set of detectors with said conductors to test for said markings, a tandem office, said outgoing trunk circuits terminating at said tandem office, charge recording means at said tandem office, an operator position at said tandem office, means under the control of operated detectors to transmit the designation of said calling line to said charge recording means, means effective if none of said detectors is operated to transmit a special signal to said charge recording means, means under the control of said special signal to connect said operator position with the termination of said outgoing trunk, means under the control of said operator position to record the calling line designation in said charge recording means, and other means effective if none of said detectors is operated to hold the connection between said calling line and said outgoing trunk independent of the control of said calling line.

15. In a telephone system, a local office, one party, two party, and multiparty line circuits in said local office, identifying equipment at said local office for registering the digits of a one party and two party calling line designation, a tandem office, charge recording means at said tandem office, an operator position at said tandem office, means under control of said registering means to transmit the digits of calling one party and two party line designations to said charge recording means, auxiliary registering means operable if said calling line is a multiparty line, means under control of said auxiliary register means to transmit a first special signal to said tandem office, means effective if said line identifying equipment cannot completely identify the calling line designation to transmit a second special signal to said tandem office and to prevent the transmission of any registered digit, and means responsive to both said first and second special signals to place said charge recording means under control of said operator position.

References Cited in the file of this patent

UNITED STATES PATENTS

| | | |
|---|---|---|
| 2,385,715 | Lomax | Sept. 25, 1945 |
| 2,387,671 | Lundstrom | Oct. 23, 1945 |
| 2,586,704 | Ostline | Feb. 19, 1952 |
| 2,615,094 | Mitchell | Oct. 21, 1952 |
| 2,629,016 | Gooderham | Feb. 17, 1953 |
| 2,763,725 | Ostline | Sept. 18, 1956 |
| 2,848,543 | Breed | Aug. 19, 1958 |
| 2,854,519 | Harris | Sept. 30, 1958 |
| 2,928,904 | Morris | Mar. 15, 1960 |